(12) United States Patent
Pechatnikov et al.

(10) Patent No.: US 7,089,110 B2
(45) Date of Patent: *Aug. 8, 2006

(54) DYNAMIC NAVIGATION SYSTEM

(75) Inventors: Michael Pechatnikov, Tel Aviv (IL); Michael Menachem Kupferman, Zichron Yaakov (IL); Omry Yadan, Mitzpe Ramon (IL); Ilya Eckstein, Ashdod (IL); Alexander Fagin, Lod (IL); Oren Nissim, Raanana (IL)

(73) Assignee: Telmap Ltd., Herzellya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 10/934,047

(22) Filed: Sep. 3, 2004

(65) Prior Publication Data

US 2005/0033511 A1 Feb. 10, 2005

Related U.S. Application Data

(63) Continuation of application No. 10/426,947, filed on Apr. 30, 2003, now Pat. No. 6,917,878.

(60) Provisional application No. 60/377,019, filed on Apr. 30, 2002.

(51) Int. Cl.
*G01C 21/26* (2006.01)
*G01C 21/32* (2006.01)

(52) U.S. Cl. ........................ 701/210; 340/988
(58) Field of Classification Search ........ 701/200–202, 701/210–214, 224; 342/357.12, 357.13; 340/988

See application file for complete search history.

(56) References Cited

U.S. PATENT DOCUMENTS

| | | | |
|---|---|---|---|
| 6,038,559 A | 3/2000 | Ashby et al. | 707/4 |
| 6,107,944 A | 8/2000 | Behr et al. | 340/995 |
| 6,188,955 B1 | 2/2001 | Robinson et al. | 701/200 |
| 6,233,518 B1 | 5/2001 | Lee | 701/117 |
| 6,236,357 B1 | 5/2001 | Corwith | 342/357.08 |
| 6,278,939 B1 | 8/2001 | Robare et al. | 701/208 |
| 6,282,489 B1 | 8/2001 | Bellesfield et al. | 701/201 |
| 6,314,369 B1 | 11/2001 | Ito et al. | |
| 6,320,518 B1 | 11/2001 | Saeki et al. | 340/995 |
| 6,347,278 B1 | 2/2002 | Ito | 701/200 |
| 6,381,535 B1 | 4/2002 | Durocher et al. | 701/202 |

(Continued)

FOREIGN PATENT DOCUMENTS

DE 19651146 6/1998

(Continued)

OTHER PUBLICATIONS m-Travel.com, May 10, 2002.

(Continued)

*Primary Examiner*—Yonel Beaulieu
(74) *Attorney, Agent, or Firm*—Ladas & Parry

(57) ABSTRACT

A method for navigation includes storing map data on a server, the map data including vector information delineating roads in a map. A portion of the vector information corresponding to an area in which a user of a mobile client device is traveling is downloaded from the server to the client device. Approximate position coordinates of the user are found using a location providing device associated with the client device and are corrected in the client device, using the downloaded vector information, so as to determine a location of the user on one of the roads in the map. A navigation aid is provided to the user of the client device based on the determined location.

51 Claims, 33 Drawing Sheets

U.S. PATENT DOCUMENTS

| | | | |
|---|---|---|---|
| 6,462,676 B1 | 10/2002 | Koizumi | 340/995 |
| 6,493,630 B1 | 12/2002 | Ruiz et al. | 701/208 |
| 6,526,284 B1 | 2/2003 | Sharp et al. | 455/456 |
| 2001/0001847 A1 | 5/2001 | Hessing | |
| 2001/0045949 A1 | 11/2001 | Chithambaram | |
| 2003/0229441 A1 | 12/2003 | Pechatnikov et al. | |

FOREIGN PATENT DOCUMENTS

| | | |
|---|---|---|
| DE | 10029198 | 12/2001 |
| EP | 0 875 878 | 11/1998 |
| EP | 1 118 837 | 7/2001 |
| EP | 1 186 863 | 3/2002 |
| EP | 1 186 863 A2 * | 3/2002 |
| WO | WO 01/01370 | 1/2001 |
| WO | WO 01/27812 | 4/2001 |

OTHER PUBLICATIONS http://www.intergraph.com, 2002.
http://www.intelliwhere.com, 2002.
http://www.wirelessdevent.com, 2001.
http://www.microsoft.com/mappoint/net, 2003.
Nigel Conolly, "Software for Mobile Mapping", Feature Article-issue 47, 2003.
Beckmann, et al, "The R*-Tree: An Efficient and Robust Access Method for Points and Rectangles", Proceedings of ACM SIGMOD International Conference on Management of Data (1990), pp. 322-331.
Cherkassky et al, "Shortest Path Algorithms: Theory and Experimental Evaluation", Technical Report 93-1480, Department of Computer Science, Stanford University, (Stanford, California, 1993).
Ken-ichi Saito, et al, Vector Map Delivery System for Mobile Terminals, Nov. 2001.
http://www.map24.com, 2002.
Introduction—SVG 1.0—Sep. 2001.
Automation of Map Generalization, ESRI White Paper Series, May 1996.
English Abstract of DE 10029198 Dec. 20, 2001.
English Abstract of DE 19651146 Jun. 25, 1998.
"Platform Abstraction of Input Method Using Proxy Server", IBM Technical Disclosure Bulletin, IBM Corp. New York, U.S. vol. 40, No. 4, Apr. 1, 1997.

* cited by examiner

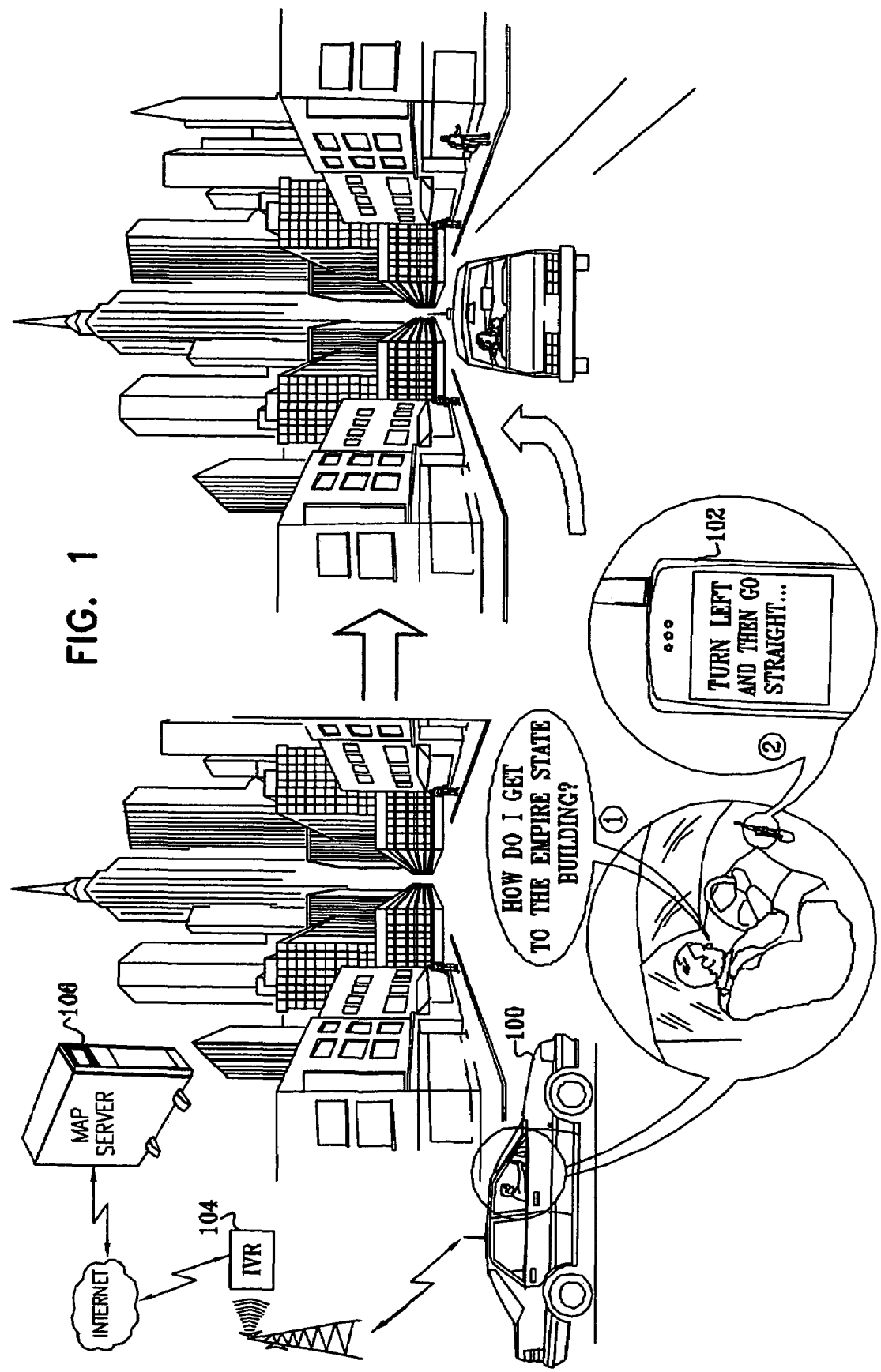

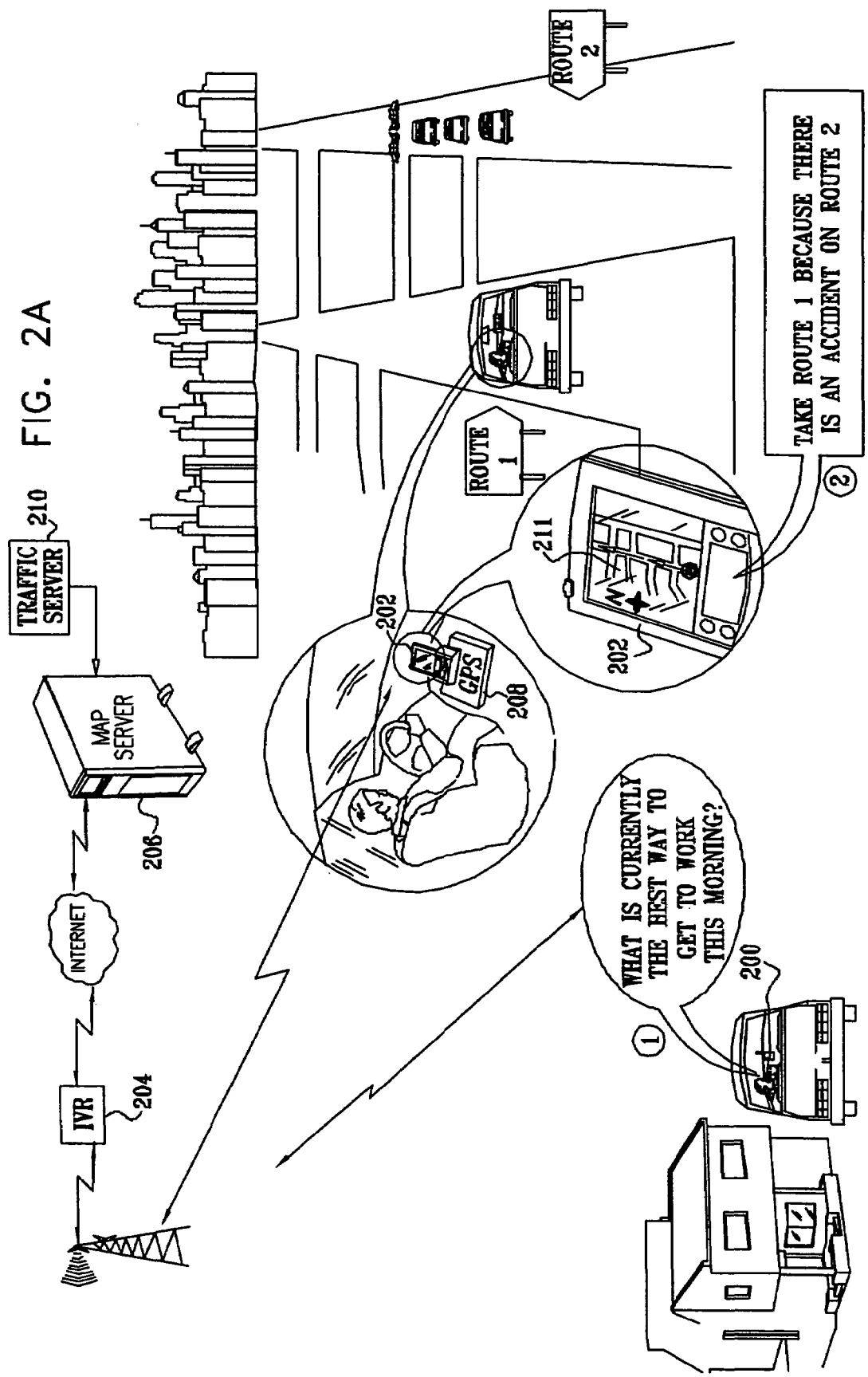

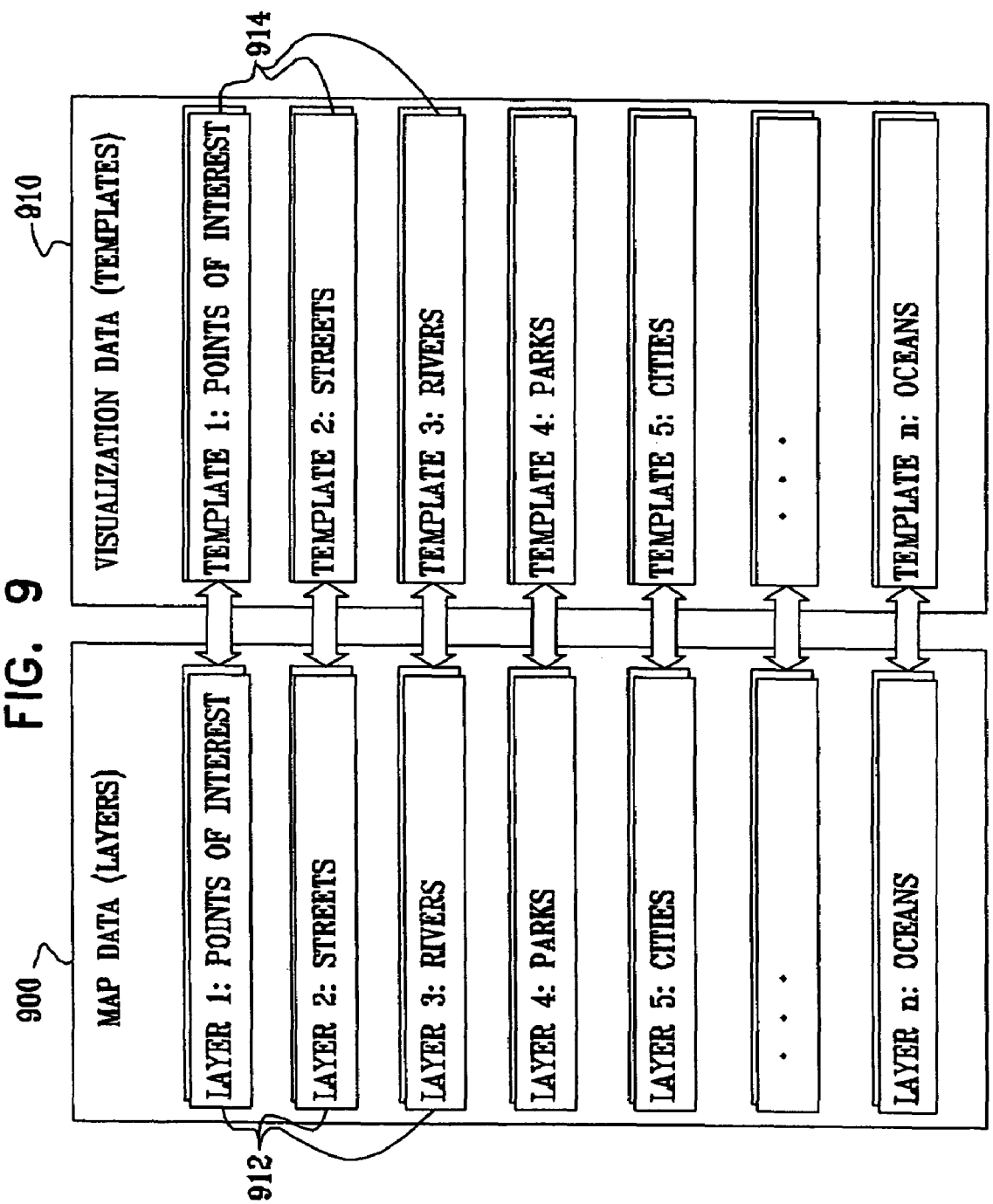

DYNAMIC NAVIGATION SYSTEM

CROSS-REFERENCE TO RELATED APPLICATION

This is a continuation of application Ser. No. 10/426,947 filed on Apr. 30. 2003 now U.S. Pat. No. 6,917,878. This application claims the benefit of U.S. Provisional Patent Application 60/377,019, filed Apr. 30, 2002. This application is also related to two other patent applications, filed on even date, which are entitled "Template-Based Map Distribution System" and "Navigation System Using Corridor Maps". The disclosure of all these related applications are incorporated herein by reference.

FIELD OF THE INVENTION

The present invention relates to data distribution and display systems and methodologies and more particularly to map data display systems and methodologies.

BACKGROUND OF THE INVENTION

A variety of systems are known in the art for providing drivers with in-vehicle electronic routing maps and navigation aids. These systems are commonly coupled to a location-finding device in the vehicle, such as a Global Positioning System (GPS) receiver. The GPS receiver automatically determines the current location of the vehicle, to be displayed on the map and used in determining routing instructions.

In-vehicle navigation systems fall into two general categories: "on-board" systems, in which the map data are stored electronically in the vehicle (typically on optical or magnetic media); and "off-board" systems, in which the map data are furnished by a remote map server. These systems typically use a client program running on a smart cellular telephone or personal digital assistant (PDA) in the vehicle to retrieve information from the server over a wireless link, and to display maps and provide navigation instructions to the driver.

Various off-board navigation systems are described in the patent literature. For example, U.S. Pat. No. 6,381,535, whose disclosure is incorporated herein by reference, describes improvements required to convert a portable radiotelephone into a mobile terminal capable of functioning as a navigational aid system. Itinerary requests of the mobile terminal are transmitted to a centralized server by a radio relay link. The server calculates the itinerary requested, and transmits the itinerary to the mobile terminal in the form of data concerning straight lines and arc segments constituting the itinerary. The server also evaluates the possibility of the vehicle deviating from its course and transmits data concerning segments of possible deviation itineraries in an area of proximity to the main itinerary.

Other off-board navigation systems are described in PCT Publications WO 01/01370 and WO 01/27812; in U.S. Pat. Nos. 6,038,559, 6,107,944, 6,233,518, 6,282,489, 6,320, 518, 6,347,278, 6,381,535, 6,462,676, 6,43,630 and 6,526, 284; and in U.S. Patent Application Publication 2001/ 0045949. The disclosures of all these patents and publications are incorporated herein by reference.

SUMMARY OF THE INVENTION

Embodiments of the present invention provide improved methods and systems for off-board mapping and navigation. These methods and systems permit rich, dynamic information to be downloaded rapidly and efficiently from a mapping server over a low-speed wireless link to a client device, typically a PDA or cellular telephone. Such wireless links are typically characterized by bandwidths below 10 kbps. Novel methods of data processing, on both the server and client sides of the interaction, enable the client to display maps to the user with enhanced speed and clarity, notwithstanding the limited communication bandwidth and display capabilities of the client device.

In one aspect of the present invention, the map server downloads to the client device vector information delineating roads in an area in which a user of the client device is traveling. The client device determines approximate location coordinates of the user using a location providing device associated with the client device. Such location providing devices, however, are prone to inaccuracy. Therefore, the client device corrects the location coordinates in order to register the user location exactly on one of the roads in the map, typically the road on which it is likeliest that the user is located. The corrected coordinates may be used in providing a navigation aid to the user of the client device, such as an icon representing the user location on an image of the map rendered by the client device.

In another aspect of the invention, the mapping server determines a route comprising a sequence of route segments, from a starting point to a destination specified by the client. Typically, the starting point is the client's current position, while the destination is a selected map location or point of interest. While the user travels along the route, the server may receive dynamic information regarding a change in travel conditions in a vicinity of the route. The client device periodically submits requests to the server for updated information regarding the route. Each request specifies one or more of the route segments not yet traversed by the user based on the downloaded route and the location coordinates of the client device. In response to these requests, the server checks the dynamic information it has received and, if appropriate, downloads to the client a modified route to the destination, typically to avoid traffic jams and road blockages.

Additionally or alternatively, the server may receive other types of dynamic information regarding the area in which the client is traveling, and may convey the dynamic information to the client in real time. Preferably, the client shows the dynamic information on a map of the area that it has rendered, without having to re-render the map.

There is therefore provided, in accordance with an embodiment of the present invention, a method for navigation, including:

storing map data on a server, the map data including vector information delineating roads in a map;

downloading from the server to a mobile client device a portion of the vector information corresponding to an area in which a user of the client device is traveling;

finding approximate position coordinates of the user using a location providing device associated with the client device;

receiving and correcting the approximate position coordinates in the client device, using the downloaded vector information, so as to determine a location of the user on one of the roads in the map; and providing a navigation aid to the user of the client device based on the determined location.

Typically, the location providing device includes a global positioning system (GPS) receiver. Correcting the approximate position coordinates may include determining, based on the approximate position coordinates, respective probabilities that the user is located on two or more of the roads, and determining the location of the user on the one of the roads responsively to the probabilities.

In an aspect of the invention, providing the navigation aid includes rendering an image of the map on the client device, and superimposing an icon representing the location of the user on the map. In a disclosed embodiment, receiving and correcting the approximate position coordinates includes updating the location of the user as the user travels along the roads, and superimposing the icon includes shifting a position of the icon on the map without rendering a new image of the map.

In embodiments of the invention, downloading the portion of the vector information includes downloading the vector information over a wireless link. Typically, the client device includes at least one of a cellular telephone and a personal digital assistant (PDA), which communicates with the server over a cellular telephone network that includes the wireless link. In some embodiments, the method includes downloading an applet from the server to the client device over the wireless link, for use by the client device in receiving and correcting the approximate position coordinates.

In further embodiments, downloading the portion of the vector information includes determining on the server, based on the map data, a route from a starting point to a destination within an area of the map, the route including a sequence of route segments, and downloading the route from the server to the client device, and providing the navigation aid includes guiding the user of the client device along the route. The method may further include receiving at the server, while the user travels along the route, dynamic information regarding a change in travel conditions in a vicinity of the route; submitting a request from the client device to the server for updated information regarding the route, the request specifying, based on the downloaded route and the location of the user, one or more of the route segments not yet traversed by the user; determining at the server, based on the route segments specified by the client device and on the dynamic information received by the server, a modified route to the destination; and downloading the modified route to the client device.

There is also provided, in accordance with an embodiment of the present invention, a method for navigation using a mobile client device, including:

storing map data on a server, the map data delineating features in a map;

determining on the server, based on the map data, a route from a starting point to a destination within an area of the map, the route including a sequence of route segments;

downloading the route from the server to the mobile client device;

finding location coordinates of the client device using a location providing device associated with the client device while a user of the client device travels along the route;

receiving at the server, while the user travels along the route, dynamic information regarding a change in travel conditions in a vicinity of the route;

submitting a request from the client device to the server for updated information regarding the route, the request specifying, based on the downloaded route and the location coordinates, one or more of the route segments not yet traversed by the user;

determining at the server, based on the route segments specified by the client device and on the dynamic information received by the server, a modified route to the destination; and downloading the modified route to the client device.

Typically, submitting the request includes sending multiple requests from the client device to the server as the user travels along the route.

There is additionally provided, in accordance with an embodiment of the present invention, a method for displaying a map on a mobile client device, the method including:

storing map data on a server, the map data delineating features in the map;

downloading from the server to the client device a portion of the map data corresponding to a selected area of the map, causing the client device to render and display an image of the selected area of the map;

finding location coordinates of the client device using a location providing device associated with the client device while a user of the client device travels within the selected area;

receiving at the server, while the user travels within the selected area, dynamic information with regard to the area;

downloading the dynamic information to the client device, responsively to the location coordinates of the client device; and displaying the dynamic information on the image of the selected area of the map displayed by the client device, without requiring the client device to render the image again.

In a disclosed embodiment, downloading the dynamic information includes receiving at the server a request from the client device for the dynamic information, the request specifying the location coordinates, and providing the dynamic information to the client device in response to the request, wherein providing the dynamic information includes conveying the dynamic information from the server within four seconds of receiving the request from the client device.

There is further provided, in accordance with an embodiment of the present invention, apparatus for navigation, including:

a mobile client device;

a location providing device, associated with the client device;

a memory; and a mapping server, which is adapted to store map data in the memory, the map data including vector information delineating roads in a map, and to download to the client device a portion of the vector information corresponding to an area in which a user of the client device is traveling, wherein the client device is adapted to find approximate position coordinates of the user using the location providing device, and to correct the approximate position coordinates using the downloaded vector information, so as to determine a location of the user on one of the roads in the map and to provide a navigation aid to the user based on the determined location.

There is moreover provided, in accordance with an embodiment of the present invention, apparatus for navigation, including:

a mobile client device;

a location providing device, which is associated with the client device and is adapted to find location coordinates of the client device;

a memory; and a mapping server, which is adapted to store map data in the memory, the map data delineating features in a map, and which is adapted to determine, based on the map data, a route from a starting point to a destination within an area of the map, the route including a sequence of route segments, and to download the route to the client device, and which is adapted to receive, while a user of the client device travels along the route, dynamic information regarding a change in travel conditions in a vicinity of the route, wherein the client device is adapted to submit a request to the server for updated information regarding the route, the request specifying, based on the downloaded route and the location coordinates, one or more of the route segments not yet traversed by the user, and wherein the server is adapted to determine, based on the route segments specified by the client device and on the dynamic information received by the server, a modified route to the destination, and to download the modified route to the client device.

There is furthermore provided, in accordance with an embodiment of the present invention, apparatus for displaying a map, including:

a mobile client device;

a location providing device, which is associated with the client device and is adapted to find location coordinates of the client device;

a memory; and a mapping server, which is adapted to store map data delineating features in the map, and to download to the client device a portion of the map data corresponding to a selected area of the map, causing the client device to render and display an image of the selected area of the map, the server being further adapted to receive, while a user of the client device travels within the selected area, dynamic information with regard to the area, and to download the dynamic information to the client device, responsively to the location coordinates of the client device, causing the client device to display the dynamic information on the image of the selected area of the map displayed by the client device, without requiring the client device to render the image of the selected area again.

There is also provided, in accordance with an embodiment of the present invention, a computer software product including a computer-readable medium in which program instructions are stored, which instructions, when read by a computer, cause the computer to access map data in a memory, the map data including vector information delineating roads in a map, and to download to a mobile client device a portion of the vector information corresponding to an area in which a user of the client device is traveling, the instructions further causing the computer to download a program to the client device, which causes the client device to find approximate position coordinates of the client device using the location providing device, and to correct the approximate position coordinates using the downloaded vector information, so as to determine a location of the user on one of the roads in the map and to provide a navigation aid to the user based on the determined location.

There is additionally provided, in accordance with an embodiment of the present invention, a computer software product, including a computer-readable medium in which program instructions are stored, which instructions, when read by a computer, cause the computer to access map data in a memory, the map data delineating features in a map, and to determine, based on the map data, a route from a starting point to a destination within an area of the map, the route including a sequence of route segments, and to download the route to a mobile client device, the instructions further causing the computer to receive, while a user of the client device travels along the route, dynamic information regarding a change in travel conditions in a vicinity of the route, the instructions further causing the computer to download a program to the client device, which causes the client device to receive location coordinates of the client device from a location providing device, and to submit a request to the server for updated information regarding the route, the request specifying, based on the downloaded route and the location coordinates, one or more of the route segments not yet traversed by the user, wherein the instructions cause the computer to determine, based on the route segments specified by the client device and on the dynamic information received by the server, a modified route to the destination, and to download the modified route to the client device.

There is further provided, in accordance with an embodiment of the present invention, a computer software product for displaying a map, including a computer-readable medium in which program instructions are stored, which instructions, when read by a computer, cause the computer to access map data delineating features in the map, and to download to a mobile client device a portion of the map data corresponding to a selected area of the map, causing the client device to render and display an image of the selected area of the map, the instructions further causing the computer to receive dynamic information with regard to the area and location coordinates of the client device, while a user of the client device travels within the selected area, and to download the dynamic information to the client device, responsively to the location coordinates, causing the client device to display the dynamic information on the image of the selected area of the map displayed by the client device, without requiring the client device to render the image of the selected area again.

The present invention will be more fully understood from the following detailed description of the embodiments thereof, taken together with the drawings in which:

BRIEF DESCRIPTION OF THE DRAWINGS

FIG. 1 is a simplified pictorial illustration of a real-time map distribution and display system constructed and operative in accordance with an embodiment of the present invention;

FIG. 2A is a simplified pictorial illustration of a real-time map distribution and display system constructed and operative in accordance with another embodiment of the present invention;

FIG. 9 is a block diagram that schematically illustrates data structures used for storing and rendering map data, in accordance with an embodiment of the present invention;

DETAILED DESCRIPTION OF EMBODIMENTS

Figure 2B:
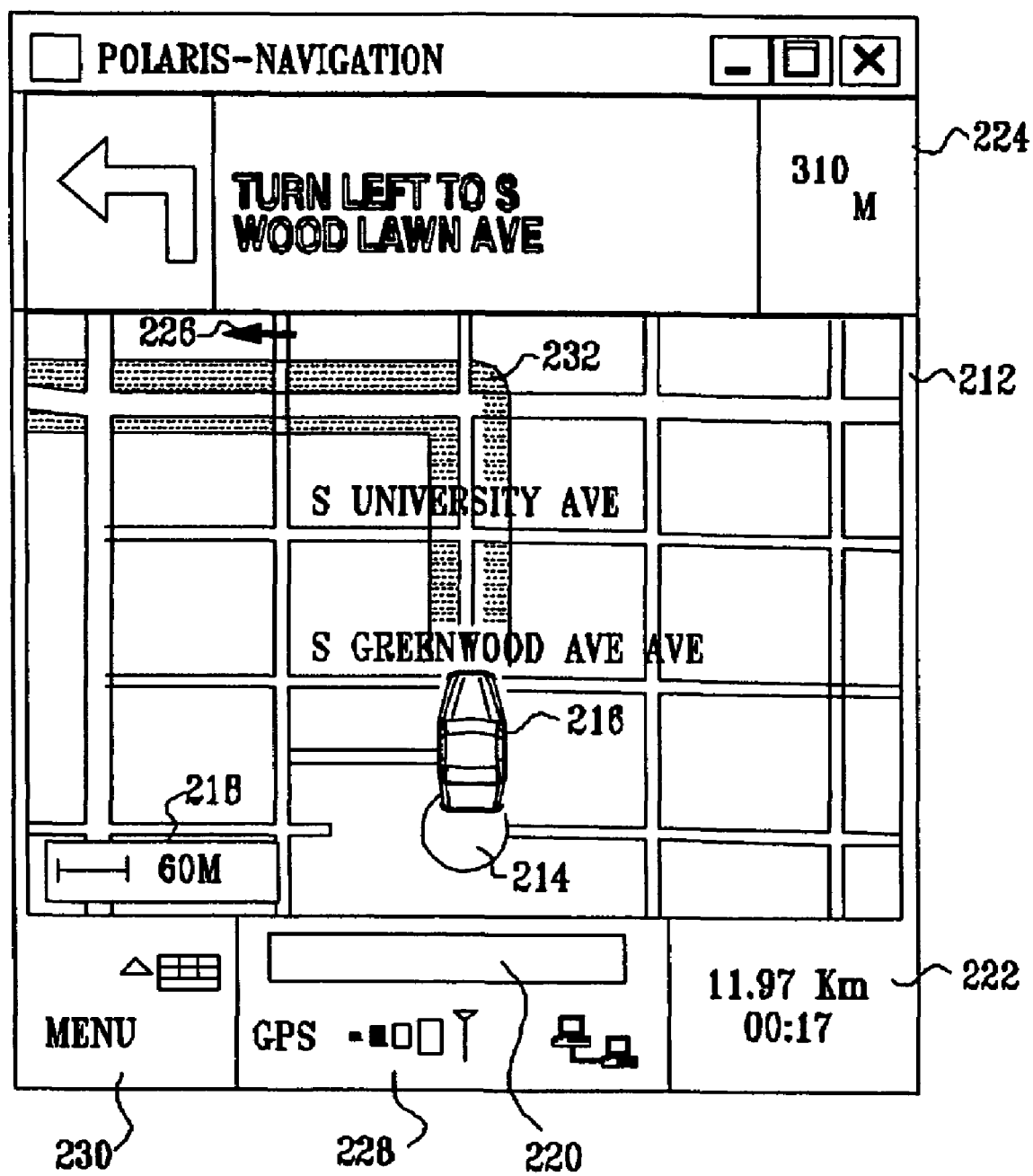
FIGS. 2B–2F are schematic representations of screens displayed on a client device in a vehicle, showing maps and directions generated by the system of FIG. 2A, in accordance with an embodiment of the present invention.

Reference is now made to FIG. 1, which is a simplified pictorial illustration of a real-time map distribution and display system constructed and operative in accordance with an embodiment of the present invention. As seen in FIG. 1, a driver of a vehicle 100 communicates via a wireless communicator, such as a conventional cellular telephone 102, with a interactive voice response (IVR) processor 104 and through IVR 104 via the Internet with a map server 106.

In the illustration, the driver asks directions to the Empire State Building. In real time, preferably within four seconds or less, while driving, the driver receives the requested directions. More preferably, the directions are provided within two seconds, and most preferably, the directions are provided substantially immediately, i.e., within one second. In the illustration, the directions are requested by the driver and provided to the driver orally, typically using speech recognition and speech synthesis tools, as are known in the art. Alternatively or additionally the directions may be requested through a different modality, such as a keyed input to the wireless communicator, which may be sent to server 106 via a text messaging service, such as SMS, or a packet data protocol, such as TCP/IP, as described below. The directions may likewise be provided to telephone 102 by these means or through a different modality, such as a visually sensible map or written instructions. In such case, IVR 104 may be obviated.

In accordance with an embodiment of the invention, the cellular network of which cellular telephone 102 forms a part provides a location determination functionality, supplying a location data output to telephone 102 and/or map server 106 by any suitable data pathway. Alternatively or additionally, a location data output may be provided by a GPS receiver or other locating device (not shown in this figure) mounted in the vehicle. A user may also supply location data via cellular telephone 102.

It is a particular feature of the present invention that driving directions are provided in real time, enabling a driver of a vehicle to request and receive map information, preferably in the form of driving directions, while driving and without interrupting travel. Novel methods enabling such real-time generation of directions, along with downloading and display of concomitant map data, are described in detail hereinbelow.

FIG. 2A is a simplified pictorial illustration of a real-time map distribution and display system constructed and operative in accordance with another embodiment of the present invention. As seen in FIG. 2A, a driver of a vehicle 200 communicates via a wireless communicator, such as a personal digital assistant (PDA) 202 having cellular telephone functionality or a smart cellular telephone, with a map server 206. Optionally, PDA 202 communicates with server 206 via an IVR processor 204 and/or via the Internet. A location data output is provided by a GPS receiver 208 or other locating device in the vehicle, and the location is transmitted automatically by PDA 202 to server 206. Alternatively, a cellular network with which PDA 202 communicates may provide the location data output to server 206, or the user may supply location data via the PDA.

In the illustrated embodiment, the driver asks for current directions and a map showing a route to his workplace, in view of current traffic conditions. In real time, preferably within four seconds or less, the driver receives the requested directions and map showing the currently preferred route. Selection of the route is based on current traffic conditions, which are provided to map server 206 by a traffic server 210. More generally, the map server may receive dynamic input information regarding road conditions and closures, construction, etc., from a number of different sources for use in determining preferred routes. Typically, the dynamic input information is provided as a stream of events from traffic server 210 and other information sources, with geocodes identifying the event locations. Map server 206 receives and sorts the information in order to generate directions to clients such as PDA 202. The map showing the preferred route or routes is then rendered by the PDA on a display 211 by a client program running on the PDA.

In the illustrated embodiment, the directions and map are requested by the driver orally. Alternatively or additionally the directions and map may be requested through a different modality, such as a keyed input to the wireless communicator, which may be conveyed via SMS or a packet data link. The directions and map may similarly be provided through any suitable modality, such as a visually sensible map associated with written instructions. In such cases, IVR 204 may be obviated.

FIGS. 2B–2F are schematic representations of display 211, showing maps displayed by the client program running on PDA 202 in the course of a trip in vehicle 200, in accordance with an embodiment of the present invention. FIG. 2B shows a screen 212 displayed at the beginning of the trip. A circle 214 marks the starting point of the trip, and an icon 216 shows the current position of vehicle 200. Because of limitations in the accuracy of GPS receiver 208, PDA 202 preferably corrects the position coordinates provided by the receiver to show the true location of vehicle 200 relative to the map displayed on the telephone. The correction is meant to place the vehicle icon on the road on which the vehicle is actually traveling, based on the locations and characteristics of roads on the map and on the computed trajectory of motion of the vehicle over time.

The route provided by map server 206 is marked by highlighting 232. A scale window 218 shows the scale of the current map. This scale is preferably determined based on the distance of vehicle 200 from the next turn in the route itinerary. A compass arrow 226 shows the north direction. In the "navigation" mode of operation illustrated by FIGS. 2B–2E, the map displayed on screen 212 is oriented so that the heading of vehicle 200 is roughly aligned with the upward direction on the map.

Preferably, as described in greater detail hereinbelow, map server 206 precomputes the zoom factor and orientation of the map segments to be supplied to PDA 202 along the route of travel of vehicle 200. Alternatively or additionally, the map orientation and zoom may be selected by the user of PDA 202. The server then supplies map data to PDA 202, typically in vector form, with the proper rotation angle for the expected direction of travel and with the appropriate level of detail for the expected zoom factor (or with alternative orientation and zoom levels selected by the user). An anti-aliasing process may also be applied to smooth the lines appearing in the map, in order to avoid jagged edges and other image artifacts that may appear due to the low resolution of the client display. Client devices such as PDA 202 are thus able to render the maps rapidly and efficiently, despite the generally low computing power and memory size of such devices, since there is no need for the client device to perform substantial image rotation or zoom computations. Alternatively or additionally, particularly when using client devices with enhanced computing power, such as laptop computers, at least some of the rotation and zoom operations may be performed by the client device.

Screen 212 also includes a number of other navigation aids. For example, in the illustrated embodiment, a trip meter shows the relative distance that vehicle 200 has traversed on the current route, and a trip counter 222 shows the distance to the destination and the elapsed travel time. A navigation window 224 shows the next maneuver to be performed along the route and the distance to the intersection at which the maneuver will be required. PDA 202 monitors this distance as the vehicle progresses, and may use speech synthesis to provide audible instructions to the driver at certain preset distances or time intervals before the vehicle reaches each maneuver location. The PDA is able to determine the appropriate time intervals by monitoring the location and speed of the vehicle.

A status window 228 shows status information, such as the strength of the GPS signal at a GPS receiver used by PDA 202, and the status of the network connection between PDA 202 and map server 206. If the GPS signal is lost, the PDA still attempts to extrapolate the position of the vehicle along the route for as long as is reasonable, and to display icon 216 accordingly. Similarly, even when the network connection is lost, the PDA may still provide the user with instructions and map displays, based on the current position of vehicle 200 and on map data that the PDA received earlier from server 206. As long as there is a connection between the PDA and the server, the PDA continues to download the map data, while discarding old data from its memory, so that the PDA can continue displaying maps and navigation instructions continuously for as long as possible in the event of a communication failure. The coordinates of the map data to be downloaded and the amount of such data to request are determined by PDA 202 based on the position and speed of vehicle 200 and the memory capacity of the PDA.

A menu control 230 enables the user of PDA 202 to access menu functions, in order to set preferences and input information, such as route destinations and requests. These functions are described in greater detail hereinbelow.

Figure 2C:
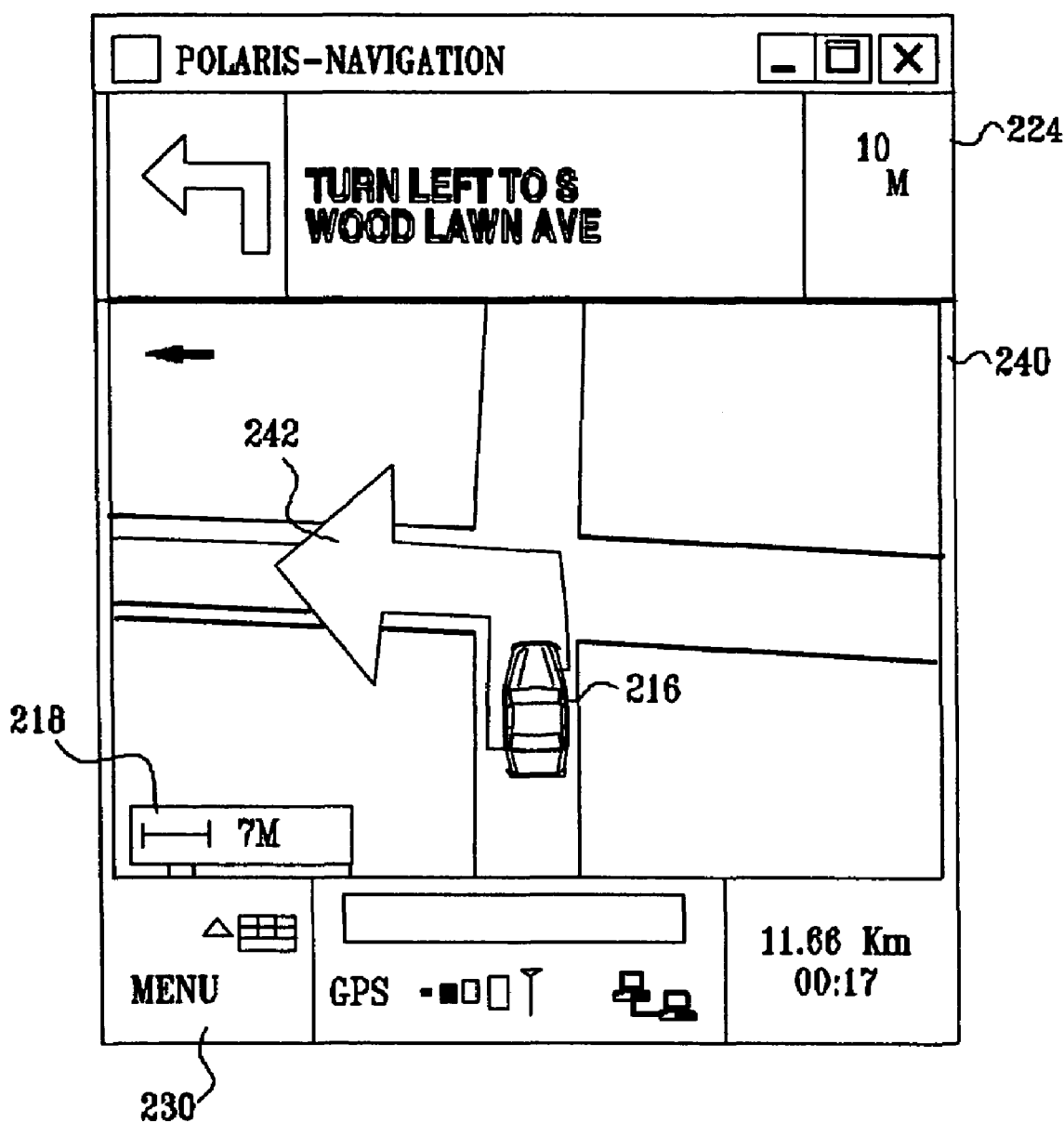

FIG. 2C illustrates a maneuver screen 240 that is shown on display 211 as vehicle 200 comes into an intersection in which it is to make its next maneuver along the route supplied by server 206. Screen 240 is typically based on a special maneuver map of the intersection, which is prepared in advance by the server and is downloaded to PDA 202 in advance. The scale of screen 240 is zoomed to high magnification, and the roads entering and leaving the intersection are highlighted for contrast. Other details may be deleted from the maneuver map in order to reduce visual clutter and distractions. A highlight arrow 242 points the direction of the maneuver that the vehicle is required to make. The arrow is preferably drawn by taking the actual sequence of line segments (known as a "polyline") representing the navigation route, cropping it to fit within the outlines of the intersection, and then adding an arrowhead at its forward end. PDA 202 zooms into this magnified view automatically when the vehicle is within a certain range of the intersection, and zooms out again immediately after the maneuver is completed. Typically, the PDA also uses speech synthesis to provide audible instructions before and during the time the vehicle is in the intersection.

Figure 2D:
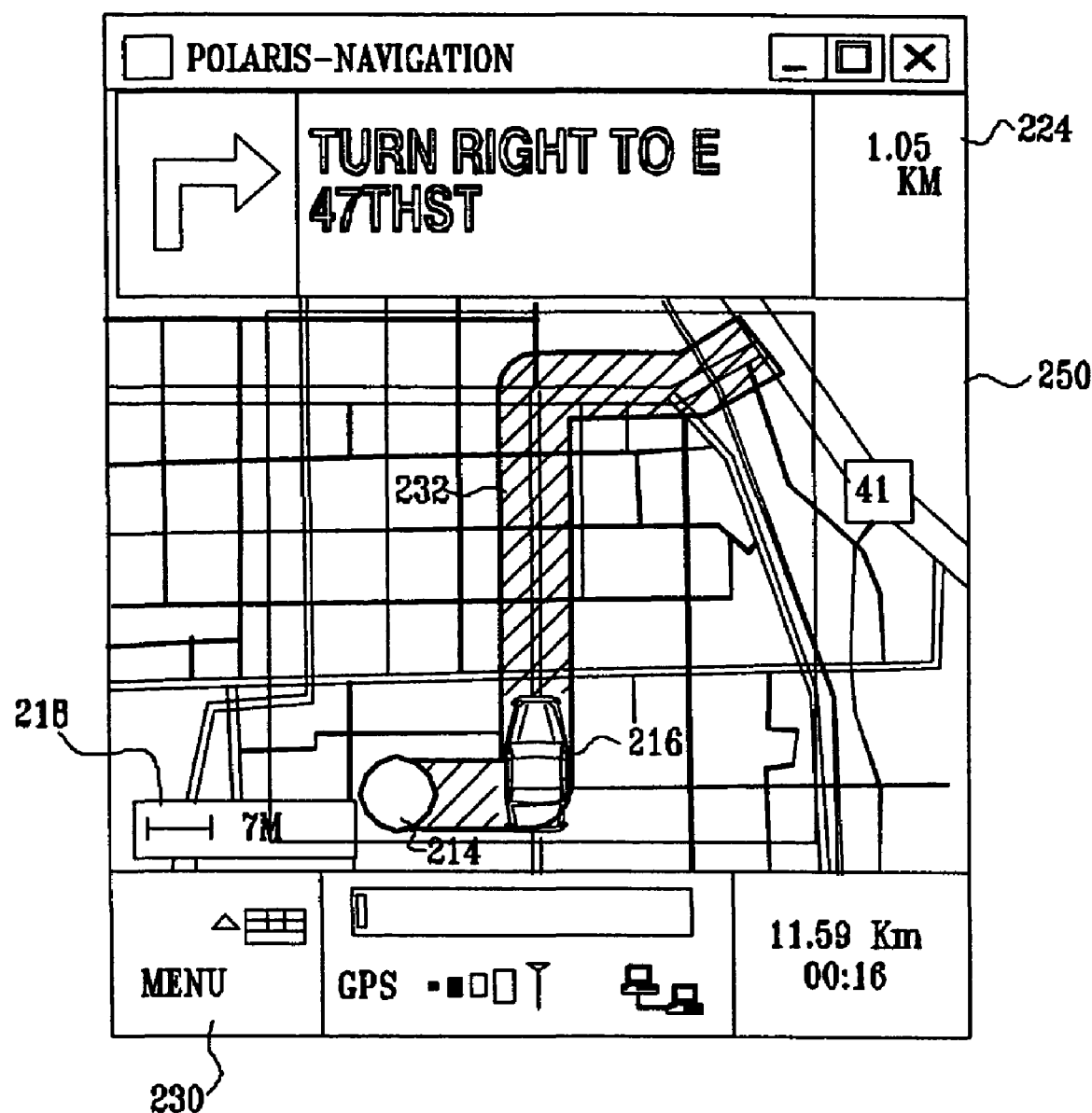

FIG. 2D illustrates another screen 250, which is shown on display 211 after vehicle 200 has made the turn required by screen 240. The map orientation has been rotated automatically to correspond to the new direction of travel of the vehicle, and the scale has been zoomed out to show both the current vehicle location and the intersection at which the next maneuver is to be made. In other words, for each segment of the route, a different zoom level may be determined, based on the length of the segment, as well as other parameters supplied by PDA 202 and/or server 206. Icon 216 is generated by PDA 202 locally and is superimposed on the map that the PDA renders based on the map data from server 206.

Figure 2E:
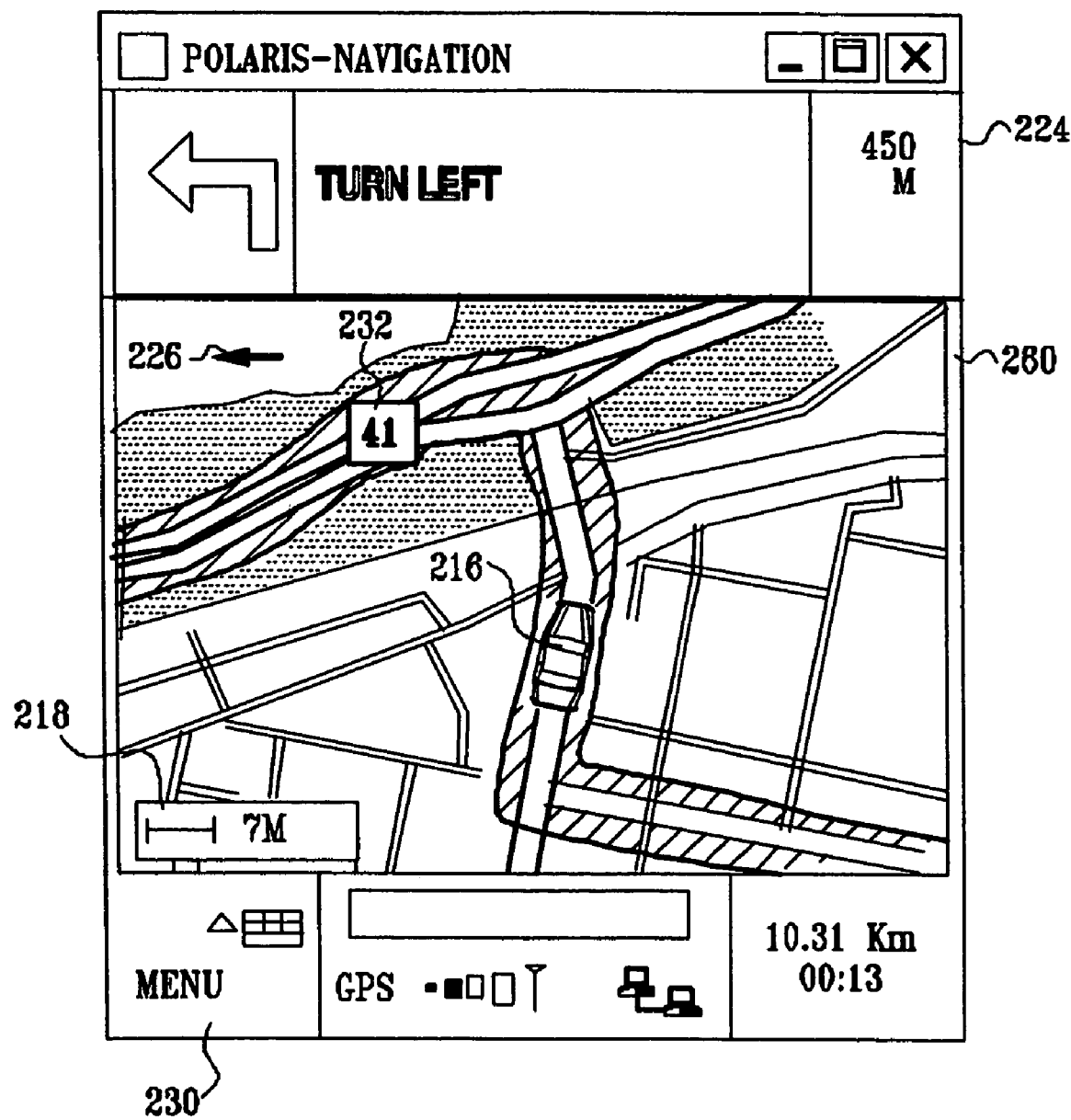

FIG. 2E illustrates a subsequent screen 260 that is shown on display 211, following the next maneuver along the vehicle route. The map direction is again rotated. In this case, the road on which the vehicle is currently traveling does not follow a straight line (as the previous route sections did), but rather comprises a curve. The curve is typically represented in the geographical database of server 206 as a polyline, made up of a sequence of line segments of different lengths and orientations. The polyline is smoothed for display on screen 260, based on the zoom factor and resolution of display 211. The rotation angle of the map in screen 260 is typically determined by server 206 based on the angle between the next maneuver point on the route and the preceding maneuver point.

Figure 2F:
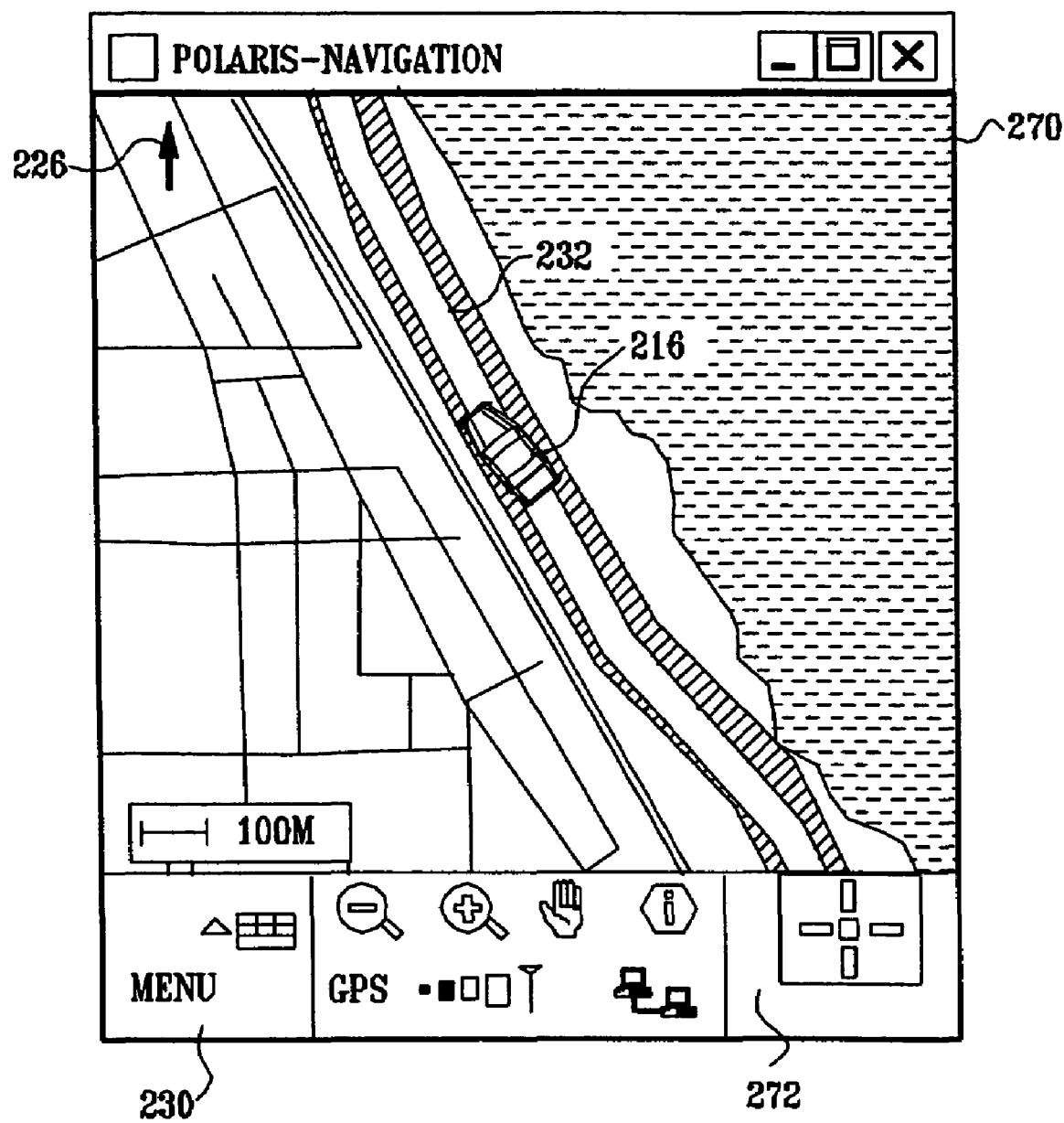

FIG. 2F illustrates a mapping screen 270 that may be shown on display 211, in place of the navigation screens shown in FIGS. 2B–2E. This mapping view of the route may be selected by the user of PDA 202 by invoking an appropriate menu item. In the mapping mode, the user is able to select the map zoom and, optionally, the map view area and orientation, using map controls 272. Unless otherwise directed by the user, PDA 202 locates and scrolls the map so that icon 216 representing the actual position of vehicle 200 remains at the center of the screen.

Figure 3:
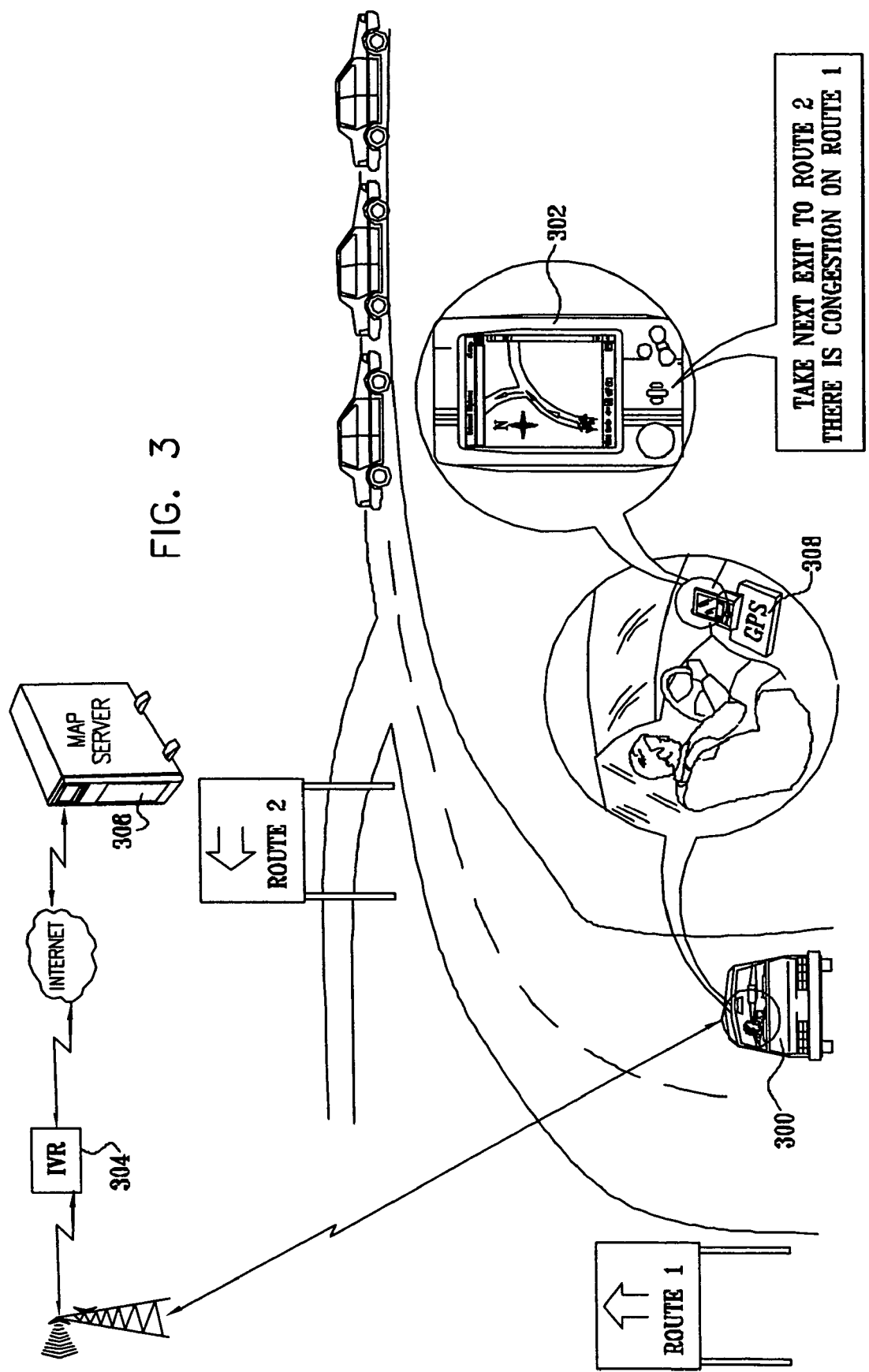
FIGS. 3–6 are simplified pictorial illustrations of real-time map distribution and display systems constructed and operative in accordance with further embodiments of the present invention.

FIG. 3 is a simplified pictorial illustration of a real-time map distribution and display system constructed and operative in accordance with yet another embodiment of the present invention. As seen in this figure, a driver of a vehicle 300 communicates with a map server 306 on the Internet via a wireless communicator such as a personal digital assistant (PDA) having cellular telephone functionality, or a smart cellular telephone 302. Optionally, such communication may involve an IVR 304. A location data output is provided by a GPS receiver 308 or other locating device mounted in the vehicle, and the location is transmitted automatically by telephone 302 to server 306. Alternatively, the cellular network of which the cellular telephone forms a part may provide the location data output to server 306, or the user may supply location data via the cellular telephone.

In the illustrated embodiment, while driving, either with or without driver initiative, the driver receives, in real time, current driving directions and a map showing a route to his destination in view of changed traffic conditions, including real-time proposed changes to that route. Typically, telephone 302 automatically queries server 306 periodically, to ask for dynamic road conditions, such as traffic along or around the current route, and to receive possible route changes in view of dynamic conditions. For this purpose, it is convenient for the telephone to maintain a continuous connection with server 306 over the cellular network (using a GPRS link, for example), so that it is not necessary to place a new call for every query. Alternatively, SMS messaging between the telephone and the server may be used. Further alternatively, server 306 may track the location of vehicle 300 along its route, and may thus provide dynamic updates to telephone 302 automatically, without waiting for a query from the client.

As described above, the directions and map are pushed to the driver, wherein graphical icons may be drawn on the map to indicate the recommended route, turn by turn. Preferably, the directions and maps are provided to the driver within four seconds or less of each query from telephone 302 and are displayed on a display screen of the telephone. Alternatively or additionally, the directions may be provided and updated orally. It is a particular feature of the present invention that driving directions and maps are provided in real time, enabling a driver of a vehicle to receive changes in driving directions and maps without delay.

Figure 4:
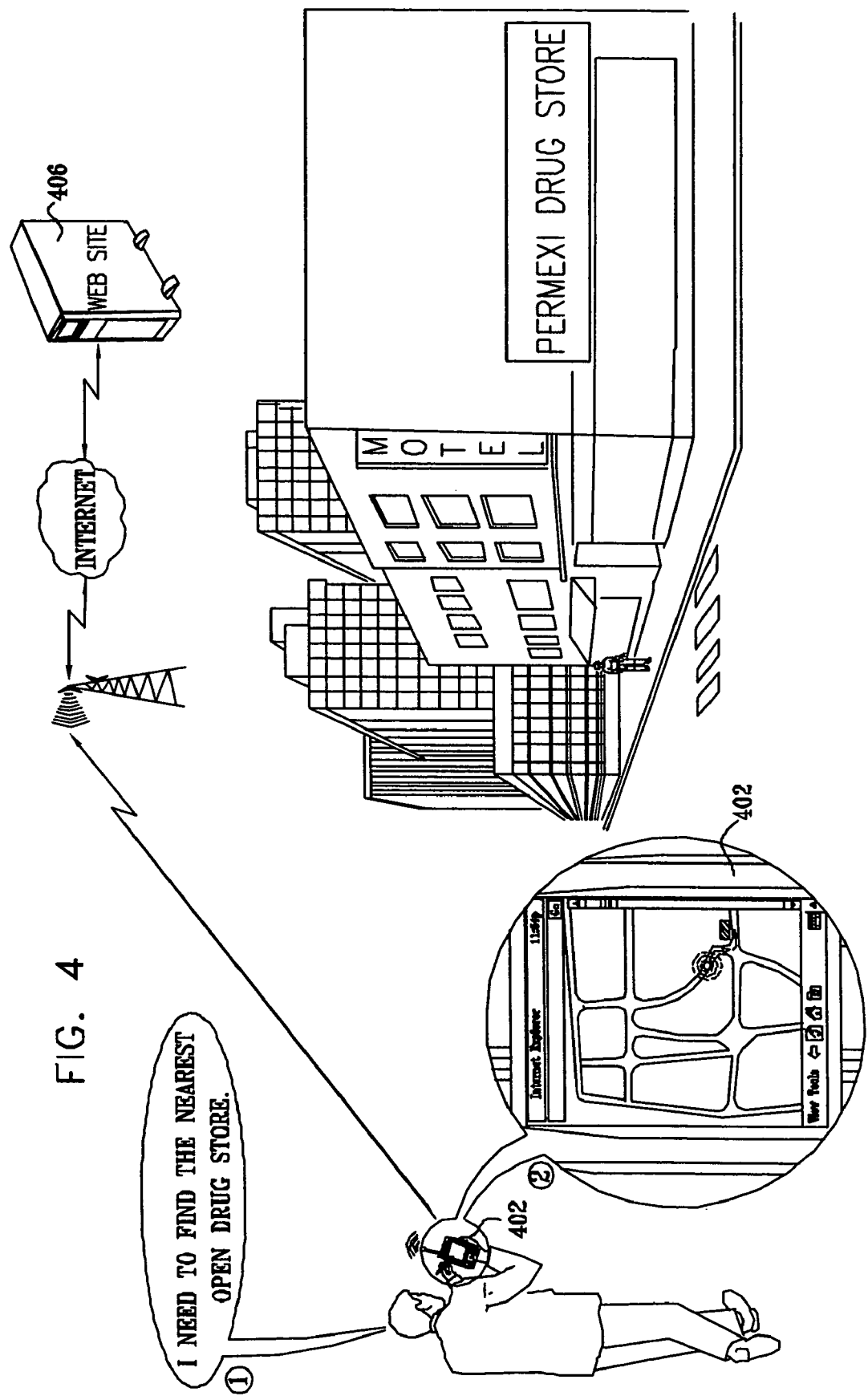

Reference is now made to FIG. 4, which is a simplified pictorial illustration of a real-time map distribution and display system constructed and operative in accordance with still another embodiment of the present invention. In this case, a pedestrian communicates with a map server 406 on the Internet via a wireless communicator 402, such as a personal digital assistant (PDA) having cellular telephone functionality, or a smart cellular telephone. The pedestrian requests directions regarding the location of a point of interest (POI) of a particular type, in this case, a drugstore, either by voice input to communicator 402 or by manual key-in, using a stylus to select or write the type of directions required.

The cellular network through which communicator 402 communicates with map server 406 may provide a location determination functionality, which supplies location coordinates of the pedestrian to the map server. Alternatively or additionally, a location data output may be provided by a GPS or other locating device associated with or connected to the communicator. Further alternatively, the pedestrian may also supply location data via the communicator.

Based on the location data, map server 406 locates the nearest POI of the selected type, or several such POIs in proximity to the pedestrian's location. In the latter case, the user may select one of the POIs by input to communicator 402. The server returns the location of the selected POI (i.e., of the drugstore, in the present example), along with navigation instructions, which tell the pedestrian how to reach the POI. Typically, server 406 also pushes a map to communicator 402, showing the location of the POI and the present location of the pedestrian, with arrows pointing the way to the POI. The map in this case may also show pedestrian walkways, as well as features such as bus and subway connections, unlike the driving maps shown in the preceding embodiments. Note also that while driving maps and route computations take driving restrictions, such as one-way streets, into account, there is no need for pedestrian maps to do so.

Figure 5:
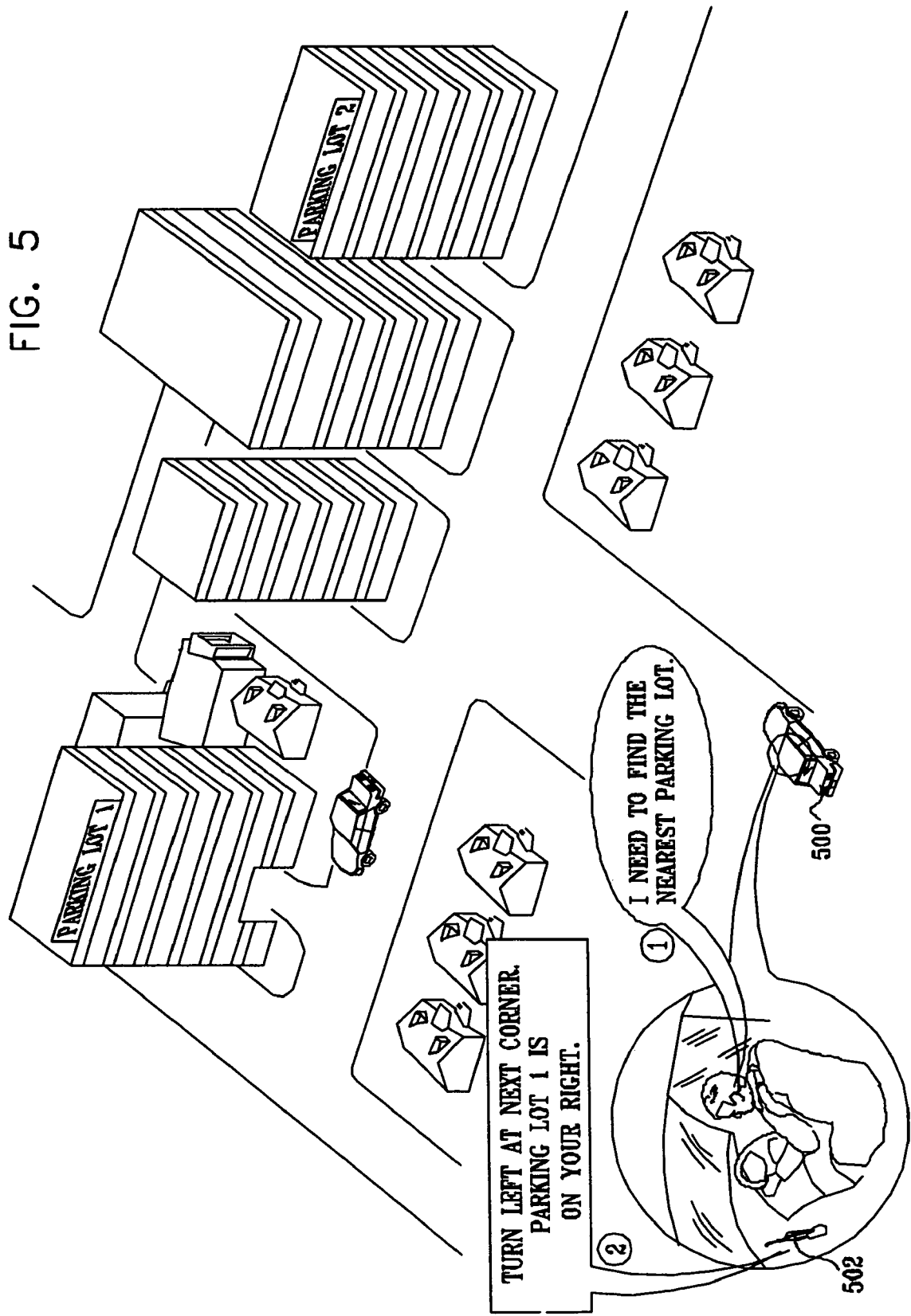

FIG. 5 is a simplified pictorial illustration of a real-time map distribution and display system constructed and operative in accordance with a further embodiment of the present invention. In this embodiment, the driver of a vehicle 500 communicates via a cellular telephone 502 with a mapping server, as shown in the preceding figures. As in the embodiment of FIG. 4, the driver asks for directions to a POI, in this case a parking lot, and specifies that he wishes to be directed to the nearest POI of this type. The mapping server selects the nearest parking lot from its database (taking into account traffic restrictions, as well, such as one-way streets), and returns driving directions to telephone 502. A map showing the location of the specified POI may also be pushed to the display of the telephone.

Figure 6:
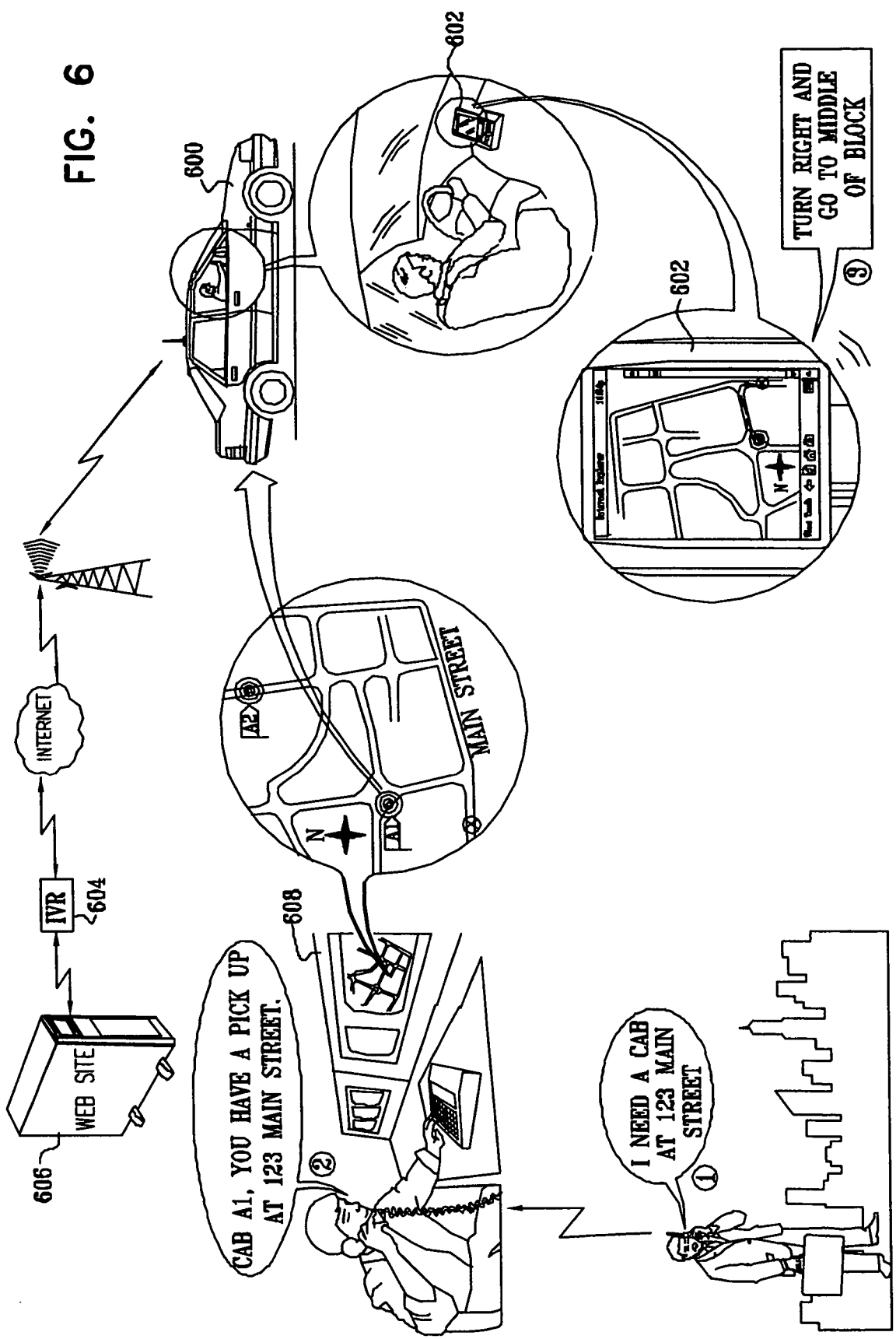

FIG. 6 is a simplified pictorial illustration of a real-time map distribution and display system constructed and operative in accordance with yet a further embodiment of the present invention. In this embodiment, a provider of mobile services, such as a taxi company, uses a Web site 606 to track the locations of its cabs. Cab locations are displayed on a console 608 in the fleet office of the taxi company. One driver in a cab 600 is shown in the figure, with a mobile communicator 602 for exchanging location data, directions and maps, with Web site 606 via a cellular communication network. An IVR 604 may be used to enable the driver to interact with the Web site by hands-free voice communications. Web site 606 receives the current location of cab 600 and of other cabs in the fleet, based either on a GPS in the cab or on location-finding services of the cellular network, and conveys the information to console 608.

When a passenger calls the taxi company to request a cab, the dispatcher uses the location information provided by console 608 to locate and select a taxi, such as cab 600. Typically, the nearest available taxi to the passenger location is selected. The selection may be made automatically by console 608, based on the passenger location, taxi locations, and other factors, or it may be input manually by the dispatcher. Console 608 then sends a message via the cellular network to communicator 602, instructing the driver of cab 600 that he has a pickup to make at a certain location. Communicator 602 may request navigation instructions from the current location of cab 600 to the pickup location and how to get there. A mapping server on Web site 606 generates and sends the instructions. A map showing the passenger location and the preferred route to the location may also be displayed by the communicator. Dynamic information on traffic and other road conditions may be taken into account, as described above, in selecting the route to be taken to the passenger location, as well as the route for conveying the passenger to his destination.

Although this embodiment shows the integration of location finding and navigation in one particular application—taxi fleet management—it will be understood that the principles of the present invention may similarly be applied to other fleet management applications and to provision of other types of mobile services.

Figure 7:
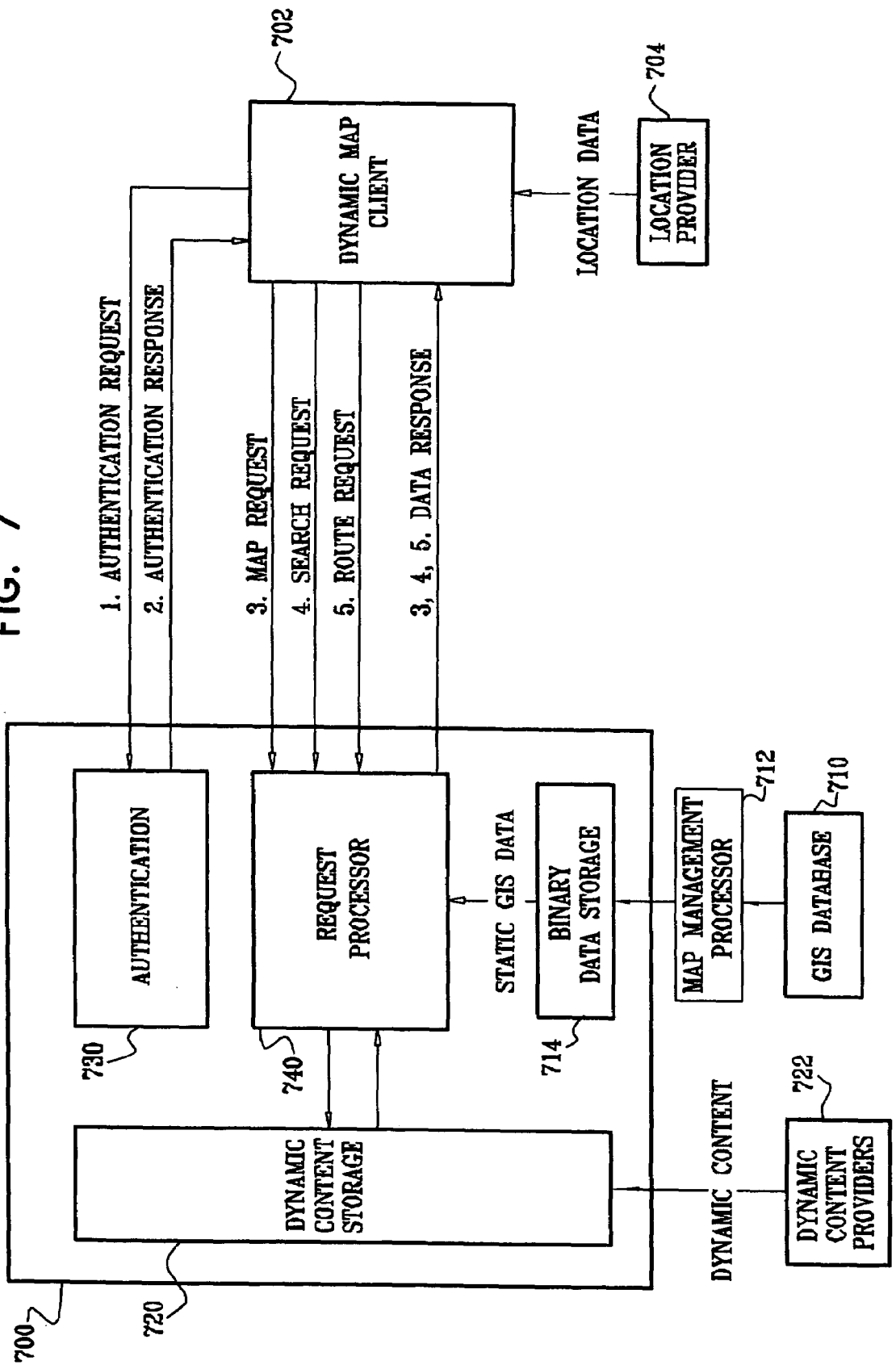
FIG. 7 is a simplified functional block diagram of a real-time map distribution and display system, in accordance with an embodiment of the present invention.

FIG. 7 is a simplified functional block diagram of a real-time map distribution and display system constructed and operative in accordance with an embodiment of the present invention. As seen in FIG. 7, a client-server type of arrangement is provided, wherein a dynamic mapping server 700 communicates with a dynamic map client 702. Server 700 typically comprises a general-purpose computer, or a group of computers, with suitable software for carrying out the functions described hereinbelow. This software may be provided to the server in electronic form, over a network, for example, or it may alternatively be provided on tangible media, such as CD-ROM.

Server 700 comprises a dynamic content storage subsystem 720, which receives dynamic content from dynamic content providers 722. Examples of dynamic content providers include real-time traffic data providers, such as Traffic Master Ltd. of the U.K.; restaurant surveys, such as Zagat; and movie schedule services, such as Time Out of the U.K. The dynamic content typically changes in real time. For example, dynamic traffic data provide information on traffic jams at given intersections or on given roads as they occur. Movie and restaurant data are current but clearly do not change as rapidly as does traffic data. The dynamic traffic data are typically supplied by providers 722 via an agreed protocol, such as the Alert C protocol, commercially available from Traffic Master Ltd. of the U.K. The restaurant and movie data may be provided in a conventional XML format or in any other suitable format.

Static Geographical Information Systems (GIS) data, such as map data, which are generally not dynamic, are supplied to a map management processor 712 from a GIS database 710, provided by a GIS data provider, such as Navigation Technologies Inc. (Chicago, Ill.) or Tele Atlas North America (Menlo Park, Calif.). The GIS data are typically supplied in a relational database format to map management processor 712, which converts the data to a binary format used by server 700 and stores the converted data in a binary data storage subsystem 714. Subsystems 714 and 720 typically comprise high-capacity hard disk drives for storing the static and dynamic data, respectively.

Map management processor 712 is typically operative, inter alia, to receive GIS data in various formats from different GIS data providers and to process the data into a uniform format for storage by storage subsystem 714. Normally, the GIS data stored in GIS database 710 are highly detailed, and the map management processor is operative to generalize this data so as to reduce the bandwidth requirements for transmittal thereof.

Client devices, such as the cellular telephones, PDAs and other communicators shown in the preceding figures, use client 702 to communicate with server 700 and provide information to users. Client 702 typically comprises an applet written in the Java™ language, but may alternatively comprise other suitable client programs, such as ActiveX™ or C Sharp™ clients, and may run on substantially any stationary or portable computer or on any suitable communicator. Typically, when a client device connects to server 700 for the first time, the applet (or other client program) is downloaded to the client device and starts to run. The client program is preferably stored in the memory of the client device, so that the next time the client device connects to the server, it is not necessary to download the program again.

When client 702 initiates a new connection with server 700, the version number of the client program is checked against the latest version of the program held on the server. If there is a new version of the client program on the server, it is downloaded automatically to the client device and replaces the older version held in client memory. Typically, only the classes or other resources that have been changed in the new version need to be downloaded, rather than the entire new version of the client software. When the client connection to the server is terminated, map data that were downloaded to the client may be erased from the client memory, but map rendering templates, as described below, are preferably stored in the client memory for reuse during subsequent connections.

Client 702 typically receives location data from a location providing device 704, such as a GPS receiver (as shown in the preceding figures) or any other service that provides location coordinates of the device in real time. Examples of such services are cellular telephone functionalities that indicate the location of a telephone by triangulation, and voice- and/or data-responsive services that provide location coordinates in response to user-provided information. Such user-provided information may be spoken or written in any conventional manner.

Typically, upon initiation of operation, dynamic map client 702 initiates an authentication handshake with an authentication functionality 730 of server 700. Following authentication, client 702 may submit one or more of the following requests to server 700:

Map requests.
Search requests.
Route requests.
Topology (road data) requests.
Requests for ancillary information, such as templates.

In a typical interaction, client 702 requests and then caches the appropriate template from server 700. The client may then perform a search, for a city, street, address or point of interest, for example. (The search may use approximate matching of the client query string, as described below, so that the server returns search results while the user is entering the string on the client device.) When the search destination is found, client 702 may request the geocode of the destination and vector data required to show the area of the destination and/or a route to the destination.

The client requests and server responses are typically transmitted over a wireless network, such as a cellular network, with which the client device communicates. Alternatively or additionally, the client device may communicate with the server through a wireline network, such as the Internet. The requests and responses are typically conveyed using communication protocols known in the art, such as TCP/IP and HTTP.

A request processor 740 handles client requests. For this purpose, processor 740 accesses GIS data from binary data storage subsystem 714, as well as dynamic information from dynamic content storage subsystem 720. Processor 740 computes and sends a response to client 702 in real time, typically within 4 sec of receiving the request, and preferably within 2 sec or even 1 sec of the request. The response comprises vector and textual data, including information such as navigation instructions, route polylines and traffic conditions. These data are typically used by client 702 in providing instructions to the user and rendering a map image, using a template or templates that the client has previously received and cached. Additionally or alternatively, processor 740 may generate and download images to client 702, such as bitmap images.

Details of the data structures, computer programs (server and client) and protocols used by server 700 and client 702 are shown in the figures that follow.

Figure 8A:
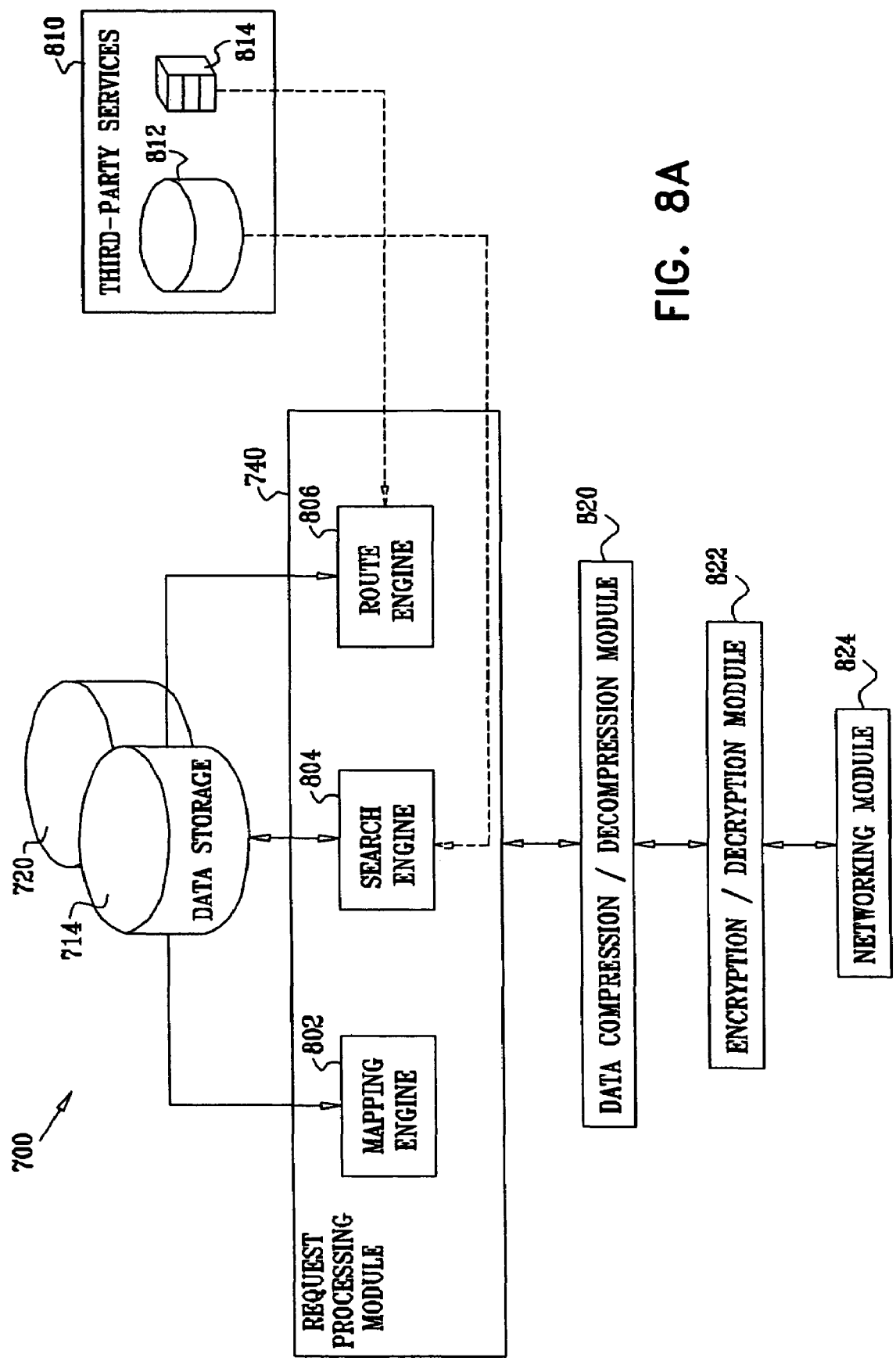
FIG. 8A is a block diagram that schematically shows details of a mapping server, in accordance with an embodiment of the present invention.

FIG. 8A is a block diagram that schematically shows details of server 700, in accordance with an embodiment of the present invention. For the sake of conceptual clarity, the server is shown here to comprise certain functional blocks. This functional structure, however, does not necessarily correspond to any physical separation of the functions shown in the figure. Rather, the functional blocks shown in the figure correspond to software modules, which may run on the same processor or on separate processors.

Request processor 740 comprises several components:

A mapping engine 802 receives and serves map requests from and on behalf of client 702. In other words, in response to a request to provide a map of a given geographical area, with a given zoom level and orientation and certain types of features, engine 802 retrieves the required information from storage subsystems 714 and 720, and then filters and formats the map data in suitable form for provision to the client. The map request may be generated directly by the user of the client device, but it is more commonly generated automatically by client 702 as an adjunct to a search or route request.

A search engine 804 receives and serves requests from the client to locate a certain geographical feature, such as a city, street, building address or POI. Upon locating the desired feature, the search engine provides the coordinates of the feature to client 702. The client may then request a map showing the location of the feature and/or navigation instructions to the location.

A route engine 806 receives and serves requests from the client to provide navigation instructions from a given starting point (typically the current location of the client) to a destination, with possible interim stopping points along the way.

Details of the processes of map generation, searching and route generation are described hereinbelow.

As noted above, server 700 may use data from third-party services 810 in servicing client requests. For example, search engine 804 may access a third-party geocode database 812 in order to determine geocodes (map coordinates) of given cities, streets and other geographical features. Route engine 806 may use a third-party routing server 814 as an alternative or adjunct to performing its own route computations. Third-party services 810 may also include dynamic content providers 722, as shown in FIG. 7.

Request processor 740 generates map data and routing directions in the form of vectorial data and text labels. A data compression and decompression module 820 converts the output of processor 740 into a compressed binary form, to minimize the bandwidth consumed by transmission of the data from server 700 to client 702. An encryption and decryption module 822 encrypts the data for transmission to client 702, for purposes of data security. Request messages from client 702 to server 700 are likewise compressed and encrypted, and are decrypted and decompressed by modules 822 and 820. A networking module 824 assembles the data into packets for transmission to client 702, typically TCP/IP packets, and handles the required networking protocol functions, as is known in the art.

Figure 8B:
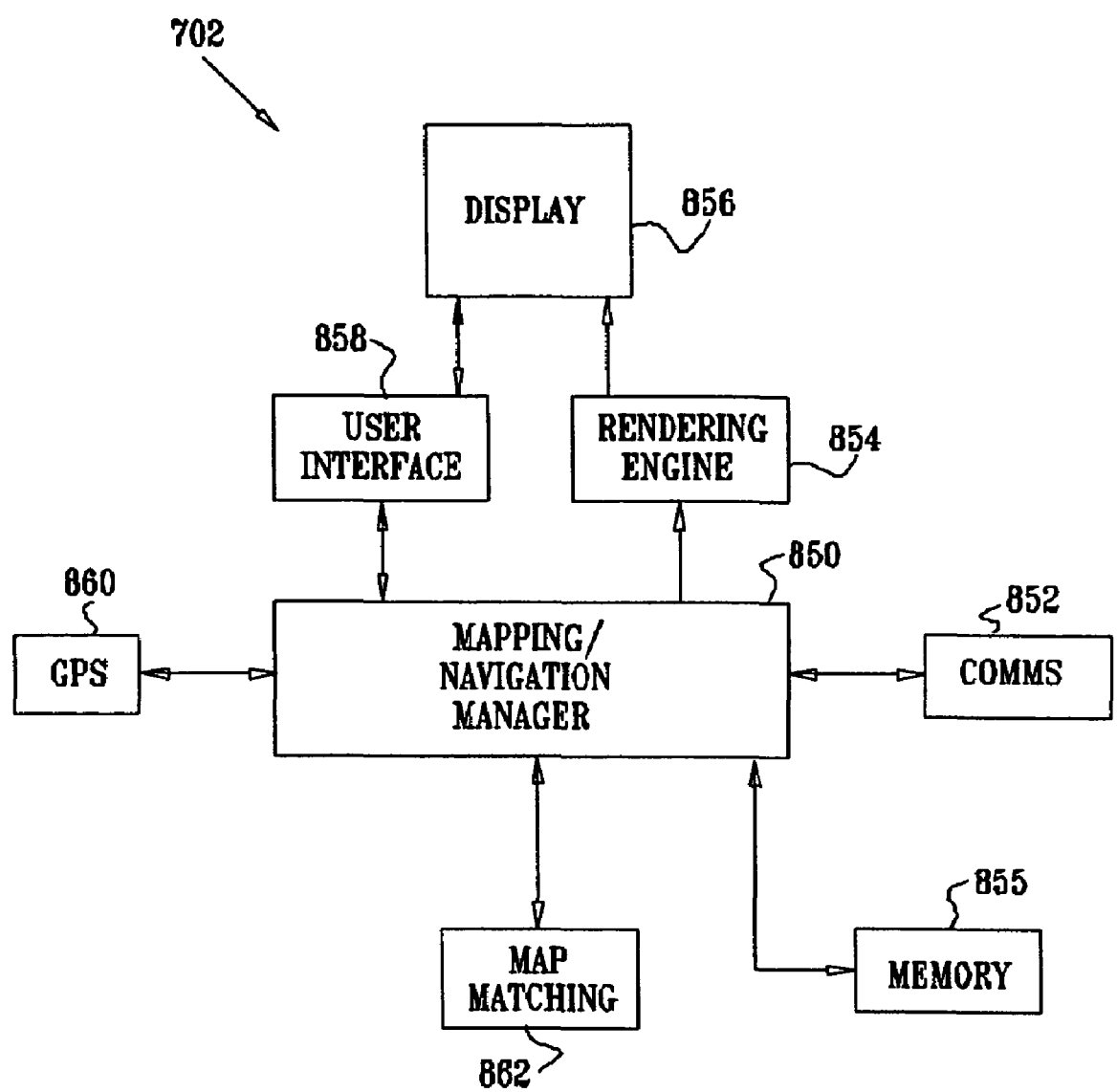
FIG. 8B is a block diagram that schematically shows details of a mapping client, in accordance with an embodiment of the present invention.

FIG. 8B is a block diagram that schematically shows details of client 702, in accordance with an embodiment of the present invention. The functional blocks of client 702 do not necessarily correspond to any physical division of components within the client device and may simply be implemented as software modules in a program running on a microprocessor in the client device. The core mapping and navigation functions of client 702 are carried out by a mapping and navigation manager 850, which submits requests to server 700 and receives responses from the server via a communication interface 852. This interface performs networking, encryption/decryption and compression/decompression functions that are parallel to the comparable server functions described above. Manager 850 receives vector map data from server 700, along with text data for map labels, and formats the vector and text data for rendering by a rendering engine 854. The data are formatted in accordance with templates, as described below, which dictate the visual properties of the map features. The templates are also downloaded from server 700 and are held by manager 850 in a memory 855. Rendering engine 854 renders the maps to a display 856.

Manager 850 controls a user interface 858, which interacts with the user of client 702 via display 856 and via user-operated input devices (not shown in this figure), such as a keypad or touch screen. The user interface may also generate audio outputs and/or receive voice inputs from the user.

Manager 850 periodically receives location coordinates of the client device from a location providing device 860, such as a GPS receiver. A map matcher 862 processes and corrects the location coordinates in order to register the location of the client correctly with a road on the map that is shown on display 856. The map matcher corrects for inaccuracies in the coordinates received from device 860. For this purpose, the map matcher compares the current location coordinates with readings taken in the recent past, and thus estimates the heading and speed of the vehicle in which the client device is located. This information is compared to the topology of the roads in the vicinity of the client device, along which the vehicle may be traveling, in order to assign a probability score to each possible path that the vehicle may have taken. The map matcher selects the most probable path, and then corrects the current location coordinate to the nearest location on the selected path.

Manager 850 receives the corrected coordinates from map matcher 862. It typically instructs rendering engine 854 to superimpose an icon representing the vehicle (such as icon 216) at the corresponding location on the map that is currently shown on display 856. Since the location and icon are generated locally, within client 702, the map can be updated efficiently, without any need to refresh the entire map. Updating of the location coordinates and map can thus continue even when communications with server 700 are lost. Furthermore, manager 850 can use the updated location information provided by map matcher 862 to detect navigation errors by the driver of the vehicle and to generate driving instructions to get the vehicle back on route.

FIG. 9 is a block diagram that schematically illustrates data structures used by server 700 in preparing and delivering map data to client 702, in accordance with an embodiment of the present invention. Map data 900 are arranged in layers 912, each layer corresponding to a different type of map feature. The layers define the shapes and locations of the features, in vectorial form, and typically include textual labels, as well. One or more of layers 912 may also comprise dynamic data, such as traffic conditions.

The actual appearance of the map features in maps rendered by client 702 is defined by visualization data 910. The visualization data comprise a template 914 corresponding to each layer 912. The templates define the visual properties associated with the map features in each layer, such as colors, line thickness, and whether or not to display a label for each feature. The visual properties defined by the templates depend on the zoom level of the map that is to be displayed by client 702, with different templates provided for different zoom levels. Further aspects of templates 914 are described below.

Typically, server 700 holds multiple templates 914 for each layer 912, and downloads the appropriate templates to client 702 depending on the hardware capabilities of the client and the viewing conditions. The collection of templates used to render multiple layers on a given client device may be treated as a single multi-template. Since the same templates are used in displaying maps of different geographical areas, client 702 may store the templates in its local memory 855, so that the templates need be downloaded to the client only once to display multiple different maps. Each template is optimized for different display types and conditions on client 702, for example:

Different templates may be defined for different types of client displays, such as color or monochrome displays, and different display resolutions. Thus, a cellular telephone with a small monochrome display will receive one set of templates, while a PDA or portable computer with a large color display will receive another.

Different templates may be used for day and night viewing on the same client device, in order to improve the visibility of the maps as they appear on the display screen in the vehicle and to facilitate navigation.

Figure 10A:
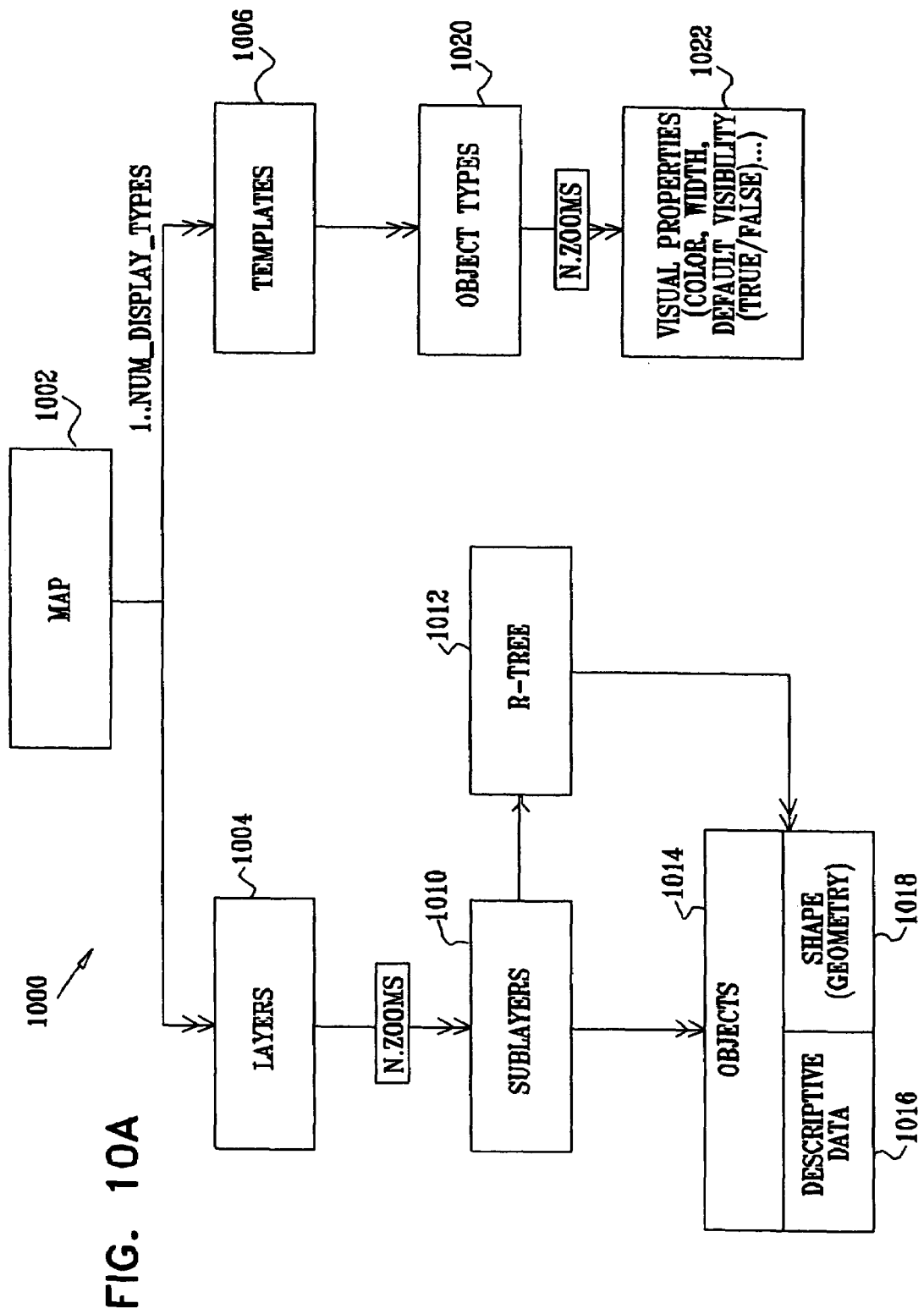
FIG. 10A is a block diagram that schematically illustrates further details of the data structures shown in FIG. 9, in accordance with an embodiment of the present invention.

FIG. 10A is a block diagram that schematically shows further details of a data structure 1000 used in preparing and storing a map 1002 on server 700, in accordance with an embodiment of the present invention. Map 1002 comprises multiple layers 1004, as described above, each layer containing data regarding image features in a particular category. Each category may include features of different types. For example, a "roads" layer may comprise sublayers for major highways, secondary highways, main roads, local streets, paths, etc. (Thus, the term "road" as used in the context of the present patent application and in the claims includes not only to vehicle roads, but also any sort of path that may be used by non-motorized or even non-vehicular traffic.) Each layer 1004 typically comprises multiple sublayers 1010, corresponding to different zoom levels at which the objects in the layer are to be displayed. The zoom level of each sublayer determines the level of detail to be used in representing the features in the sublayer. By removing unnecessary detail in advance, the volume of data that must be downloaded to client 702 to display a certain map at a given zoom level is reduced.

Each sublayer 1010 comprises multiple objects 1014 that fall within the category of the corresponding layer. Each object 1014 is identified by geographical location coordinates, which are typically given in an R-Tree hierarchical index 1012, which divides the two-dimensional geographical space into a set of hierarchically-nested (and possibly overlapping) boxes, as is known in the art. R-Tree is described, for example, by Beckmann et al., in "The R*-Tree: An Efficient and Robust Access Method for Points and Rectangles," *Proceedings of ACM SIGMOD International Conference on Management of Data* (1990), pages 322–331, which is incorporated herein by reference. Each object also comprises descriptive data 1016, indicating the type of feature that it represents, and a shape 1018. The shape of an object is typically either a point (for points of interest), a polyline (i.e., a sequence of connected line segments, for features such as roads), or a polygon.

The visual properties of layers 1004 are defined by templates 1006. Multiple templates are provided for each layer, corresponding to the number of different display types and display modes (such as day/night) that may be used in displaying maps on different client devices, as described above. Templates 1006 define different properties for different object types 1020. Furthermore, visual properties 1022 that are defined for each object type may vary depending on the zoom level (i.e., the scale) of the map that is to be displayed. Thus, for each object type, the template provides multiple sets of visual properties, each corresponding to a different zoom level.

By way of example, Table I below lists a portion of a template for the "roads" category, defining visual properties of nine different road types at seventeen different zoom levels. The template is written in XML and is largely self-explanatory. XML labels for each object type and zoom level indicate whether or not the object is to be displayed in maps shown at this zoom level (depending on the "visible" label), along with width, color, textual labeling and other features. The "order" label indicates Z-order, i.e., how different objects are to be superimposed when they overlap in an image that is rendered on the client device.

TABLE I

SAMPLE TEMPLATE LISTING

```
- <TEMPLATE visible="yes" numObjTypes="9">
  - <OBJECT type="majhwy" name="majhwy" order="7"
      visible="yes" defaultState="on" hasURL="no"
      hasAngle="no" hasVisParam="no"
      hasColParam="no" allowFlip="no">
      <ZOOM id="1" visible="no" isShape="no"
        isImage="no" hasLabel="no" hasTooltip="no"
        hasDescription="no" />
      <ZOOM id="2" visible="no" isShape="no"
        isImage="no" hasLabel="no" hasTooltip="no"
        hasDescription="no" />
      <ZOOM id="3" visible="no" isShape="no"
        isImage="no" hasLabel="no" hasTooltip="no"
        hasDescription="no" />
    - <ZOOM id="4" visible="yes" isShape="yes"
        isImage="no" hasLabel="no" hasTooltip="no"
        hasDescription="no">
        <SHAPE width="1" color="F35A56"
          borderWidth="1" borderColor="F14B43"
          isDashed="no" isAnimated="no" />
      </ZOOM>
    - <ZOOM id="5" visible="yes" isShape="yes"
        isImage="no" hasLabel="no" hasTooltip="no"
```

TABLE I-continued

SAMPLE TEMPLATE LISTING

```
        hasDescription="no">
      <SHAPE width="1" colour="F35A56"
        borderWidth="1" borderColor="F14B43"
        isDashed="no" isAnimated="no" />
    </ZOOM>
  - <ZOOM id="6" visible="yes" isShape="yes"
        isImage="no" hasLabel="no" hasTooltip="no"
        hasDescription="no">
      <SHAPE width="1" colour="F35A56"
        borderWidth="1" borderColor="F14B43"
        isDashed="no" isAnimated="no" />
    </ZOOM>
  - <ZOOM id="7" visible="yes" isShape="yes"
        isImage="no" hasLabel="no" hasTooltip="no"
        hasDescription="no">
      <SHAPE width="2" colour="F35A56"
        borderWidth="1" borderColor="F14B43"
        isDashed="no" isAnimated="no" />
    </ZOOM>
  - <ZOOM id="8" visible="yes" isShape="yes"
        isImage="no" hasLabel="no" hasTooltip="no"
        hasDescription="no">
      <SHAPE width="2" colour="F35A56"
        borderWidth="1" borderColor="F14B43"
        isDashed="no" isAnimated="no" />
    </ZOOM>
  - <ZOOM id="9" visible="yes" isShape="yes"
        isImage="no" hasLabel="no" hasTooltip="no"
        hasDescription="no">
      <SHAPE width="2" colour="F35A56"
        borderWidth="1" borderColor="F14B43"
        isDashed="no" isAnimated="no" />
    </ZOOM>
  - <ZOOM id="10" visible="yes" isShape="yes"
        isImage="no" hasLabel="no" hasTooltip="no"
        hasDescription="no">
      <SHAPE width="4" colour="F37773"
        borderWidth="1" borderColor="F14B43"
        isDashed="no" isAnimated="no" />
    </ZOOM>
  - <ZOOM id="11" visible="yes" isShape="yes"
        isImage="no" hasLabel="no" hasTooltip="no"
        hasDescription="no">
      <SHAPE width="4" colour="F37773"
        borderWidth="1" borderColor="F14B43"
        isDashed="no" isAnimated="no" />
    </ZOOM>
  - <ZOOM id="12" visible="yes" isShape="yes"
        isImage="no" hasLabel="no" hasTooltip="no"
        hasDescription="no">
      <SHAPE width="4" colour="F37773"
        borderWidth="1" borderColor="F14B43"
        isDashed="no" isAnimated="no" />
    </ZOOM>
  - <ZOOM id="13" visible="yes" isShape="yes"
        isImage="no" hasLabel="no" hasTooltip="no"
        hasDescription="no">
      <SHAPE width="6" colour="F37773"
        borderWidth="2" borderColor="F14B43"
        isDashed="no" isAnimated="no" />
    </ZOOM>
  - <ZOOM id="14" visible="yes" isShape="yes"
        isImage="no" hasLabel="no" hasTooltip="no"
        hasDescription="no">
      <SHAPE width="6" colour="F37773"
        borderWidth="2" borderColor="F14B43"
        isDashed="no" isAnimated="no" />
    </ZOOM>
  - <ZOOM id="15" visible="yes" isShape="yes"
        isImage="no" hasLabel="no" hasTooltip="no"
        hasDescription="no">
      <SHAPE width="8" colour="F37773"
        borderWidth="2" borderColor="F14B43"
        isDashed="no" isAnimated="no" />
    </ZOOM>
  - <ZOOM id="16" visible="yes" isShape="yes"
        isImage="no" hasLabel="no" hasTooltip="no"
        hasDescription="no">
      <SHAPE width="11" colour="F37773"
        borderWidth="2" borderColor="F14B43"
        isDashed="no" isAnimated="no" />
    </ZOOM>
  - <ZOOM id="17" visible="yes" isShape="yes"
        isImage="no" hasLabel="no" hasTooltip="no"
        hasDescription="no">
      <SHAPE width="11" colour="F37773"
        borderWidth="2" borderColor="F14B43"
        isDashed="no" isAnimated="no" />
    </ZOOM>
  </OBJECT>
- <OBJECT type="sechwy" name="sechwy" order="6"
      visible="yes" defaultState="on" hasURL="no"
      hasAngle="no" hasVisParam="no"
      hasColParam="no" allowFlip="no">
    <ZOOM id="1" visible="no" isShape="no"
        isImage="no" hasLabel="no" hasTooltip="no"
        hasDescription="no" />
    ...
  - <ZOOM id="6" visible="yes" isShape="yes"
        isImage="no" hasLabel="no" hasTooltip="no"
        hasDescription="no">
      <SHAPE width="1" colour="B6B6C7"
        isDashed="no" isAnimated="no" />
    </ZOOM>
  - <ZOOM id="7" visible="yes" isShape="yes"
        isImage="no" hasLabel="no" hasTooltip="no"
        hasDescription="no">
      <SHAPE width="1" colour="B6B0CC"
        borderColor="9D86C1" isDashed="no"
        isAnimated="no" />
    </ZOOM>
    ...
  - <ZOOM id="17" visible="yes" isShape="yes"
        isImage="no" hasLabel="no" hasTooltip="no"
        hasDescription="no">
      <SHAPE width="11" colour="B19ECD"
        borderWidth="1" borderColor="9D86C1"
        isDashed="no" isAnimated="no" />
    </ZOOM>
  </OBJECT>
- <OBJECT type="main_road" name="main_road"
      order="5" visible="yes" defaultState="on"
      hasURL="no" hasAngle="no" hasVisParam="no"
      hasColParam="no" allowFlip="no">
    <ZOOM id="1" visible="no" isShape="no"
        isImage="no" hasLabel="no" hasTooltip="no"
        hasDescription="no" />
    ...
  - <ZOOM id="9" visible="yes" isShape="yes"
        isImage="no" hasLabel="no" hasTooltip="no"
        hasDescription="no">
      <SHAPE width="2" colour="B47A10"
        isDashed="no" isAnimated="no" />
    </ZOOM>
  - <ZOOM id="10" visible="yes" isShape="yes"
        isImage="no" hasLabel="no" hasTooltip="no"
        hasDescription="no">
      <SHAPE width="1" colour="F0E12B"
        borderWidth="1" borderColor="B47A10"
        isDashed="no" isAnimated="no" />
    </ZOOM>
    ...
  - <ZOOM id="17" visible="yes" isShape="yes"
        isImage="no" hasLabel="no" hasTooltip="no"
        hasDescription="no">
      <SHAPE width="10" colour="F4E264"
        borderWidth="1" borderColor="DCC210"
        isDashed="no" isAnimated="no" />
    </ZOOM>
  </OBJECT>
- <OBJECT type="street" name="street_toll"
      order="3" visible="yes" defaultState="on"
      hasURL="no" hasAngle="no" hasVisParam="no"
      hasColParam="no" allowFlip="no">
```

TABLE I-continued

SAMPLE TEMPLATE LISTING

```
...
- <OBJECT type="street_toll" name="street"
      order="2" visible="yes" defaultState="on"
      hasURL="no" hasAngle="no" hasVisParam="no"
      hasColParam="no" allowFlip="no">
...
- <OBJECT type="pedestrian_path"
      name="pedestrian_path" order="1" visible="yes"
      defaultState="on" hasURL="no" hasAngle="no"
      hasVisParam="no" hasColParam="no"
      allowFlip="no">
...
- <OBJECT type="ferry" order="0" visible="yes"
      defaultState="on" hasURL="no" hasAngle="no"
      hasVisParam="no" hasColParam="no"
      allowFlip="no">
...
</TEMPLATE>
```

Figure 10B:
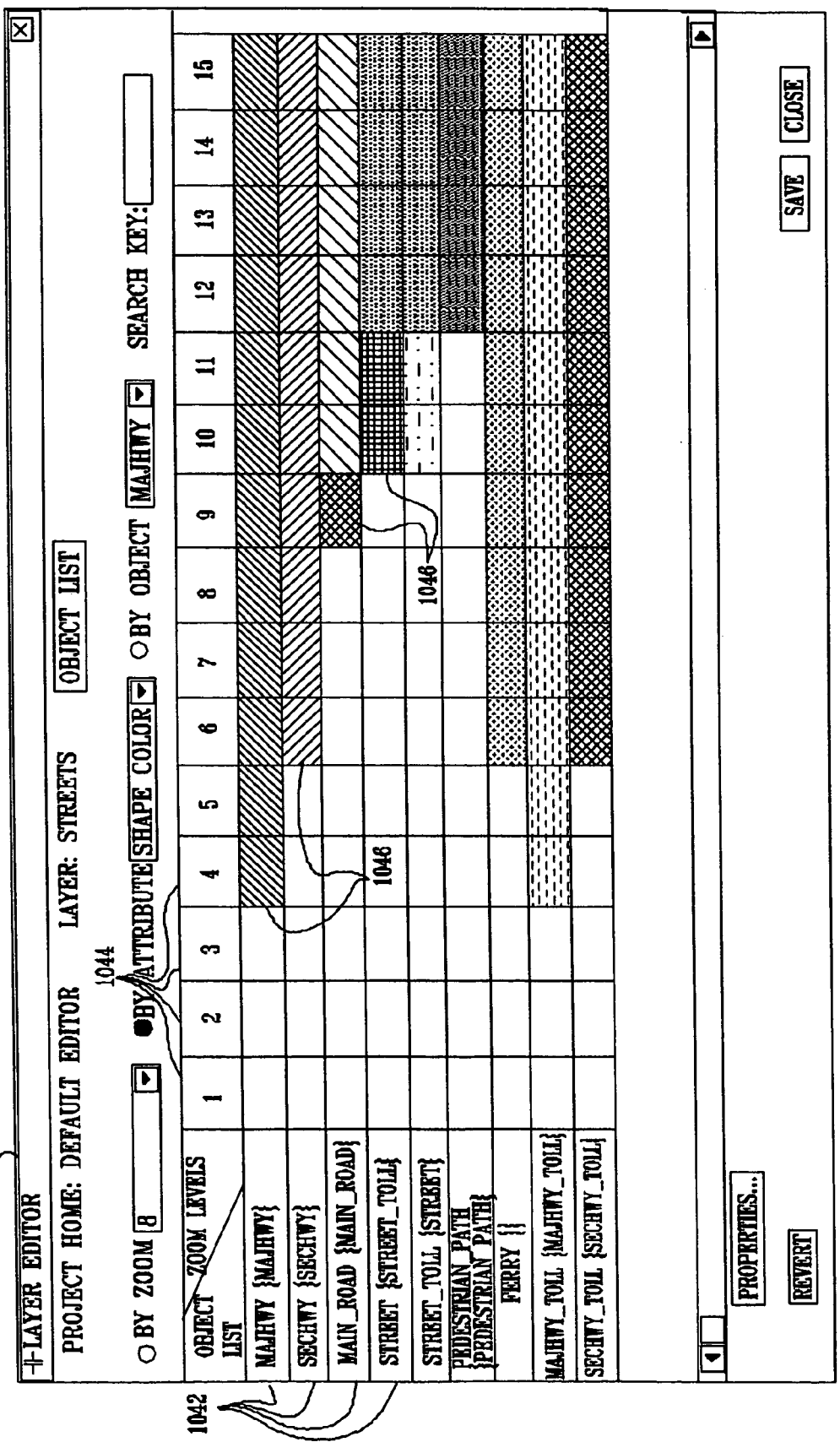
FIG. 10B is a schematic representation of a computer screen of a template editor, which is used in setting display properties of maps provided by a mapping server, in accordance with an embodiment of the present invention.

FIG. 10B is a schematic representation of a computer screen 1040, which is used in a template editor for creating templates 1006, in accordance with an embodiment of the present invention. The template editor typically runs on a terminal or workstation (not shown) that is linked to server 700 and is used by an operator of the server in setting the attributes of different templates. In the screen shown in FIG. 10B, each type of road in the "streets" layer of the template is represented by a corresponding row 1042. Each column 1044 corresponds to a different zoom level. Entries 1046 in each row indicate whether the corresponding type of object is to be visible at each of the different zoom levels and, if so, what color it is to have. The operator uses this screen to change the colors and visibility properties of the different road types. Other screens (not shown) allow the operator to change properties such as line width, border width and labeling, for example. Similar screens are available for other categories of objects.

Figure 11:
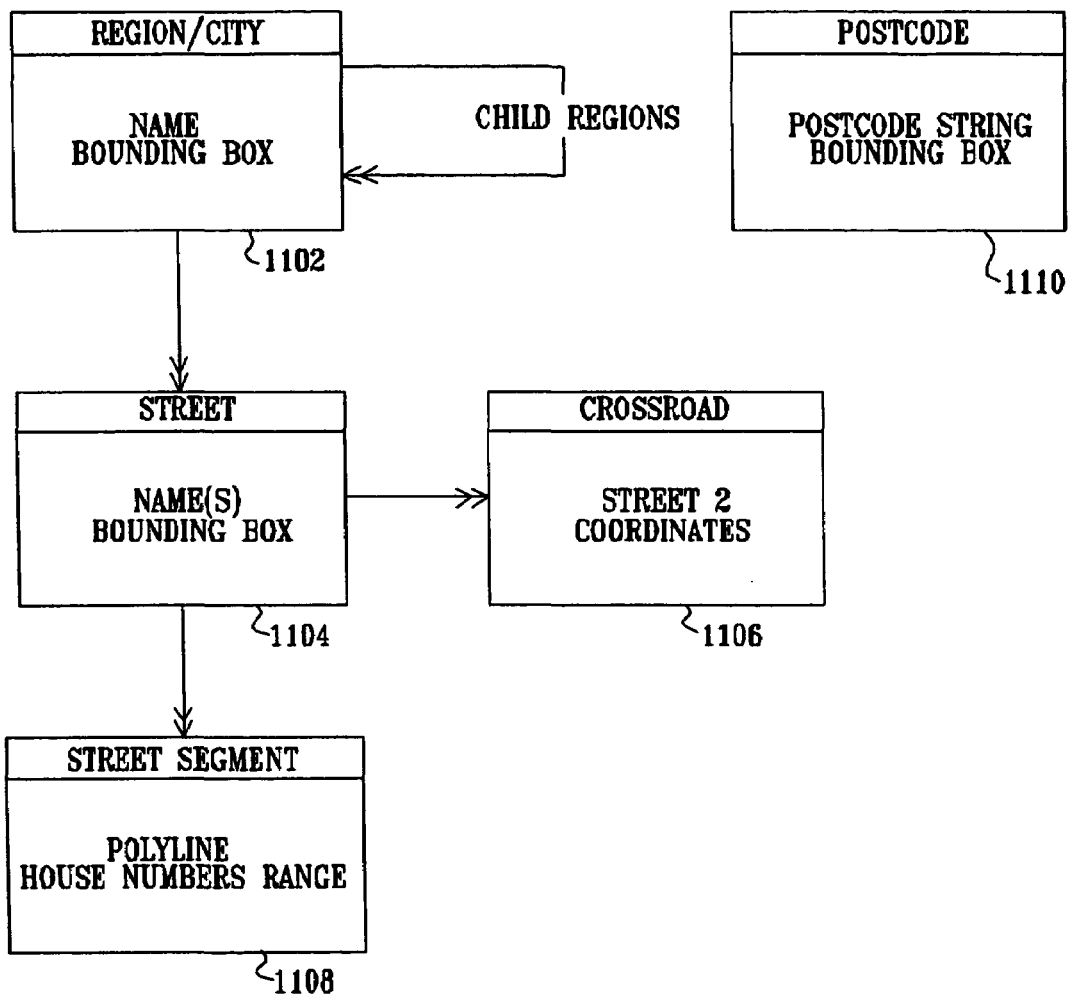
FIG. 11 is a block diagram that schematically illustrates data structures used by a mapping server in searching for geographical data, in accordance with an embodiment of the present invention.

FIG. 11 is a block diagram that schematically illustrates a data structure 1100 used by search engine 804 in serving client search requests, in accordance with an embodiment of the present invention. At the highest level, data structure 1100 comprises a region/city entry 1102 for each region or city in GIS database 710. Each region or city is represented by its name and by a bounding box, giving the bounding coordinates of the region or city. A region may contain child regions (such as counties or cities within a state or country), each of which is represented by its own entry 1102.

At the next level down in the hierarchy, cities and regions contain roads, which are represented by street entries 1104. Each street is made up of one or more segments, which are represented by segment entries 1108. Each segment entry has the form of a polyline, with a range of house numbers, for use in locating particular addresses on the street. Each street entry 1104 has a street name and a bounding box that contains all of the segments of the street. In addition, each street is cross-indexed to crossroad entries 1106, which contain the names and coordinates of all the other streets that cross it.

Search data structure 1100 may also contain other types of searchable data, such as postcode entries 1110. Note that POI information may be stored in map layers, to be accessed by both map display and search mechanisms. Thus, POIs may be searched by city, or within a predefined radius of a given address or location, or within a certain bounding box. The POI search is then typically performed using the R-Tree index.

Figure 12:
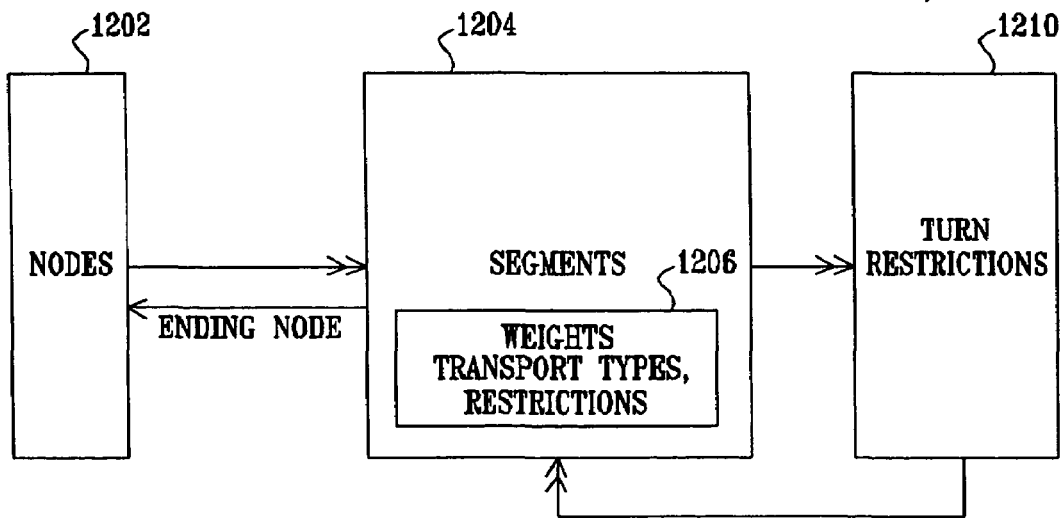
FIG. 12 is a block diagram that schematically illustrates data structures used by a mapping server in providing route data, in accordance with an embodiment of the present invention.

FIG. 12 is a block diagram that schematically illustrates a data structure 1200 used by routing engine 806 in responding to client route requests, in accordance with an embodiment of the present invention. For this purpose, locations in GIS database 710 are represented as nodes in a graph. Road segments form the edges of the graph, connecting the nodes. Thus, each node entry 1202 contains the location of the node and indices of segment entries 1204 connecting to the node. Each segment entry 1204 contains properties 1206 of the segment, such as restrictions on vehicle weights and types that must be taken into account in generating navigation instructions. Each segment entry also contains pointers to any applicable turn restriction entries 1210, which indicate for each segment the other segments into which a vehicle is (or is not) permitted to turn from the segment.

Figure 13:
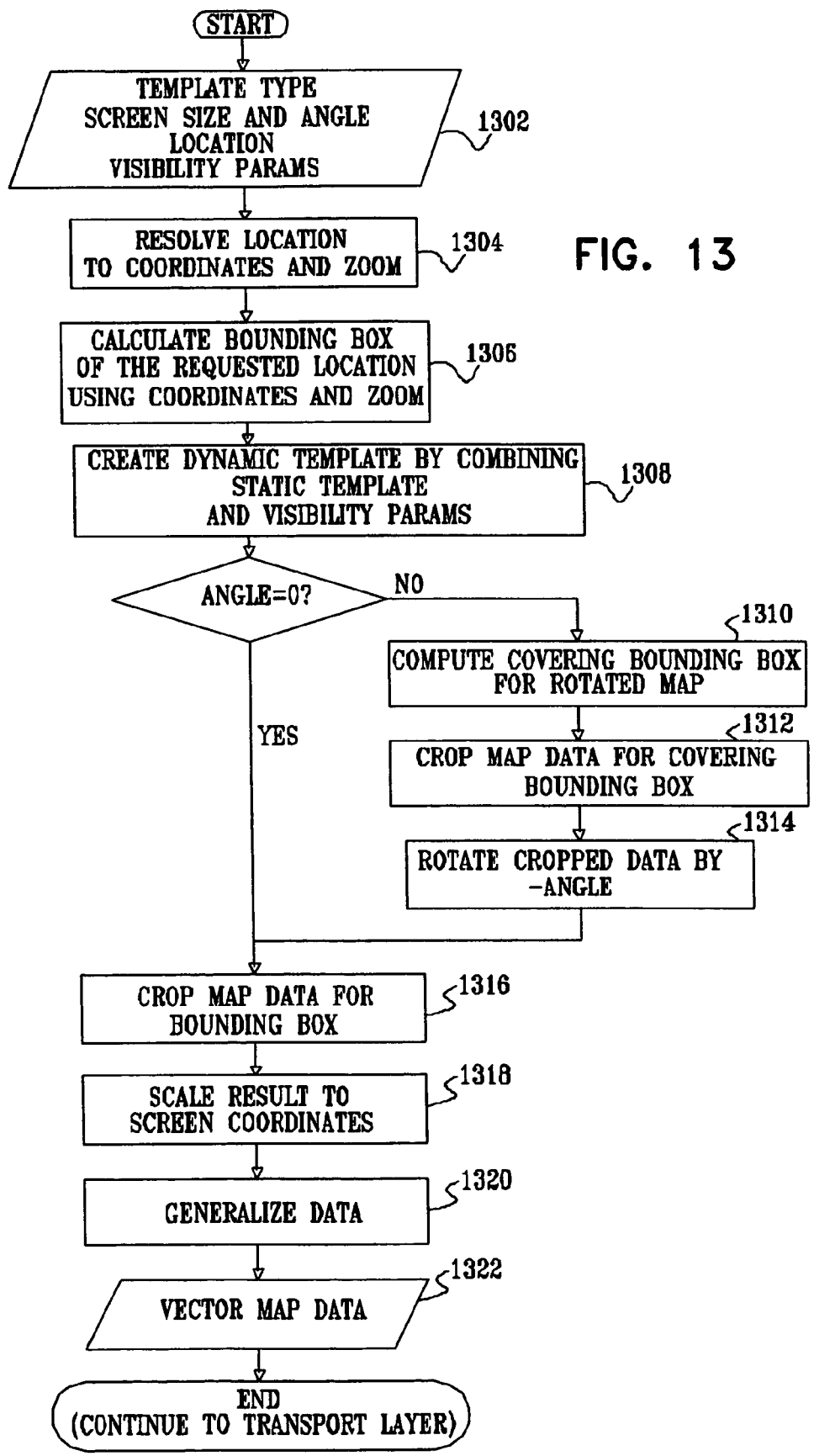
FIG. 13 is a flow chart that schematically illustrates a method for handling map requests submitted to a mapping server, in accordance with an embodiment of the present invention.

FIG. 13 is a flow chart that schematically illustrates a method used by mapping engine 802 in generating a map for download to client 702, in accordance with an embodiment of the present invention. The mapping engine begins this process by reading in client parameters, at a parameter input step 1302. The client may provide these parameters in a map request message that it sends to server 700, or the server may read the parameters from its own records. The parameters typically include:

Template type, corresponding to the client display properties, such as screen size and color palette, and preferences, such as day or night viewing.

The size and orientation angle at which the map is to be displayed (as illustrated in FIGS. 2B–2F, for example).

The map location.

Object type visibility parameters, indicating the types of objects to be included in the map (for example, which types of points of interest, if any), based on selections made by the user of client 702 or on default settings.

Mapping engine 802 resolves the map location and size into corresponding coordinates and a zoom level within its own map data structure 1000, at a coordinate resolution step 1304. As noted above, the map data structure is precomputed for certain particular zoom levels. The mapping engine chooses the zoom level that is appropriate for the map size determined at step 1302. Using the coordinates and zoom of the map, the mapping engine calculates a bounding box containing the area of the map to be displayed, at a box computation step 1306. The bounding box determines which objects are to be included in the map that is downloaded to the client. The mapping engine also creates a dynamic template by combining the appropriate static template 1006 with variable visibility information, at a template creation step 1308. The variable visibility information typically includes, for example, the object type visibility parameters that were input at step 1302 and the visibility properties of the different object types as indicated by the selected static template. The dynamic template is used to filter unnecessary objects out of the map data that are to be transmitted to client 702, so that only features that are actually going to be displayed by the client are included in the transmitted data.

If the map to be displayed on the client device is to be rotated (as shown in the examples of FIGS. 2B–2E), mapping engine 802 may rotate the map coordinates in advance to the desired orientation. As noted above, pre-rotation of the map reduces the computational burden placed on low-end client devices. Alternatively, if the map rotation is performed by the client device, the pre-rotation steps may be eliminated.

To rotate the map, the mapping engine computes a covering bounding box for the rotated map, at a box rotation step 1310. In other words, the original bounding box computed at step 1306 is rotated to the angle of the map to be displayed (for example, 45° northeast). A larger bounding box, oriented straight along the Cartesian axes of the GIS data and containing the original bounding box, is computed. This larger bounding box, referred to as the covering bounding box, is used in cropping the map data to be conveyed to client 702, at a rotated cropping step 1312. Details of the cropping process are described hereinbelow. The cropped data are then rotated to the angle of the original bounding box, at a data rotation step 1314. At this step, the vector coordinates of the objects to be included in the map are rotated by an equal and opposite angle to the rotation angle of the original bounding box (so that the true north axis will be tilted 45° to the left in the example noted above). The coordinates of the objects in the map in the original GIS frame of reference are thus transformed into the rotated frame of reference of client display 856.

Figure 14A:
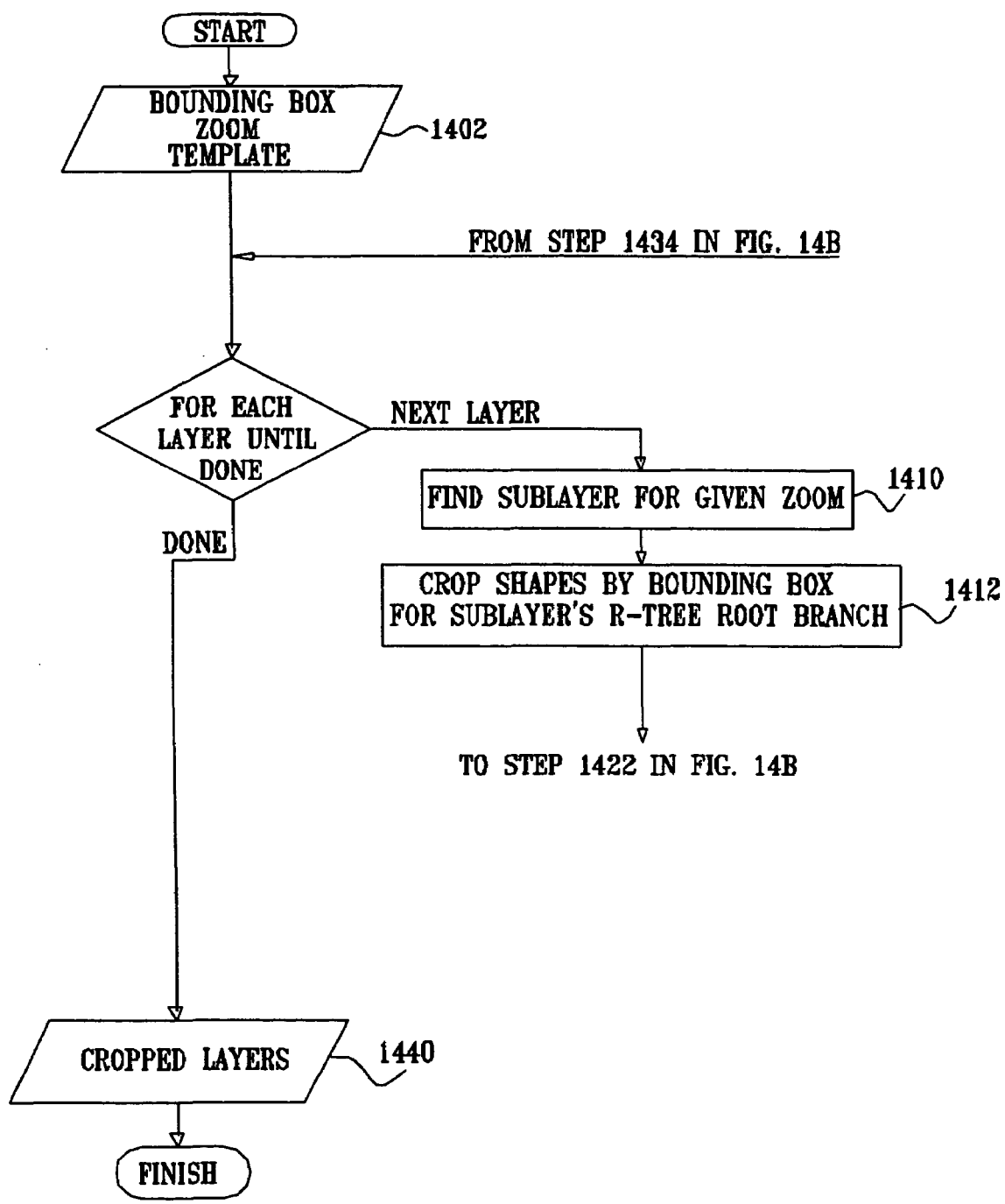
FIGS. 14A and 14B are flow charts that schematically illustrate a method for cropping map data for transmission to a mapping client, in accordance with an embodiment of the present invention.
Figure 14B:
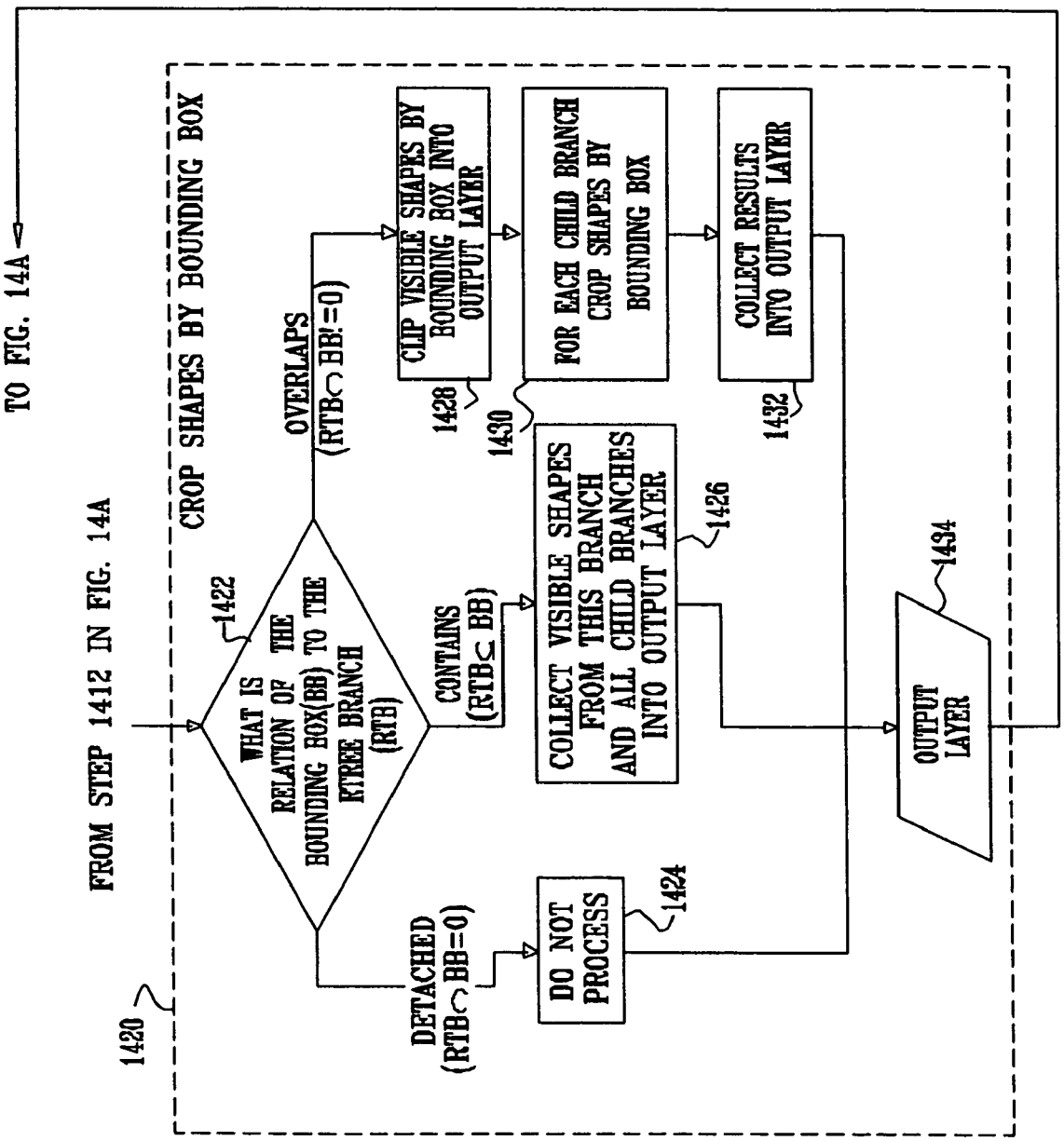

Mapping engine 802 next crops the map data to the size of the bounding box calculated at step 1306, at a cropping step 1316. In the case of rotated data computed at step 1314, the larger covering bounding box is cropped down to the size of the original bounding box in the rotated coordinates. Details of step 1316 are shown in FIGS. 14A and 14B, below. The coordinates of the objects remaining in the map data after step 1316 are scaled from the native map coordinates (such as GIS latitude and longitude coordinates) to pixel coordinates, corresponding to the pixels on the screen of the client device, at a scaling step 1318. The mapping engine simplifies the data, to fit the objects to be transmitted to the parameters and limitations of the client display, at a data generalization step 1320. The generalization process removes redundant objects and reduces the complexity of others, while maintaining the representative integrity of the mapped area. Methods of map generalization are described, for example, in a white paper entitled "Automation of Map Generalization," published by the Environmental Systems Research Institute (ESRI, Redlands Calif., 1996), which is incorporated herein by reference.

In addition to generating the vector map data, as described in the steps above, mapping engine 802 also prepares textual labels to be placed on the map by client 702 at appropriate locations. The labels include street labels, which are rotated to appear along the appropriate street lines, as well as labels of polygon objects (such as cities, bodies of water and parks) and POIs, which generally appear on the map in horizontal orientation. The map engine decides which map features to label based on the applicable templates, and then generates the map labels dynamically in their optimal placement. For example, labels of polygon objects may be shifted within the polygon, street labels may be shifted along the street polyline, and POI labels may be moved around the point of interest. Overlap between labels is resolved by shifting the labels or removing low-priority labels if there is insufficient space to display them on the map.

The map data are now ready to be transmitted to client 702, at a map completion step 1322. As noted above, the map is transmitted in the form of vector data, representing points, polylines and polygons, in the frame of reference of the map to be rendered on the client device, generalized and simplified to remove all unnecessary detail.

FIGS. 14A and 14B are flow charts that schematically illustrate a method for cropping map data, as performed at the above-mentioned step 1316, in accordance with an embodiment of the present invention. Mapping engine 802 receives input parameters for use in cropping the map, at a parameter input step 1402. The parameters include the area of the bounding box, the zoom level of the map and the template to be used in displaying the map on the client device. The cropping procedure is applied to the map data in each of layers 1004 that is to be included in the map, based on R-Tree indices 1012.

For each layer 1004, mapping engine finds sublayer 1010 that is appropriate for the specified zoom level, at a sublayer selection step 1410. The mapping engine finds the R-Tree root of the objects in the selected sublayer, at a root cropping step 1412. It then proceeds up the branches of the R-Tree, and crops all the shapes in the sublayer according to the bounding box, at a shape cropping step 1420. The action taken at step 1420 depends on the relation of the bounding box to the current branch, as determined in a bounding step 1422. If the branch is entirely outside the bounding box, the mapping engine ignores the branch and omits it from the layer output, at a branch elimination step 1424. If the branch is entirely inside the bounding box, the mapping engine collects all shapes associated with this branch and all its child branches, at a branch collection step 1426, as long as the template indicates that these shapes are to be visible in the map rendered by client 702. Non-visible shapes are omitted.

When a branch overlaps the boundary of the bounding box, the shape of the corresponding object is clipped, so that only those portions of the objects in the current sublayer that are within the bounding box are included in the output map data, at a clipping step 1428. The child branches of the overlapping branch are likewise clipped, continuing recursively up the R-Tree to the highest leaves that will be visible in the map, at a child cropping step 1430. The visible shapes of the branch and its children are collected for output, at a shape collection step 1432.

All the shapes that remain within the bounding box after cropping at step 1420 are collected to form the map output data for the current layer, at a layer output step 1434. A similar procedure is applied to the remaining map layers, until all the layers have been completed. The collection of all the layers of cropped data is then ready for output, at a cropped data output step 1440.

Figure 15A:
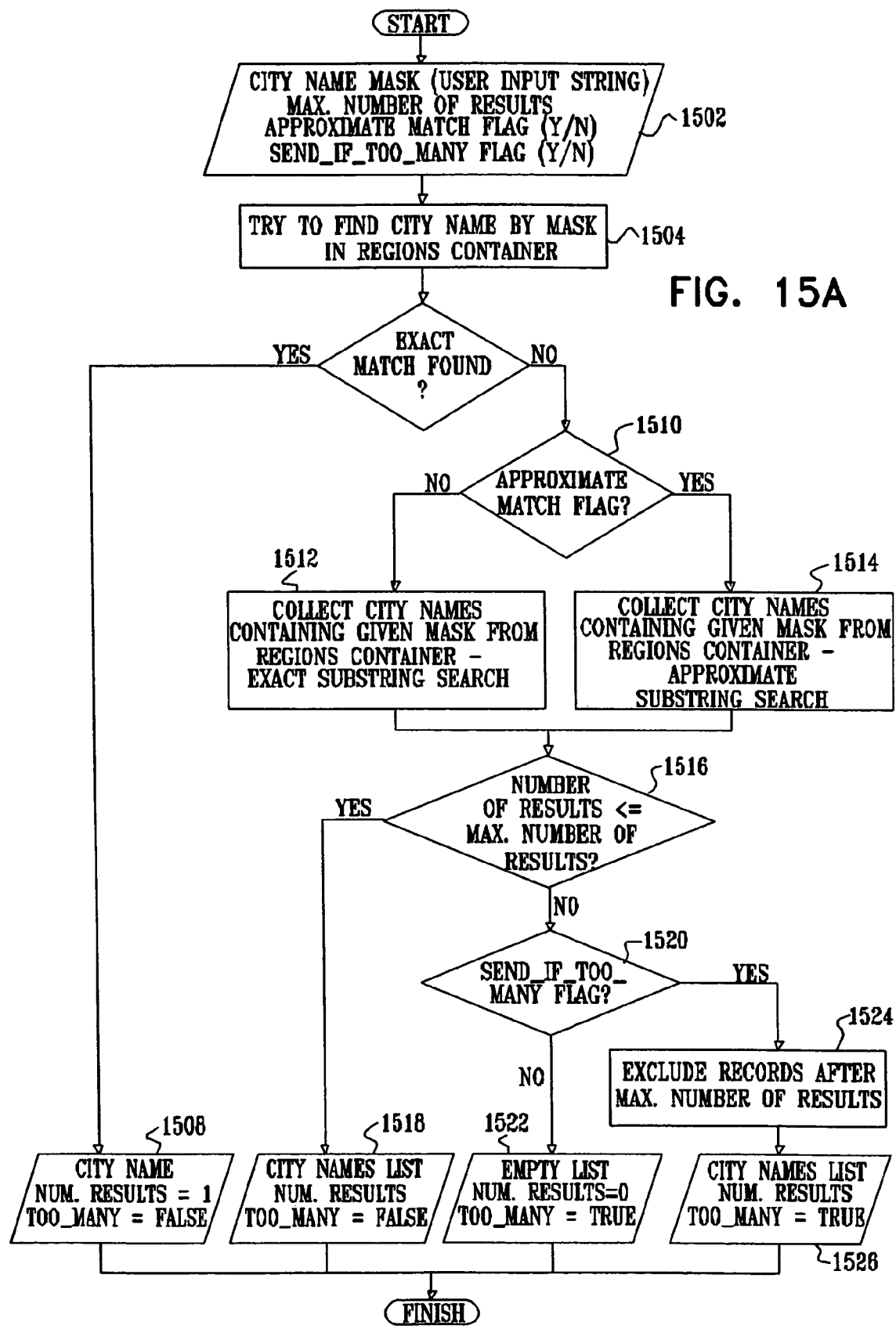
FIG. 15A is a flow chart that schematically illustrates a method for searching for alphanumeric map data, in accordance with an embodiment of the present invention.
Figure 15B:
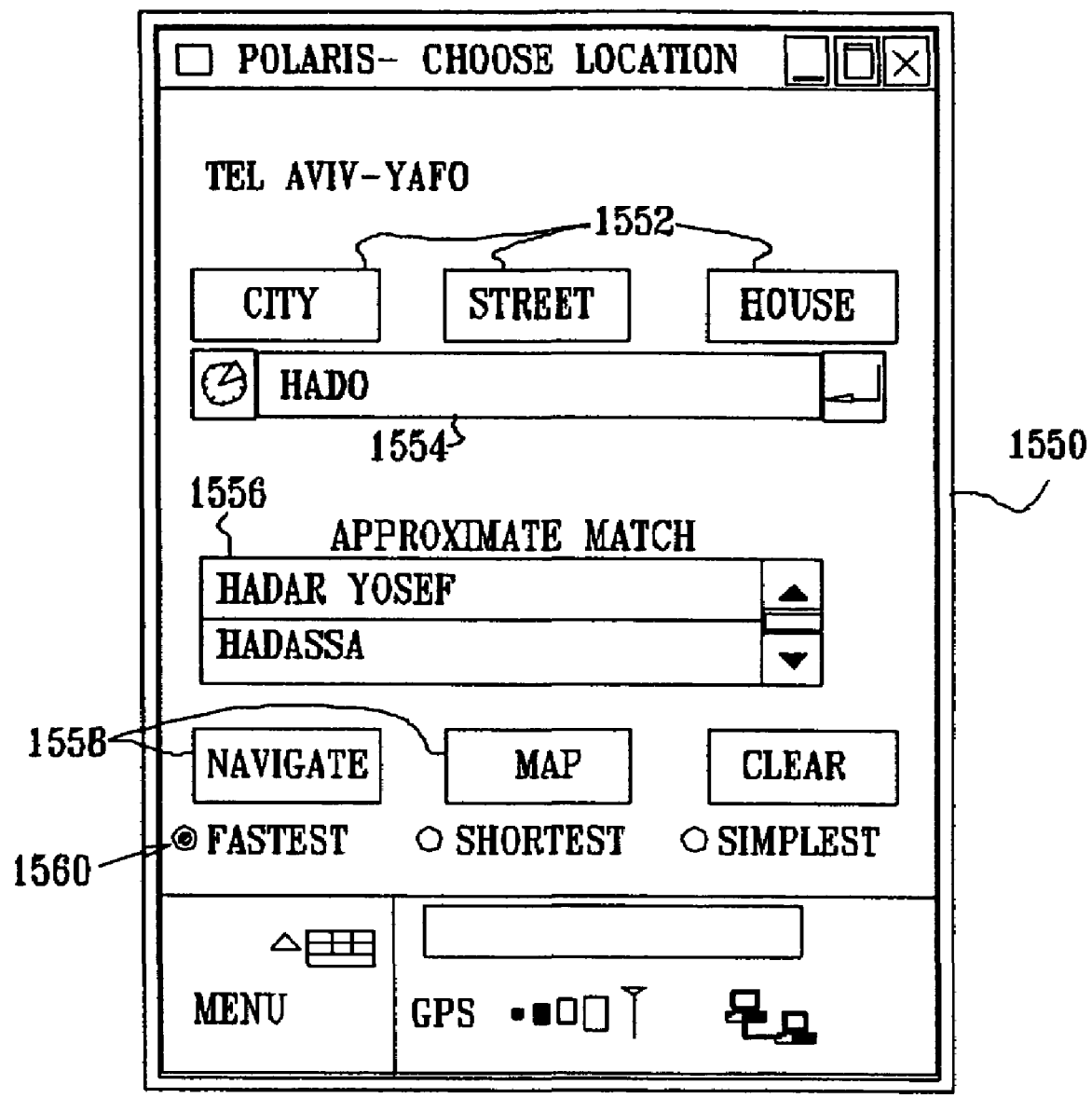
FIG. 15B is a schematic representation of a screen displayed on a mobile device for enabling a user to select a destination location, in accordance with an embodiment of the present invention.

Reference is now made to FIGS. 15A and 15B, which schematically illustrate a method by which search engine 804 responds to search requests from client 702, in accordance with an embodiment of the present invention. FIG. 15A is a flow chart that shows the method used to find a city name, while FIG. 15B represents a user interface screen 1550 displayed by client 702 for use in searching for a street name. It will be understood that the methods described here are equally applicable to searching not only for street and city names, but also for other geographical features, such as crossroads, geocodes and points of interest.

To initiate the search, a user of the client device inputs a city name string and selects search preferences, which are uploaded from client 702 to server 700 at a search input step 1502. Typically, after the user has input the first few letters of the city name, the search engine may begin to search its region/city entries 1102 for names that match a search mask made up of these letters. Thus, as described below, the search engine can begin to return search results to the user without waiting for the complete city name to be keyed in. (Typically, client 702 waits to send the input string input to server 700 until the user has stopped entering characters for a certain time period, generally less than one second, in order to avoid disturbing the user data input process.) To control this accelerated search process, client 702 may used search parameters that include the maximum number of search results to be sent by the search engine at any one time (and what to do if the number of matches found exceeds the maximum), and whether approximate string matching should be used in the search. Some or all of these parameters may be set by the user.

Search engine 804 first checks its database for a city name that is a full, exact match to the search mask, at a full name matching step 1504. The search is typically case-insensitive. If a full, exact match is found, the search engine reports that it has found a single matching city name, at a full match output step 1508.

Assuming no full match is found, the search engine checks to determine whether it is to perform exact matching or approximate matching in searching its records, at a flag checking step 1510. If the approximate match flag is reset, the search engine searches its records for names that contain all the characters in the mask string in the proper sequence, at an exact matching step 1512. Otherwise, if the approximate match flag is set, the search engine performs the search in a way that allows for key-in errors, at an approximate matching step 1514. In the approximate matching mode, the search engine finds both names that exactly match the mask string and names that match the search string to within a predetermined error bound. Typically, the error bound allows for one erroneous character. The search order may be chosen so as to favor replacement characters that are frequently confused, such as substitution of different vowels.

Search engine 804 reviews the search results found at step 1512 or 1514 to ascertain whether the total number of search results is less than or equal to the maximum number of results specified at step 1502, at a list length checking step 1516. If the number of results is within the maximum limit, the complete list of search results is output to the client, at a full list output step 1518. Otherwise, the search engine checks the send_if_too_many flag (likewise set at step 1502), at a result disposal step 1520. If this flag is reset, the search engine returns no results, at an empty list return step 1522. At this stage, the user of the client device may key in one or more additional characters, to narrow the scope of the search, and the search process will resume at step 1502 using the new mask string.

On the other hand, if the search engine finds at step 1520 that the send_if_too_many flag is set, it simply truncates the list of results it has found at the specified limit, at a list truncation step 1524. Various criteria may be used to prioritize the results, so that the city names at the top of the list are those with a relatively higher probability of being the actual, correct name that the user is seeking. (For example, names that exactly match the mask string may be placed ahead of names that match only approximately.) The truncated list is output to the client device, at a truncated list return step 1526. Note that following either of steps 1518 and 1526, the user of the client device may continue to input additional characters, which will prompt the search engine to resume the search with the new mask string at step 1502.

FIG. 15B illustrates the use of approximate matching in the context of street name searching. The type of search to perform is invoked by the user by selecting a search type button 1552. The user in this example is searching for streets in the city of Tel Aviv-Yafo, and has keyed in the name "Hado . . . " in a key-in window 1554. The user may select an enter button 1555, causing client 702 to send this string to server 700 and thus initiate the search. Alternatively, client 702 may transmit the string to the server automatically, typically after the user has keyed in a certain number of letters or a certain amount of time has elapsed since key-in began.

In this example, there are no streets that exactly match the string that the user has input. The search engine returns names that are an approximate match, for display in a results window 1556 on the client device. The user can select one of these names or may alternatively correct the entry in window 1554 and continue the search. Upon selecting one of the street names, the user can use function buttons 1558 to ask server 700 for navigation directions to the selected street or to provide a map of the area of the street. In requesting navigation directions, the user may select navigation type buttons 1560 to determine whether the navigation directions are to generated according to the fastest, shortest or simplest route to the destination.

Figure 16:
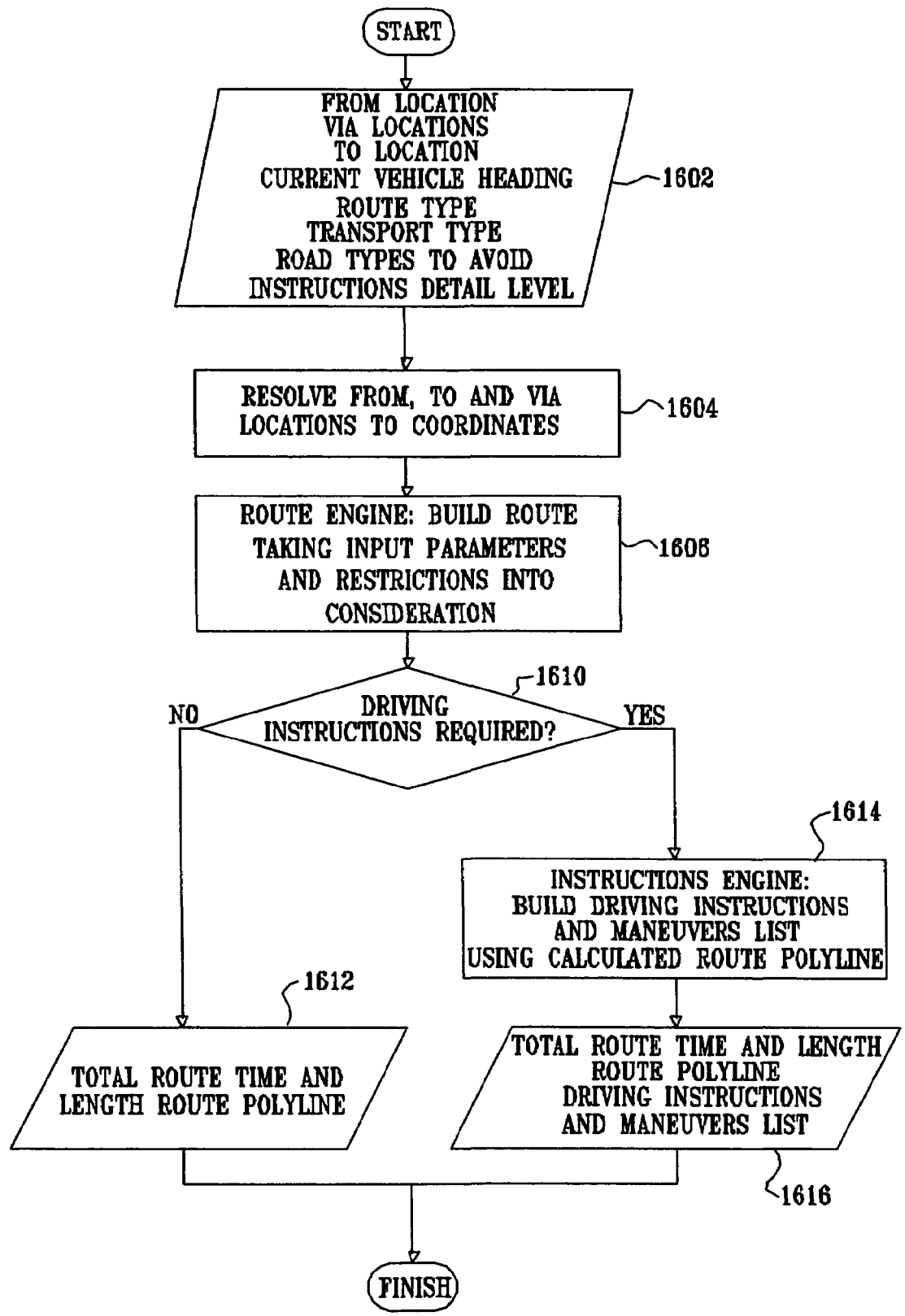
FIG. 16 is a flow chart that schematically illustrates a method for handing route requests submitted to a mapping server, in accordance with an embodiment of the present invention.
Figure 17:
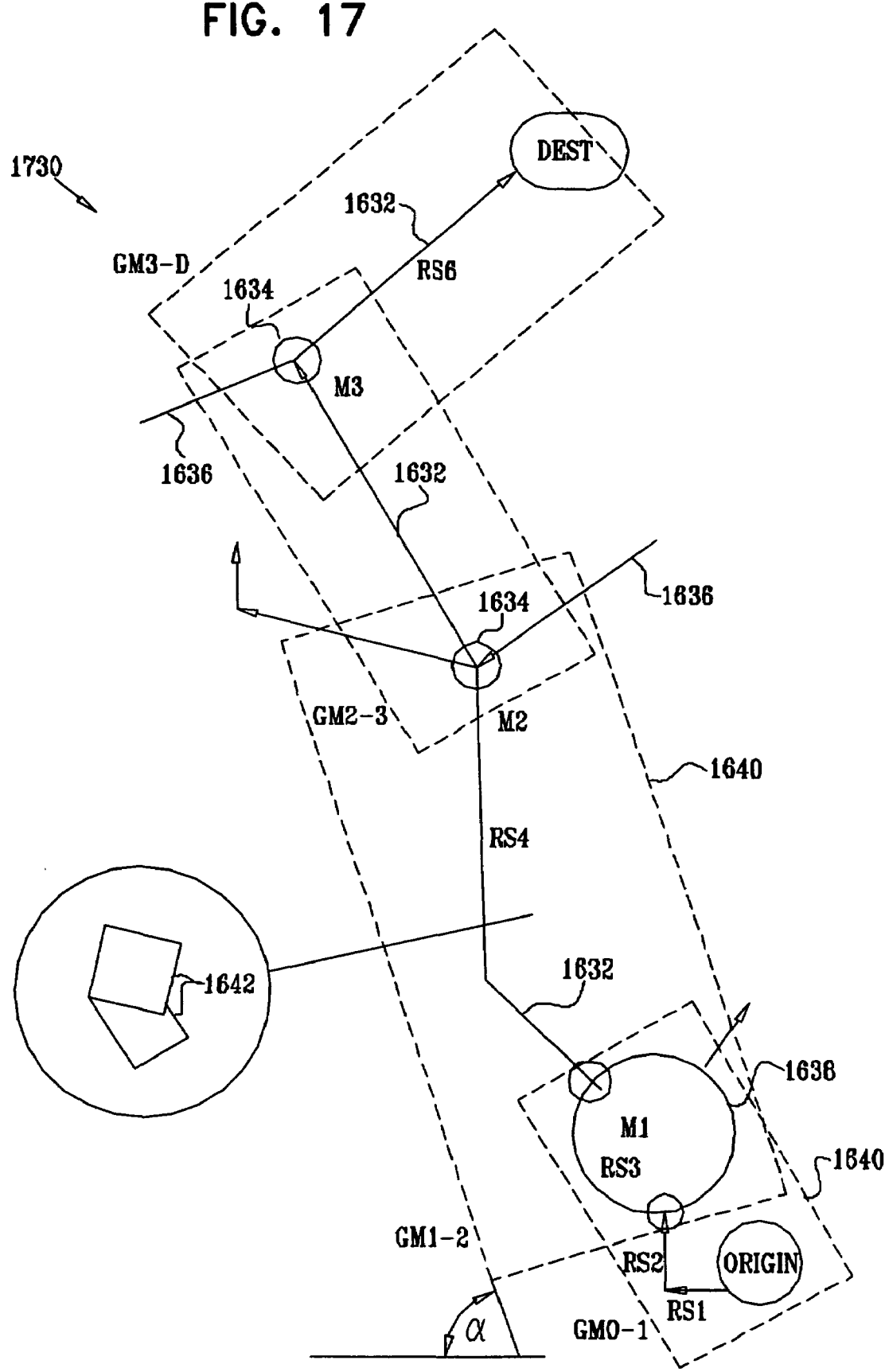
FIG. 17 is a graph that schematically illustrates elements of a route corridor map generated by a mobile device based on map data furnished by a mapping server, in accordance with an embodiment of the present invention.

Reference is now made to FIGS. 16 and 17, which schematically illustrate a method for determining and displaying a route using server 700 and client 702, in accordance with an embodiment of the present invention. FIG. 16 is a flow chart that shows the method used by routing engine 806 in responding to route requests submitted by client 702. The route request specifies various input data, at a data input step 1602, which the routing engine needs in order to compute the route. These data include:

Starting location of the client, provided by manual input or automatically, by GPS, for example.
Destination.
Any interim locations to be passed along the route.
Choice of route type (shortest, fastest or simplest).
Transport type (car, truck, bicycle, pedestrian), which determines the effect that transport and turn restrictions may have on the route.
Any road types to avoid (for example, toll roads, or routes considered to be insecure).
Level of detail of verbal instructions (which may be high, medium, low or none).

Routing engine 806 converts the starting and destination locations, as well as any interim locations, into coordinates in the frame of reference of map data 1000, at a coordinate resolution step 1604. The routing engine uses these coordinates in building the route, at a route construction step 1606. Substantially any automatic routing algorithm known in the art may be used for this purpose, such as the A* algorithm. Such algorithms are described, for example, by Cherkassky et al., in "Shortest Path Algorithms: Theory and Experimental Evaluation," Technical Report 93-1480, Department of Computer Science, Stanford University (Stanford, Calif., 1993), which is incorporated herein by reference. The route takes into account the preferences specified at step 1602.

FIG. 17 is a graph that schematically illustrates a route 1730 generated by routing engine 806, in accordance with an embodiment of the present invention. (This figure also shows aspects of a route corridor map for route 1730, as described below with reference to FIG. 18.) Route 1730 has the form of a polyline, comprising a sequence of route segments 1732, labeled RS1, RS2, . . . , RS6, which connect nodes 1734 along the route, labeled M1, M2, M3. Nodes 1734 typically correspond to road intersections. Route 1730 may also comprise an identification of cross streets 1736 that cross the designated route. Other road features and landmarks along the route may be identified, as well, such as a traffic circle 1738, as shown in the figure, or a slipway.

Returning now to FIG. 16, routing engine 806 next checks the input data to determine whether driving instructions are required and if so, at what level of detail, at an instruction checking step 1610. If instructions are not required, the routing engine simply computes the route length and estimated time that will be needed to complete it, and outputs the route data, at a polyline output step 1612. The route is downloaded to client 702 and is typically passed to mapping engine 802, as well, for generation of a corresponding corridor map, as described below and shown in FIG. 17. If instructions are requested, the routing engine builds a list of maneuvers that will be required along the route, at an instruction generation step 1614. For each maneuver, client 702 uses the information in the maneuver list to prepare suitable verbal instructions (for example, "right turn in 300 m," followed by "right turn in 50 m," followed by "now turn right"). The list of maneuvers is downloaded to client 702 along with the route, at an instruction output step 1616.

Mapping engine 802 generates a corridor map along route 1630. As shown in FIG. 17, the corridor map is actually made up of a sequence of segment maps 1640, labeled GM0-1, GM1-2, GM2-3 and GM3-D, which contain segments 1632 of route 1630 and a certain area on either side of the route. The scales of the segment maps vary according to the lengths of the corresponding segments of the route. (This feature of the segment maps is also illustrated in FIGS. 2B–2E.) Optionally, long segments, such as RS4, may be broken into multiple sub-maps 1642.

Although segment maps 1640 differ in size in the GIS frame of reference, they comprise roughly equal volumes of data, since smaller maps (such as GM0-1) are typically displayed by client 702 at a higher zoom level and thus show more detail. The maps are downloaded incrementally to client 702 as the client proceeds along route 1630. Note that some features, in areas of overlap between successive segment maps, may be downloaded twice, which increases the volume of data that must be transmitted to the client, but reduces the computational load on the client.

Figure 18:
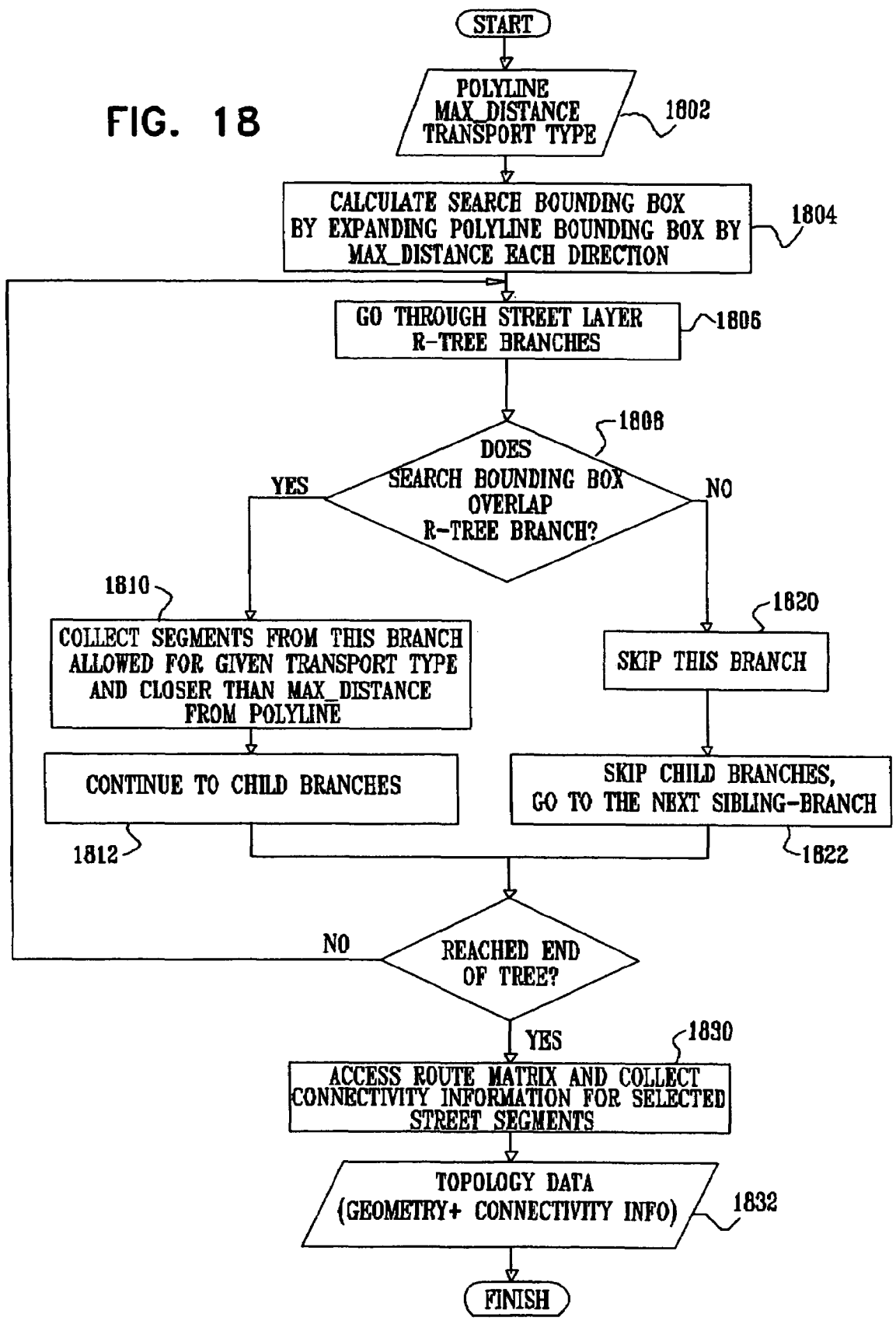
FIG. 18 is a flow chart that schematically illustrates a method for providing map data to accompany routing instructions, in accordance with another embodiment of the present invention.

FIG. 18 is a flow chart that schematically illustrates a method for generating a corridor map along a given route, in accordance with an embodiment of the present invention. To begin map generation, mapping engine 802 receives input parameters defining the corridor, at a data input step 1802. The data includes a polyline defining the route that has been computed (at step 1612 or 1616, for example), as well as the maximum distance (max_distance) to either side of the route that is to be included in segment maps 1740. The max_distance parameter determines the aspect ratio of the segment maps. Other parameters may be specified, as well, such as the transport type (car, bicycle or pedestrian), for determining which features to include in the corridor map.

For each segment 1732 of the route, mapping engine 802 computes a bounding box by expanding the polyline by max_distance to either side of the route, at a box expansion step 1804. As shown in FIG. 17, each bounding box is characterized by certain location coordinates and a zoom level, as well as by an orientation angle α relative to a reference direction of the map data. The zoom and angle are used, together with template information, in determining which map features are to be displayed in the corridor map, and how the map data corresponding to these features should be processed before downloading to client 702. These aspects of the operation of mapping engine 802 were described above in detail with reference to FIG. 13.

To crop the map data to be used in each segment map 1740, mapping engine 802 searches the R-Tree branches of the street layer of map data 1000, at a street search step 1806. As in the method of FIG. 14, the mapping engine ascertains, for each branch of the R-Tree, whether the branch falls within or intersects the bounding box, at an overlap checking step 1808. In the case of the corridor map, however, all road segments corresponding to R-Tree branches that fall even partly within the bounding box are collected for inclusion in the segment map, at a segment collection step 1810. In other words, even if a segment of a road near route 1730 falls only partly within the bounding box, the segment is included in the corridor map. Child branches of the branches that fall within or intersect the bounding box are checked and included, as well, at a child collection step 1812. On the other hand, R-Tree branches falling entirely outside the bounding box are eliminated from the map, at a branch skipping step 1820. Child branches of these skipped branches are skipped, as well, at a child skipping step 1822.

After collecting all road segments to be included in a segment map, the mapping engine accesses segment entries 1204 and turn restriction entries 1210 in routing data structure 1200, in order to determine the connectivity between the segments, at a routing collection step 1830. This information may be used not only in displaying available maneuvers and restrictions on the segment maps, but also in rerouting the client back to route 1730 in the event of a wrong turn. Rerouting of this sort may be performed by client 702, in order to reduce the need for client-server communication, by applying a simple routing algorithm to the map information held in the client memory. Mapping engine 802 outputs the map topology data for each route segment, at a topology output step 1832.

Figure 19A:
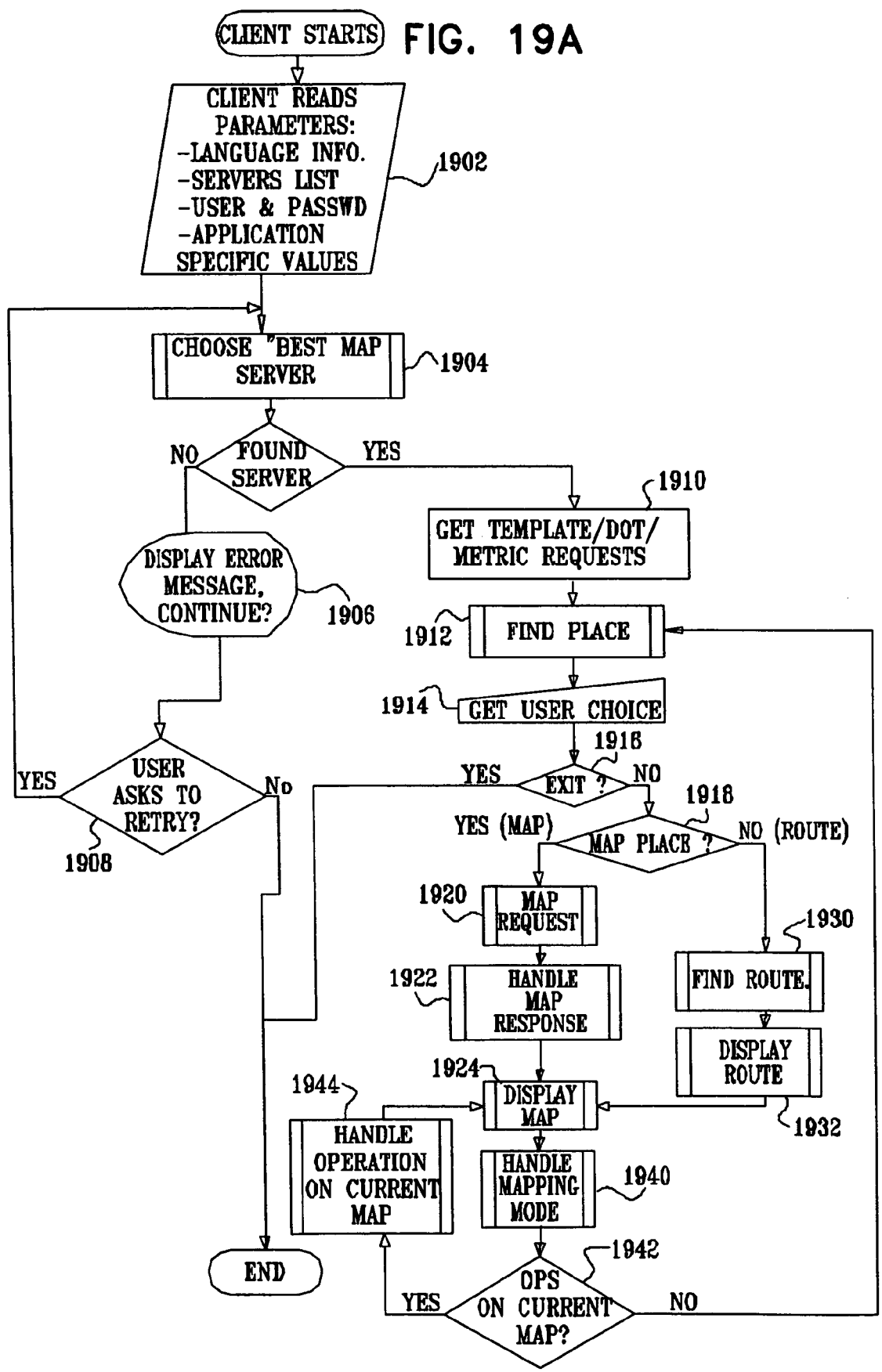
FIG. 19A is a flow chart that schematically illustrates operation of a mapping client, in accordance with an embodiment of the present invention.
Figure 19B:
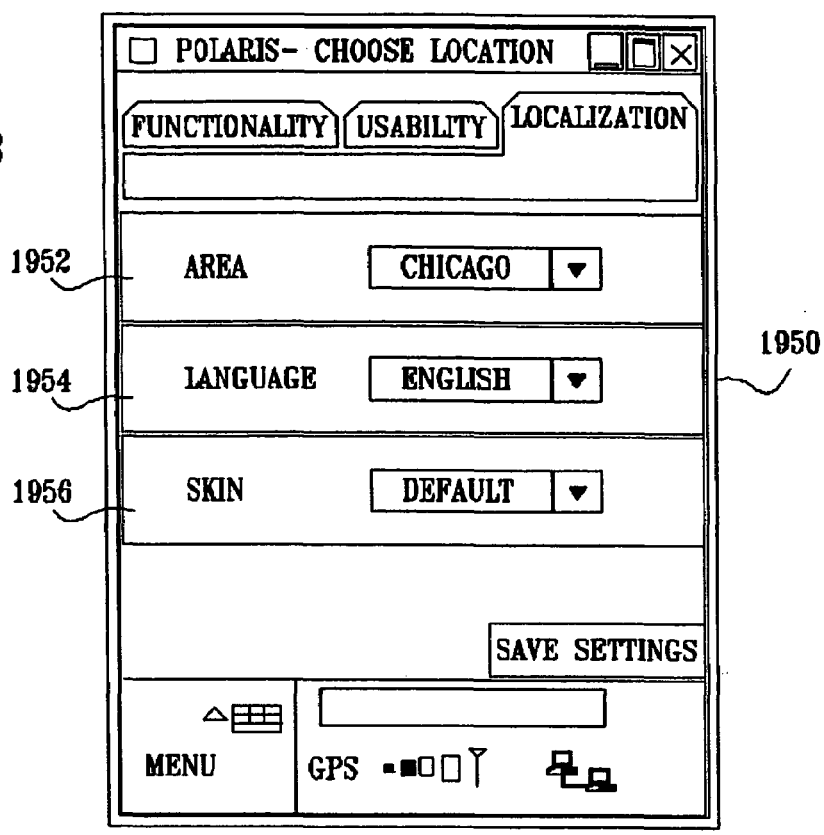
FIGS. 19B–D are schematic representations of screens displayed on a mobile device for enabling a user to select a destination location, in accordance with an embodiment of the present invention.
Figure 19C:
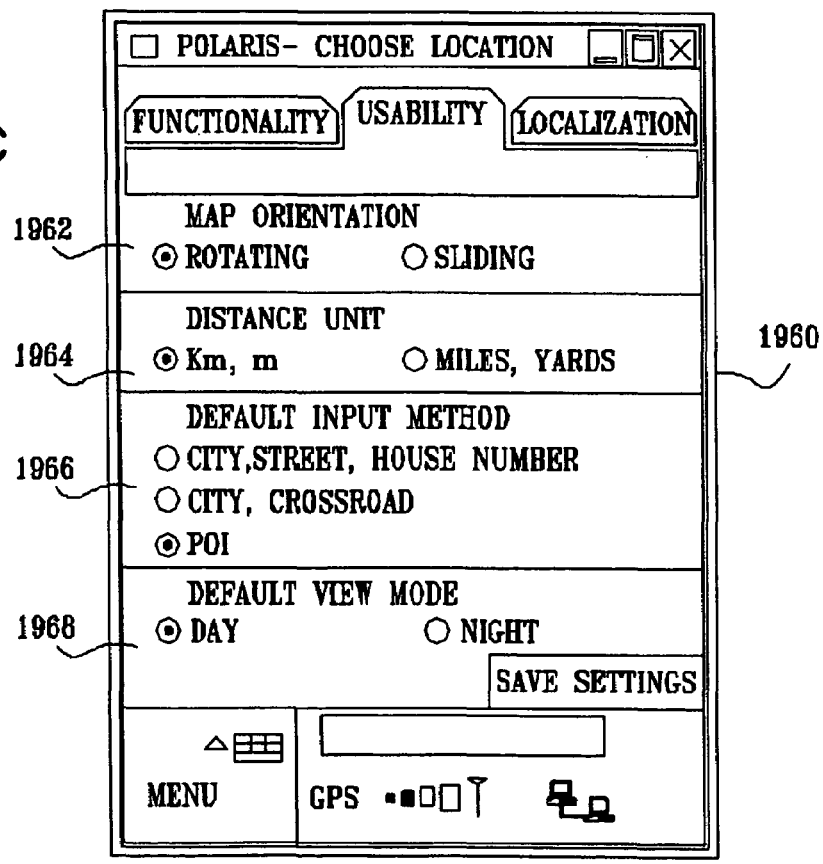
Figure 19D:
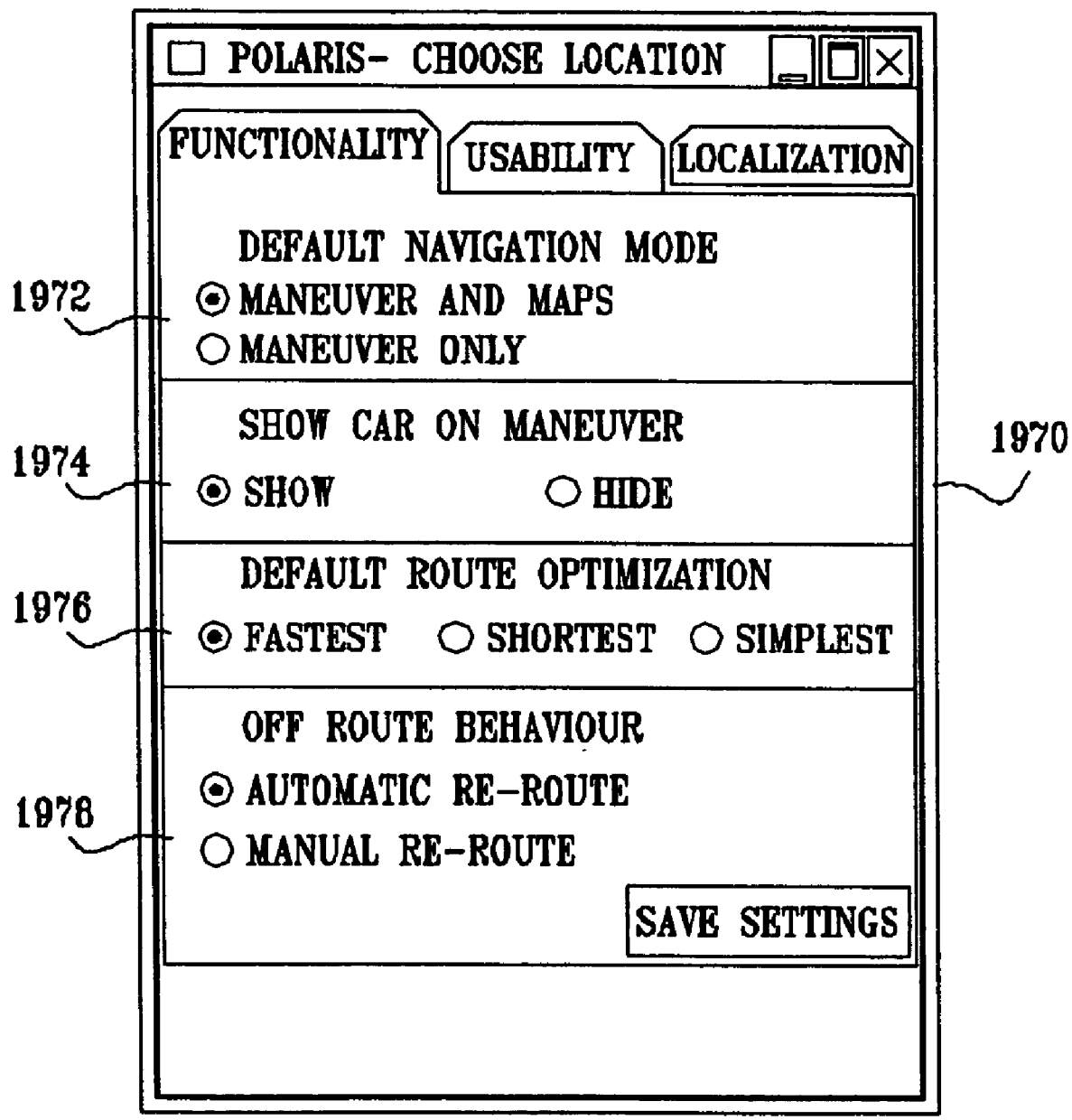

Reference is now made to FIGS. 19A–D, which schematically illustrate the operation of client 702, in accordance with an embodiment of the present invention. FIG. 19A is a flow chart showing key steps in the operational flow of the client, while FIGS. 19B–D show user interface screens that are displayed by the client. When the client program starts up, manager 850 reads operational parameters from memory 855, at a parameter reading step 1902. The parameters are used subsequently in the client interaction with server 700. They include information such as:

Language preference of the user, i.e., the language in which map labels and messages to the user are to be presented.
A list of available mapping servers.
The username and password of the user who is operating the client device.
Other application-specific values.

FIGS. 19B, C and D schematically illustrates user interface screens presented by client 702 on display 856, which allow the user to set some of the parameters used by the client. FIG. 19B shows a localization screen 1950, which allows the user to select a map region 1952 and a map language 1954, as well as a "skin" 1956, which defines the "look and feel" of the screen displays without affecting the underlying functionality. The user-selected localization parameters are used to inform server 700 of the desired navigation area and language to be used for labels and navigation instructions. The map language may also be used in selecting a set of phonetic primitives for the specific language selected. Server 700 may then download the appropriate set of primitives to client 702, to be held in memory by the client and used in generating audible instructions to the user. Since all map data are stored offboard, on server 700, the same client can be used substantially anywhere in the world, without purchasing or reloading data.

FIG. 19C shows a usability screen 1960, which allows the user to set display and user interface preferences, such as a map orientation 1962 and distance units 1964. The map orientation selection defines whether maps are to rotate as the user navigates along a given route (as shown in FIGS. 2B–2E), or to "slide," in fixed orientation (as shown in FIG. 2F). A default input method 1966 enables the user to select different formats for inputting requested destinations for navigation instructions: by house number, crossroads (such as "corner of Fifth Avenue and 42nd Street") or a selected POI. A default view mode 1968 allows the user to select the type of template to be used for map displays, such as a day or night template, as described above. All of these settings can be changed by the user in the course of interacting with client 702.

FIG. 19D shows a functionality screen 1970, which enables the user to personalize the mode in which navigation instructions are presented by client 702. A default navigation mode 1972 allows the user to choose between receiving both maps and verbal instructions, or verbal instructions only (which may be shown on display 856 or played audibly by speech synthesis, as described above). When the communication network coverage and round-trip time (latency) of communications are poor, either the user or manager 850 can switch to "maneuvers only" mode in navigation, thereby decreasing the amount of data that must be downloaded to client 702. This change can affect the cost of the navigation service as well, if usage-based billing is applied.

Other preferences accessed on screen 1970 include a show-car option 1974, which displays or hides icon 216, and a default route optimization option 1976, which was described above. An off-route behavior option 1978 instructs manager 850 whether when the vehicle takes a wrong turn, client 702 should automatically generate new navigation instructions, or whether it should simply prompt the user to take any necessary action.

Returning now to FIG. 19A, once client 702 has started up, it searches for a mapping server 700 with which to communicate, at a server selection step 1904. Typically, client 702 has a list of available servers (listed by IP address, for example). The client polls the servers on its list to find the server that is able to give the fastest service. For example, the client may send a handshake request to initiate communications with each server on the list, and then may choose the server that takes the shortest time to respond. At this stage, authentication functionality 730 of servers 700 also verifies the username and password supplied by client 702. If no servers respond to the client within a predetermined timeout limit, the client displays an error message, at an error display step 1906. The user may ask the client to try again to find a server, at a retry step 1908. Otherwise, the client program exits.

After finding and selecting a server, client 702 asks the server to download templates and other global information to be used in processing and displaying maps, at a preliminary download step 1910. The global information may include, for example, default object types (DOT) and metrics. (The DOT specifies which types of objects are to be included in maps downloaded subsequently to the client, and which objects are to be omitted, when the DOT is not overridden by client preferences. Metrics are used in converting between map and display coordinates.) If client 702 has already saved templates in memory 855 from a previous mapping session, it may simply send server 700 an identification (such as a version number) of the templates that it has in memory. In this case, the server need not resend all of the templates to the client, but may rather download only changes that have been made in the templates, if any. At this stage, the server may also check the version number of the client software, and may download a new version if the current version is out of date.

Client 702 next prompts the user to select a destination to which the user wishes to navigate or a location whose vicinity the user wishes to view on a map, at a place selection step 1912. The user may choose to input the destination or other location in the form of a house number, crossroads or POI, as noted above. A process of POI selection is illustrated below, for example, in FIGS. 20A–C. The user may also search the "history" of client 702 to find a destination or other location that has been used in the past. The user inputs the place selection (of the chosen type) to client 702, at a destination input step 1914. If the user does not input a selected place, the client program exits, at a termination step 1916.

The user may ask either to receive navigation instructions to the selected destination, or simply to view a map of the selected location, at a mode selection step 1918. When a map is requested for viewing on client 702, manager 850 submits a map request to server 700, at a map request step 1920. Typically, the map request includes the following fields:

A request header, identifying the request type and the client, and listing a request ID along with version and protocol information that is needed by the server in sending the response.

Identification of templates held by the client.

Specification of the map location, dimensions and orientation angle.

Objects to include or exclude from the map. The user may specify, via user interface screens on display 856, that certain map features are to be shown in map displays or, alternatively, omitted from the displays.

These features may include, for example, POIs of various types, names of geographical features, and ancillary information, such as tooltips and hyperlinks, that may be embedded in maps. In the absence of user selections, the default object types (DOT) are used, as described above.

Server 700 prepares and transmits the requested map data to client 702, as described above with reference to FIG. 13. Manager 850 in client 702 receives and handles the map response, at a map handling step 1922, in order to prepare the map data for rendering. Details of step 1922 are shown below in FIGS. 21A–21B. Manager 850 passes the processed map data to rendering engine 854, which renders the map to display 856, at a map display step 1924. The rendering engine draws each feature on the map in accordance with the vector data provided by server 700 (as processed by manager 850 at step 1922) and using the visual characteristics taken from the appropriate template. Overlapping features are overlaid according to the Z-order specified in the template. Text labels are read out of a label pool provided with the map by server 700. Road labels are preferably oriented along the angles of the roads to which they apply (as shown in FIGS. 2D and 2E, for example). An anti-aliasing process is applied to smooth the lines appearing in the map, in order to avoid jagged edges and other image artifacts that may appear due to the low resolution of display 856.

On the other hand, if the user requests navigation instructions at step 1918, manager 850 generates and sends a route request to server 700, at a route request step 1930. The form of the route request is similar to that of the map request, as described above at step 1920, with appropriate changes to identify the type of request and indicate whether or not a map of the route is required. Server 700 prepares a route response, as illustrated above in FIGS. 16 and 17. Upon receiving the route response, manager 850 processes the route data, and drives rendering engine 854 and user interface 858 to display the route on display 856, at a route display step 856. If the response is accompanied by maps, manager 850 handles the map data in the manner described below with reference to FIGS. 21A–B. The maps are then displayed at step 1924, as noted above.

While the requested map is displayed, the user may request changes in the mapping mode, at a mode handling step 1940. For example, the user may change the zoom or visual parameters or select a "follow-me" mode, may drag the map to move to the sides, or may select a hyperlink embedded in the map to receive further information. Manager 850 receives these change requests, at a map operation checking step 1942. The manager may also determine, for example, that a display update is required in order to show the current vehicle position, or that the next maneuver map (FIG. 2C) or segment map (FIG. 2D) along the route corridor should now be displayed. Manager 850 instructs rendering engine 854 to perform the required operations on the current map or to switch to the next map, at an operation handling step 1944. Client 702 cycles through steps 1924, 1940, 1942 and 1944 until no further operations are required, typically because the vehicle has reached its destination or the user has finished viewing the current map. The user may then be prompted to choose a new destination or location, at step 1912.

Figure 20A:
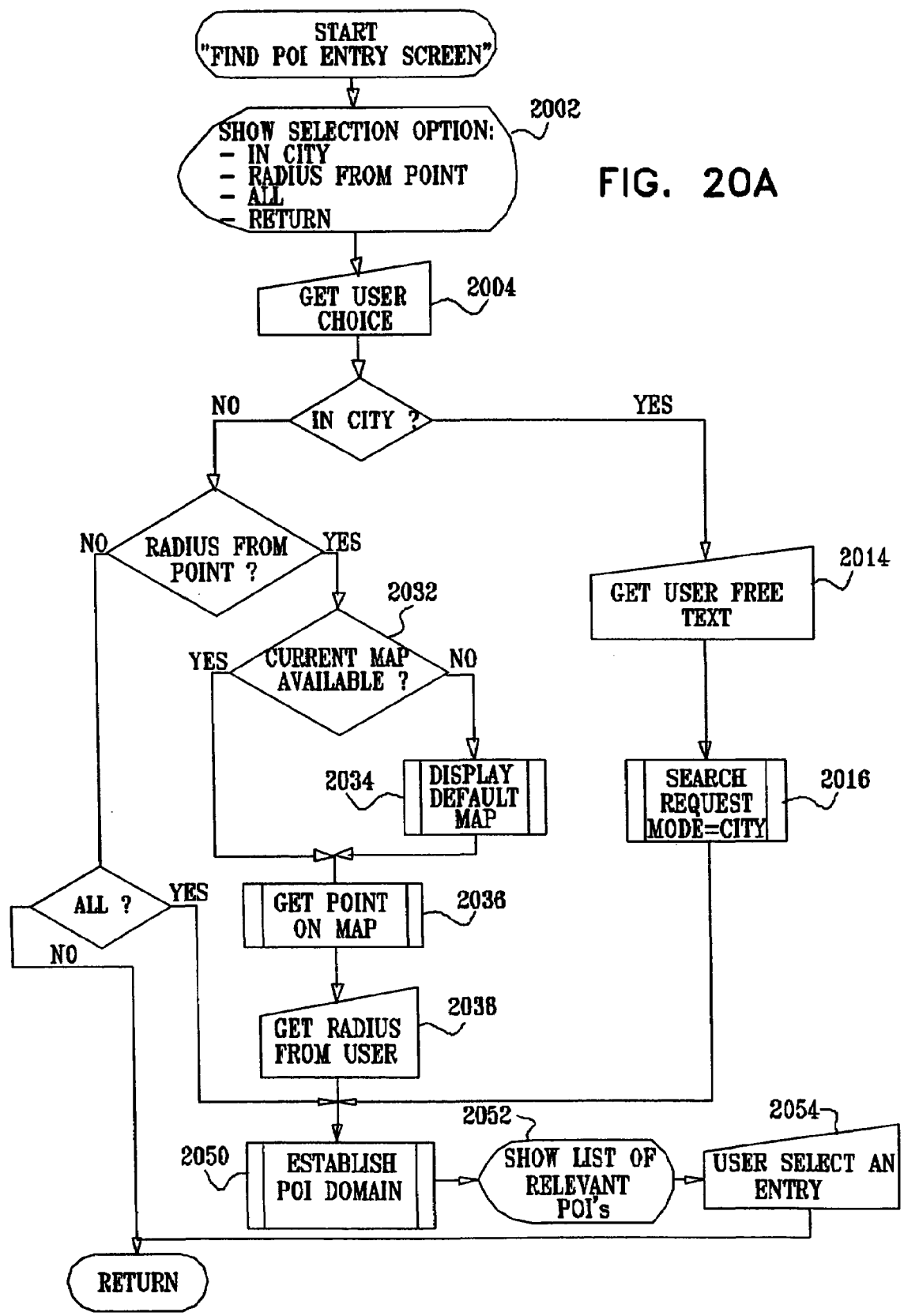
FIG. 20A is a flow chart that schematically illustrates a method for finding and displaying points of interest on a map, in accordance with an embodiment of the present invention.
Figure 20B:
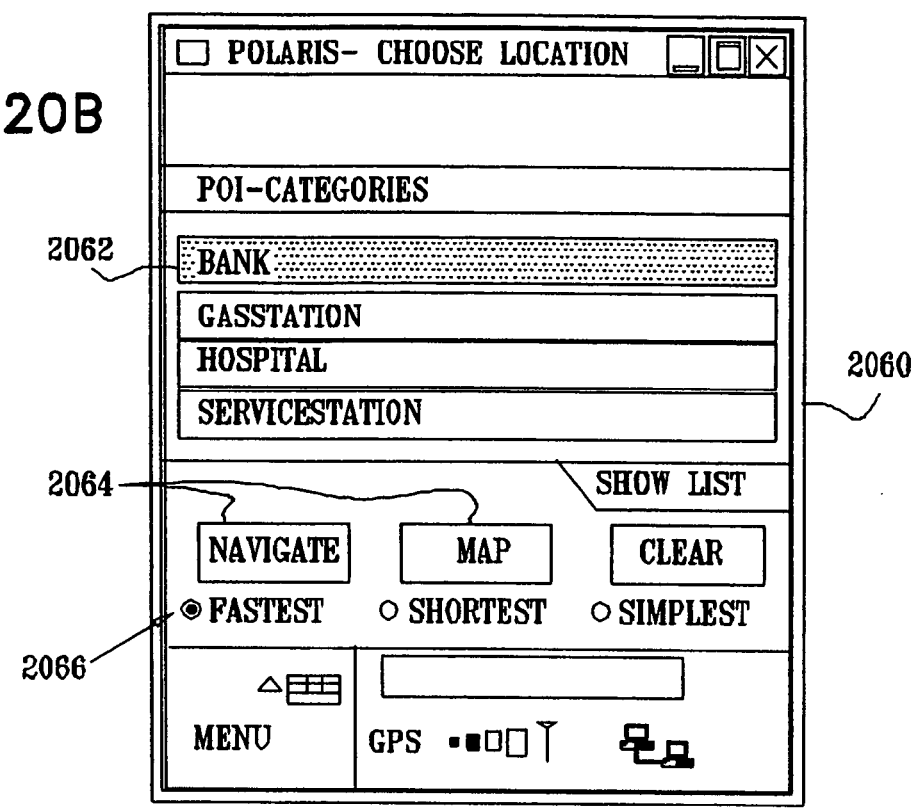
FIGS. 20B and 20C are schematic representations of screens displayed on a mobile device for enabling a user to select a point of interest, in accordance with an embodiment of the present invention.
Figure 20C:
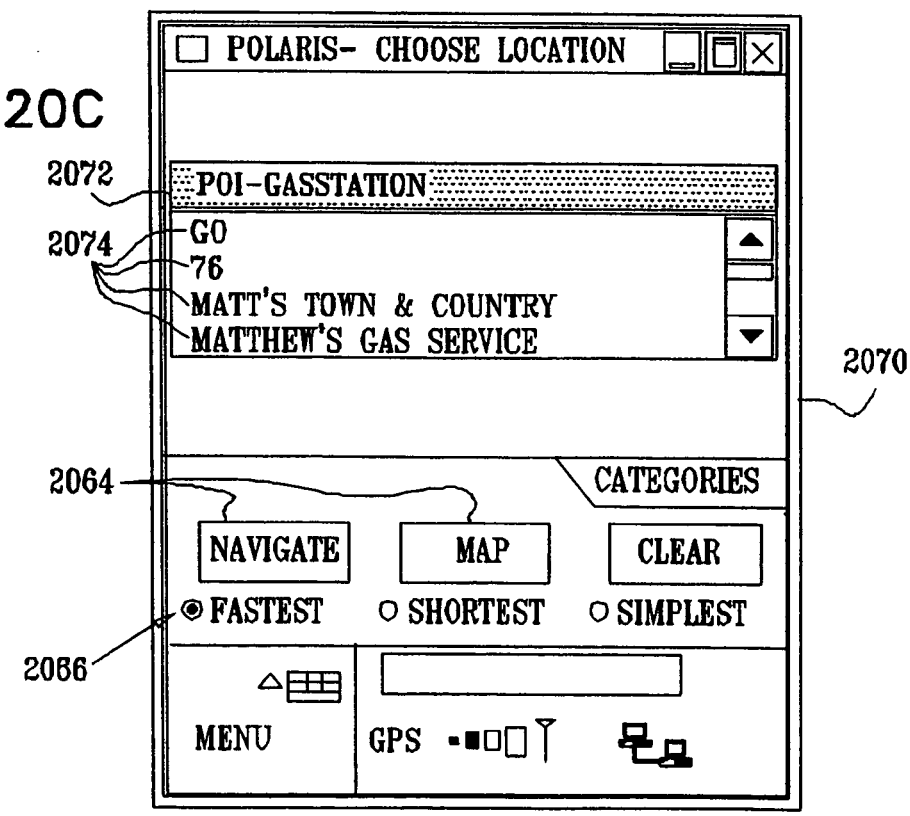

Reference is now made to FIGS. 20A–C, which schematically illustrate a method by which a user of client 702 may select a POI, in accordance with an embodiment of the present invention. FIG. 20A is a flow chart showing the steps in the method itself, which may be invoked by the user at step 1912 in the method of FIG. 19. FIGS. 20B and 20C show user interface screens displayed by the client for the purpose of POI selection.

The user is prompted to input a POI selection option, at an option selection step 2002. In particular, the user may request a list of POIs of a desired type in a particular area of a city or region, or all POIs of the desired type within a given radius of a specified point, or simply all POIs of the desired type within the current map region. User interface 858 receives the user selection, at a selection input step 2004.

If the user has selected the "city" option, the user inputs a text string corresponding to the desired city, at a user input step 2014. Client 702 submits a search request to server 700, at a search request step 2016, invoking a search process similar to that shown above in FIG. 15A. The user may also narrow the search field by selecting a region within a city (such as a certain borough or neighborhood) or by selecting a street name, as well as a house number or crossroads on the selected street.

Alternatively, if the user has selected the "point" option, the user may ask to search POIs within a certain radius of his or her current position (as determined by GPS, for example), or within a certain radius of a specified point on a map. In the latter case, manager 850 checks to determine whether it currently has in memory 855 a map showing the vicinity of interest to the user, at a current map checking step 2032. If so, this map is presented on display 856, so as to allow the user to choose a point on the map. Alternatively, if there is no suitable map available in memory, client 702 submits a map request to server 700, and then receives and displays a default map, showing the general area in which the client is currently located, at a default map display step 2034. In either case, the user is prompted to select a point on the displayed map, at a point selection step 2036. Typically, the user operates a mouse, stylus or touch screen to mark a particular location on display 856. The user is also prompted to input a radius (typically in units of miles or kilometers) around the selected point, within which the POI search will take place, at a radius input step 2038.

Regardless of the option chosen at step 2004, the user must select the type of POI to be found, at a POI domain establishment step 2050. Server 700 may control the types of POIs that different clients are allowed to search for, based on client privileges maintained in an access control list. This feature allows multiple "communities" of clients to share the same map server while accessing different private map data layers. FIG. 20B schematically shows a POI selection screen 2060, which is displayed by client 702 for this purpose. A category window 2062 lists the types of POIs that are available and allows the user to select the POI type from the list. Function buttons 2064 enable the user to ask server 700 for navigation directions to a selected POI or to provide a map of the area of the POI. In requesting navigation directions, the user may select navigation type buttons 2066, as described above.

Client 702 conveys the user choices to server 700 in a search request that indicates the type of POI that the user has selected and the geographical area in which the search should be performed. The server returns a list of relevant POIs, which may be ranked according to their proximity to the location specified by the user. Client 702 shows this list on display 856, at a POI list display step 2052. The user selects an entry from the POI list, at an entry selection step 2054. Client 702 then proceeds to generate a map of the area of the selected POI and/or navigation instructions leading from the current client location to the POI, as described above with reference to FIG. 19.

FIG. 20C schematically shows a POI selection screen 2070, which is presented on display 856 at step 2052. In this example, the user selected "gas stations" at step 2050, and names of nearby gas stations 2074 are shown in a POI selection window 2072. Alternatively, the POIs in the list provided by server 700 may be presented to the user in the form of icons and/or names on a map shown on display 856.

Figure 21A:
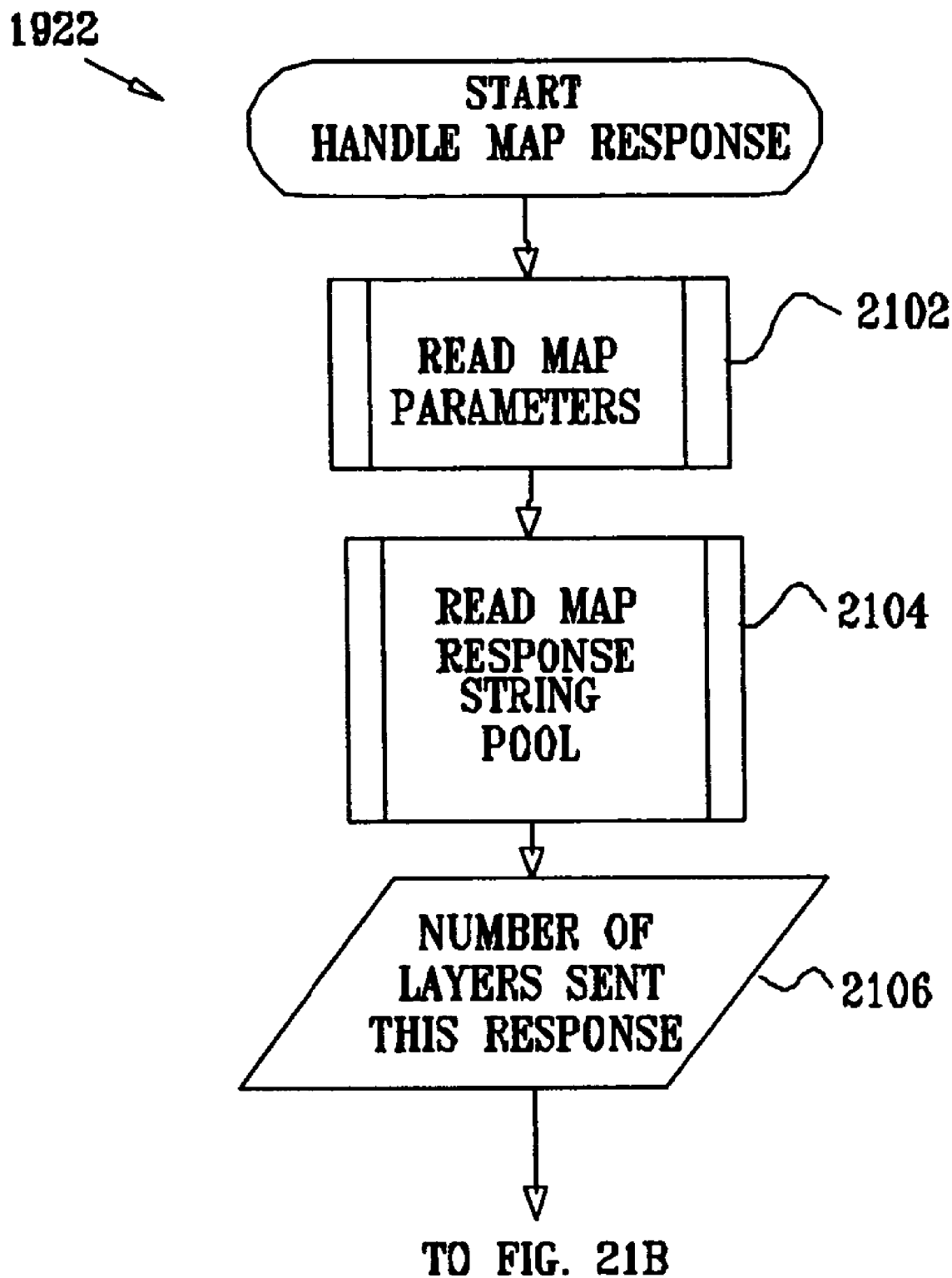
FIGS. 21A and 21B are flow charts that schematically illustrate a method for handling map data received by a mapping client from a mapping server, in accordance with an embodiment of the present invention.
Figure 21B:
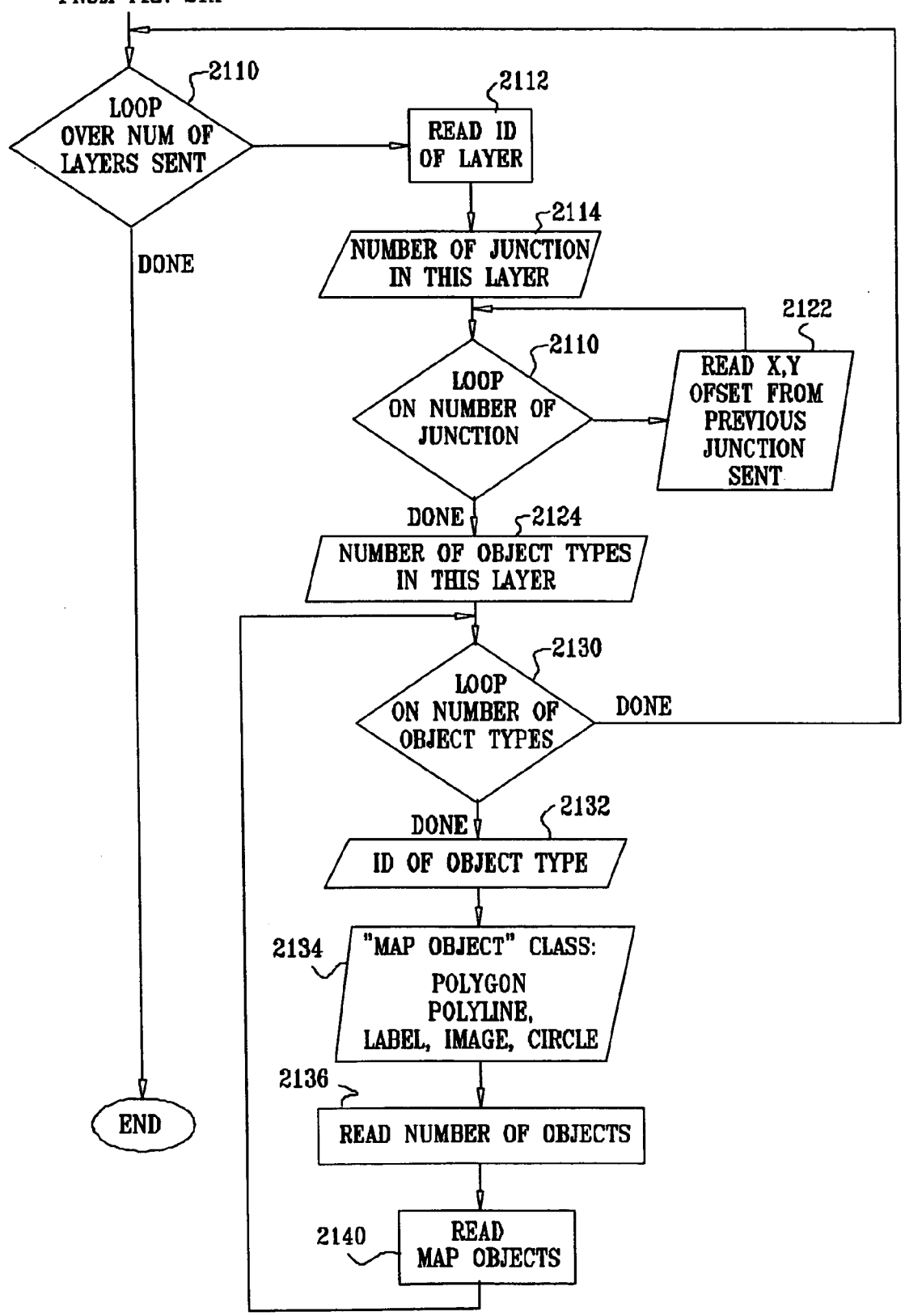

FIGS. 21A and 21B are flow charts that schematically show details of map handling step 1922, in accordance with an embodiment of the present invention. The map response returned by server 700 (at step 1322 in FIG. 13, for example) begins with map parameters, which are read in by manager 850 at a parameter reading step 2102. These parameters typically include the X-Y coordinates of the map rectangle, the height and width of the rectangle, the rotation angle of the map (relative to the geographical north) and the zoom level of the map. The map response also includes a string pool, which contains, in encoded form, the text to be used in all the labels on the current map. Manager 850 reads and decodes the string pool from the response, at a string reading step 2104, and stores the string text in memory 855. In addition, manager 850 reads from the map response the number of layers of vectorial map data that are to be contained in the response, at a layer number reading step 2106.

Manager 850 uses the number of layers as an index in looping over all the layers of data contained in the response, at a layer looping step 2110. The manager processes the data in each layer until all the layers have been completed. To begin processing each layer, manager 850 reads the layer identifier, at a layer identification step 2112. It then reads the number of junctions in the current layer, at a junction number reading step 2114. (Although each junction is shared by two or more polylines, it is more efficient to download the coordinates of each junction to client 702 only once. Junctions may also be used by client 702 in rerouting computations, if the vehicle deviates from the route provided by server 700.) The number of junctions is used as an index in looping over all the junctions in the current layer, at a junction looping step 2120. Each junction has corresponding X-Y coordinates, but for compactness of representation, the coordinates of each junction may be conveyed from server 700 to client 702 in the form of an offset from the coordinates of the preceding junction in the list. As manager 850 loops over the junction list, it reads the offset and restores the X-Y coordinates of each junction based on the offset, at a junction coordinate computation step 2122.

Manager 850 next reads the number of object types in the current layer, at a type number reading step 2124. Possible object types includes point, polyline, polygon, label, image and circle. Typically, client 702 has a Java class for each of the different object types. This class contains the methods necessary for drawing the corresponding type of object at the coordinates indicated by the map data received from server 700, using the visual characteristics specified by the appropriate template.

Manager 850 uses the number of object types as an index for looping over the different object types in the current layer, at a type looping step 2130. For each object type, the manager first reads the type identifier, at a type identification step 2132. It then reads the appropriate object class for the object type, at a class reading step 2134. The manager reads the number of objects of the current type, at an object number reading step 2136, and then reads in the objects themselves, at an object reading step 2140. For each object read in at this step, manager 850 examines the object parameters to determine whether the object has an index pointing to auxiliary information, such as a descriptive label, tooltip or hyperlink. If so, the manager uses the index to associate the object with the appropriate text in the string pool that was sent by server 700 as a part of the map response. The manager also reads in the object coordinates, such as the coordinates of each vertex in each polyline or polygon, or the center coordinates of circles and images. After all the map objects have been read in and associated with their appropriate classes, the map is rendered to display 856 at step 1924, as described above.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for navigation, comprising:
   storing map data on a server, the map data comprising vector information delineating roads in a map;
   downloading from the server to a mobile client device a portion of the vector information corresponding to an area in which a user of the client device is traveling;
   finding approximate position coordinates of the user using a location providing device associated with the client device;
   receiving and correcting the approximate position coordinates in the client device, using the downloaded vector information, so as to determine a location of the user on one of the roads in the map; and
   providing a navigation aid to the user of the client device based on the determined location.

2. The method according to claim 1, wherein the location providing device comprises a global positioning system (GPS) receiver.

3. The method according to claim 1, wherein providing the navigation aid comprises rendering an image of the map on the client device, and superimposing an icon representing the location of the user on the map.

4. The method according to claim 3, wherein receiving and correcting the approximate position coordinates comprises updating the location of the user as the user travels along the roads, and wherein superimposing the icon comprises shifting a position of the icon on the map without rendering a new image of the map.

5. The method according to claim 1, wherein downloading the portion of the vector information comprises downloading the vector information over a wireless link.

6. The method according to claim 5, wherein the client device comprises at least one of a cellular telephone and a personal digital assistant (PDA), which communicates with the server over a cellular telephone network that comprises the wireless link.

7. The method according to claim 5, and comprising downloading an applet from the server to the client device over the wireless link, for use by the client device in receiving and correcting the approximate position coordinates.

8. The method according to claim 1, wherein downloading the portion of the vector information comprises determining on the server, based on the map data, a route from a starting point to a destination within an area of the map, the route comprising a sequence of route segments, and downloading the route from the server to the client device, and wherein providing the navigation aid comprises guiding the user of the client device along the route.

9. The method according to claim 1, and comprising:
   receiving at the server, while the user travels along the route, dynamic information regarding a change in travel conditions in a vicinity of the route;
   submitting a request from the client device to the server for updated information regarding the route, the request specifying, based on the downloaded route and the location of the user, one or more of the route segments not yet traversed by the user;
   determining at the server, based on the route segments specified by the client device and on the dynamic information received by the server, a modified route to the destination; and
   downloading the modified route to the client device.

10. A method for navigation using a mobile client device, comprising:
   storing map data on a server, the map data delineating features in a map;
   determining on the server, based on the map data, a route from a starting point to a destination within an area of the map, the route comprising a sequence of route segments;
   downloading the route from the server to the mobile client device;
   finding location coordinates of the client device using a location providing device associated with the client device while a user of the client device travels along the route;
   receiving at the server, while the user travels along the route, dynamic information regarding a change in travel conditions in a vicinity of the route;
   submitting a request from the client device to the server for updated information regarding the route, the request specifying, based on the downloaded route and the location coordinates, one or more of the route segments not yet traversed by the user;

determining at the server, based on the route segments specified by the client device and on the dynamic information received by the server, a modified route to the destination; and downloading the modified route to the client device.

11. The method according to claim 10, wherein submitting the request comprises sending multiple requests from the client device to the server as the user travels along the route.

12. The method according to claim 10, wherein downloading the route comprises downloading route information over a wireless link from the server to the client device.

13. The method according to claim 12, wherein the client device comprises at least one of a cellular telephone and a personal digital assistant (PDA), which communicates with the server over a cellular telephone network that comprises the wireless link.

14. The method according to claim 12, and comprising downloading an applet from the server to the client device over the wireless link, for use by the client device in receiving the route and submitting the request to the server.

15. A method for displaying a map on a mobile client device, the method comprising:

storing map data on a server, the map data delineating features in the map;

downloading from the server to the client device a portion of the map data corresponding to a selected area of the map, causing the client device to render and display an image of the selected area of the map;

finding location coordinates of the client device using a location providing device associated with the client device while a user of the client device travels within the selected area;

receiving at the server, while the user travels within the selected area, dynamic information with regard to the area;

downloading the dynamic information to the client device, responsively to the location coordinates of the client device; and displaying the dynamic information on the image of the selected area of the map displayed by the client device, without requiring the client device to render the image again.

16. The method according to claim 15, wherein downloading the dynamic information comprises receiving at the server a request from the client device for the dynamic information, the request specifying the location coordinates, and providing the dynamic information to the client device in response to the request.

17. The method according to claim 16, wherein providing the dynamic information comprises conveying the dynamic information from the server within four seconds of receiving the request from the client device.

18. Apparatus for navigation, comprising:

a mobile client device;

a location providing device, associated with the client device;

a memory; and a mapping server, which is adapted to store map data in the memory, the map data comprising vector information delineating roads in a map, and to download to the client device a portion of the vector information corresponding to an area in which a user of the client device is traveling, wherein the client device is adapted to find approximate position coordinates of the user using the location providing device, and to correct the approximate position coordinates using the downloaded vector information, so as to determine a location of the user on one of the roads in the map and to provide a navigation aid to the user based on the determined location.

19. The apparatus according to claim 18, wherein the location providing device comprises a global positioning system (GPS) receiver.

20. The apparatus according to claim 18, wherein the client device comprises a display and is adapted to render an image of the map on the display, and to superimpose an icon representing the location of the user on the map.

21. The apparatus according to claim 20, wherein the client device is adapted to update the location of the user as the user travels along the roads, and to shift a position of the icon on the map without rendering a new image of the map.

22. The apparatus according to claim 18, wherein the server is adapted to download the vector information to the client device over a wireless link.

23. The apparatus according to claim 22, wherein the client device comprises at least one of a cellular telephone and a personal digital assistant (PDA), which communicates with the server over a cellular telephone network that comprises the wireless link.

24. The apparatus according to claim 22, wherein the server is adapted to download an applet to the client device over the wireless link, which causes the client device to receive and correct the approximate position coordinates.

25. The apparatus according to claim 18, wherein the server is adapted to determine, based on the map data, a route from a starting point to a destination within an area of the map, the route comprising a sequence of route segments, and to download the route to the client device, and wherein the client device is adapted to guide the user along the route.

26. The apparatus according to claim 25, wherein the server is adapted to receive, while the user travels along the route, dynamic information regarding a change in travel conditions in a vicinity of the route, and wherein the client device is adapted to submit a request to the server for updated information regarding the route, the request specifying, based on the downloaded route and the location of the vehicle, one or more of the route segments not yet traversed by the vehicle, and wherein the server is adapted to determine, based on the route segments specified by the client device and on the dynamic information received by the server, a modified route to the destination, and to download the modified route to the client device.

27. Apparatus for navigation, comprising:

a mobile client device;

a location providing device, which is associated with the client device and is adapted to find location coordinates of the client device;

a memory; and a mapping server, which is adapted to store map data in the memory, the map data delineating features in a map, and which is adapted to determine, based on the map data, a route from a starting point to a destination within an area of the map, the route comprising a sequence of route segments, and to download the route to the client device, and which is adapted to receive, while a user of the client device travels along the route, dynamic information regarding a change in travel conditions in a vicinity of the route, wherein the client device is adapted to submit a request to the server for updated information regarding the route, the request specifying, based on the downloaded route and the location coordinates, one or more of the route segments not yet traversed by the user, and wherein the server is adapted to determine, based on the route segments specified by the client device and on the dynamic information received by the server, a modified route to the destination, and to download the modified route to the client device.

28. The apparatus according to claim 27, wherein the client device is adapted to send multiple requests to the server for the updated information as the user travels along the route.

29. The apparatus according to claim 27, wherein the server is adapted to download the route to the client device over a wireless link.

30. The apparatus according to claim 29, wherein the client device comprises at least one of a cellular telephone and a personal digital assistant (PDA), which communicates with the server over a cellular telephone network that comprises the wireless link.

31. The apparatus according to claim 29, wherein the server is adapted to download an applet to the client device over the wireless link, which causes the client device to receive the route and to submit the request to the server.

32. Apparatus for displaying a map, comprising:
a mobile client device;
a location providing device, which is associated with the client device and is adapted to find location coordinates of the client device;
a memory; and
a mapping server, which is adapted to store map data delineating features in the map, and to download to the client device a portion of the map data corresponding to a selected area of the map, causing the client device to render and display an image of the selected area of the map,
the server being further adapted to receive, while a user of the client device travels within the selected area, dynamic information with regard to the area, and to download the dynamic information to the client device, responsively to the location coordinates of the client device, causing the client device to display the dynamic information on the image of the selected area of the map displayed by the client device, without requiring the client device to render the image of the selected area again.

33. The apparatus according to claim 32, wherein the client device is adapted to submit a request to the server for the dynamic information, the request specifying the location coordinates, so that the server provides the dynamic information to the client device in response to the request.

34. The apparatus according to claim 33, wherein the server is adapted to convey the dynamic information to the client device within four seconds of receiving the request from the client device.

35. A computer software product comprising a computer-readable medium in which program instructions are stored, which instructions, when read by a computer, cause the computer to access map data in a memory, the map data comprising vector information delineating roads in a map, and to download to a mobile client device a portion of the vector information corresponding to an area in which a user of the client device is traveling,
the instructions further causing the computer to download a program to the client device, which causes the client device to find approximate position coordinates of the client device using the location providing device, and to correct the approximate position coordinates using the downloaded vector information, so as to determine a location of the user on one of the roads in the map and to provide a navigation aid to the user based on the determined location.

36. The product according to claim 35, wherein the location providing device comprises a global positioning system (GPS) receiver.

37. The product according to claim 35, wherein the client device comprises a display, and wherein the program causes the client device to render an image of the map on the display, and to superimpose an icon representing the location of the user on the map.

38. The product according to claim 37, wherein the program causes the client device to update the location of the user as the user travels along the roads, and to shift a position of the icon on the map without rendering a new image of the map.

39. The product according to claim 37, wherein the instructions cause the computer to download the vector information to the client device over a wireless link.

40. The product according to claim 39, wherein the client device comprises at least one of a cellular telephone and a personal digital assistant (PDA), which communicates with the computer over a cellular telephone network that comprises the wireless link.

41. The product according to claim 39, wherein the program comprises an applet, which is downloaded to the client device over the wireless link, and which causes the client device to receive and correct the approximate position coordinates.

42. The product according to claim 35, wherein the instructions cause the computer to determine, based on the map data, a route from a starting point to a destination within an area of the map, the route comprising a sequence of route segments, and to download the route to the client device, and wherein the program causes the client device to guide the user along the route.

43. The product according to claim 42, wherein the instructions cause the computer to receive, while the user travels along the route, dynamic information regarding a change in travel conditions in a vicinity of the route, and
wherein the program causes the client device to submit a request to the computer for updated information regarding the route, the request specifying, based on the downloaded route and the location of the user, one or more of the route segments not yet traversed by the user, and
wherein the instructions cause the computer to determine, based on the route segments specified by the client device and on the dynamic information received by the server, a modified route to the destination, and to download the modified route to the client device.

44. A computer software product, comprising a computer-readable medium in which program instructions are stored, which instructions, when read by a computer, cause the computer to access map data in a memory, the map data delineating features in a map, and to determine, based on the map data, a route from a starting point to a destination within an area of the map, the route comprising a sequence of route segments, and to download the route to a mobile client device, the instructions further causing the computer to receive, while a user of the client device travels along the route, dynamic information regarding a change in travel conditions in a vicinity of the route,
the instructions further causing the computer to download a program to the client device, which causes the client device to receive location coordinates of the client device from a location providing device, and to submit a request to the server for updated information regarding the route, the request specifying, based on the downloaded route and the location coordinates, one or more of the route segments not yet traversed by the user, wherein the instructions cause the computer to determine, based on the route segments specified by the client device and on the dynamic information received by the server, a modified route to the destination, and to download the modified route to the client device.

45. The product according to claim 44, wherein the program causes the client device to send multiple requests to the server for the updated information as the user travels along the route.

46. The product according to claim 45, wherein the instructions cause the computer to download the route to the client device over a wireless link.

47. The product according to claim 46, wherein the client device comprises at least one of a cellular telephone and a personal digital assistant (PDA), which communicates with the computer over a cellular telephone network that comprises the wireless link.

48. The product according to claim 46, wherein the program comprises an applet, which is downloaded to the client device over the wireless link, and which causes the client device to receive the route and to submit the request to the computer.

49. A computer software product for displaying a map, comprising a computer-readable medium in which program instructions are stored, which instructions, when read by a computer, cause the computer to access map data delineating features in the map, and to download to a mobile client device a portion of the map data corresponding to a selected area of the map, causing the client device to render and display an image of the selected area of the map, the instructions further causing the computer to receive dynamic information with regard to the area and location coordinates of the client device, while a user of the client device travels within the selected area, and to download the dynamic information to the client device, responsively to the location coordinates, causing the client device to display the dynamic information on the image of the selected area of the map displayed by the client device, without requiring the client device to render the image of the selected area again.

50. The product according to claim 49, wherein the instructions cause the computer to download the dynamic information in response to a request submitted by the client device, the request specifying the location coordinates.

51. The product according to claim 49, wherein the instructions cause the computer to convey the dynamic information to the client device within four seconds of receiving the request from the client device.

* * * * *